(12) United States Patent
Davis et al.

(10) Patent No.: US 12,265,525 B2
(45) Date of Patent: Apr. 1, 2025

(54) MODIFYING A QUERY FOR PROCESSING BY MULTIPLE DATA PROCESSING SYSTEMS

(71) Applicant: Splunk Inc., San Francisco, CA (US)

(72) Inventors: Brent Davis, Fort Collins, CO (US); David Johns DeWitt, Newton, MA (US); Derek Feriancek, Deerwood, MN (US); Venkatasubramanian Jayaraman, Issaquah, WA (US); Vinay Manivel, San Jose, CA (US); Christopher Ogle, San Jose, CA (US); Balaji Rao, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 18/428,428

(22) Filed: Jan. 31, 2024

(65) Prior Publication Data
US 2025/0028712 A1     Jan. 23, 2025

Related U.S. Application Data

(60) Provisional application No. 63/514,076, filed on Jul. 17, 2023.

(51) Int. Cl.
G06F 16/22     (2019.01)
G06F 16/24     (2019.01)
(Continued)

(52) U.S. Cl.
CPC ............ *G06F 16/242* (2019.01); *G06F 16/22* (2019.01); *G06F 16/24542* (2019.01); *G06F 16/2471* (2019.01)

(58) Field of Classification Search
None
See application file for complete search history.

(56) References Cited

U.S. PATENT DOCUMENTS

| 5,187,750 A | 2/1993 | Behera |
| 5,590,321 A | 12/1996 | Lin et al. |

(Continued)

FOREIGN PATENT DOCUMENTS

| CN | 103729447 A | 4/2014 |
| CN | 105893205 A | 8/2016 |

(Continued)

OTHER PUBLICATIONS

U.S. Appl. No. 18/429,156, filed Jan. 31, 2024, Frenkel et al.
(Continued)

*Primary Examiner* — Son T Hoang
(74) *Attorney, Agent, or Firm* — Shook, Hardy & Bacon L.L.P.

(57) ABSTRACT

A query coordinator can receive a query and identify a first portion of the query to be processed by a first data processing system and a second portion of the query to be processed by a second data processing system. The query coordinator can obtain a modified query based on identifying the first portion and the second portion of the query. The query coordinator can define a query processing scheme according to the modified query and provide the query processing scheme to the second data processing system. Based on providing the query processing scheme, the query coordinator can obtain an output of the second data processing system. The query coordinator can identify a second query based on the output and provide the second query to a component of the first data processing system.

20 Claims, 12 Drawing Sheets

(51) Int. Cl.
  *G06F 16/242* (2019.01)
  *G06F 16/245* (2019.01)
  *G06F 16/2453* (2019.01)
  *G06F 16/2458* (2019.01)

(56) References Cited

U.S. PATENT DOCUMENTS

| | | |
|---|---|---|
| 5,623,652 A | 4/1997 | Vora et al. |
| 5,812,793 A | 9/1998 | Shakib et al. |
| 5,913,214 A | 6/1999 | Madnick et al. |
| 5,918,049 A | 6/1999 | Syväniemi |
| 5,941,969 A | 8/1999 | Ram et al. |
| 6,009,422 A | 12/1999 | Ciccarelli |
| 6,081,883 A | 6/2000 | Popelka et al. |
| 6,154,781 A | 11/2000 | Bolam et al. |
| 6,185,666 B1 | 2/2001 | Murray et al. |
| 6,205,441 B1 | 3/2001 | Al-Omari et al. |
| 6,282,537 B1 | 8/2001 | Madnick et al. |
| 6,408,294 B1 | 6/2002 | Getchius et al. |
| 6,430,553 B1 | 8/2002 | Ferret |
| 6,463,454 B1 | 10/2002 | Lumelsky et al. |
| 6,466,980 B1 | 10/2002 | Lumelsky et al. |
| 6,490,585 B1 | 12/2002 | Hanson et al. |
| 6,502,091 B1 | 12/2002 | Chundi et al. |
| 6,505,191 B1 | 1/2003 | Baclawski |
| 6,578,131 B1 | 6/2003 | Larson et al. |
| 6,741,982 B2 | 5/2004 | Soderstrom et al. |
| 6,786,418 B1 | 9/2004 | Francois |
| 6,920,396 B1 | 7/2005 | Wallace et al. |
| 7,007,275 B1 | 2/2006 | Hanson et al. |
| 7,039,764 B1 | 5/2006 | Shetty et al. |
| 7,233,939 B1 | 6/2007 | Ziauddin |
| 7,249,192 B1 | 7/2007 | Brewer et al. |
| 7,290,196 B1 | 10/2007 | Annayya et al. |
| 7,370,068 B1 | 5/2008 | Pham et al. |
| 7,505,985 B2 | 3/2009 | Kilroy |
| 7,536,686 B2 | 5/2009 | Tan et al. |
| 7,634,511 B1 | 12/2009 | Freiheit et al. |
| 7,685,109 B1 | 3/2010 | Ransil et al. |
| 7,685,281 B1 | 3/2010 | Saraiya et al. |
| 7,689,553 B2 | 3/2010 | Zuzarte |
| 7,689,633 B1 | 3/2010 | Li et al. |
| 7,698,267 B2 | 4/2010 | Papakonstantinou et al. |
| 7,702,610 B2 | 4/2010 | Zane et al. |
| 7,769,722 B1 | 8/2010 | Bergant et al. |
| 7,895,359 B2 | 2/2011 | Reed et al. |
| 7,937,344 B2 | 5/2011 | Baum et al. |
| 7,962,464 B1 | 6/2011 | Brette et al. |
| 8,019,725 B1 | 9/2011 | Mulligan et al. |
| 8,112,425 B2 | 2/2012 | Baum et al. |
| 8,190,593 B1 | 5/2012 | Dean |
| 8,195,922 B2 | 6/2012 | Chen et al. |
| 8,412,696 B2 | 4/2013 | Zhang et al. |
| 8,473,316 B1 | 6/2013 | Panzitta et al. |
| 8,504,620 B2 | 8/2013 | Chi et al. |
| 8,527,645 B1 | 9/2013 | Proffit et al. |
| 8,589,375 B2 | 11/2013 | Zhang et al. |
| 8,589,403 B2 | 11/2013 | Marquardt et al. |
| 8,589,432 B2 | 11/2013 | Zhang et al. |
| 8,601,112 B1 | 12/2013 | Nordstrom et al. |
| 8,682,925 B1 | 3/2014 | Marquardt et al. |
| 8,719,520 B1 | 5/2014 | Piszczek et al. |
| 8,738,587 B1 | 5/2014 | Bitincka et al. |
| 8,738,629 B1 | 5/2014 | Bitincka et al. |
| 8,751,529 B2 | 6/2014 | Zhang et al. |
| 8,761,077 B2 | 6/2014 | Kim et al. |
| 8,762,367 B2 | 6/2014 | Burger et al. |
| 8,769,493 B2 | 7/2014 | Arnold et al. |
| 8,788,525 B2 | 7/2014 | Neels et al. |
| 8,788,526 B2 | 7/2014 | Neels et al. |
| 8,793,225 B1 | 7/2014 | Bitincka et al. |
| 8,806,361 B1 | 8/2014 | Noel et al. |
| 8,812,490 B1 | 8/2014 | Cappiello et al. |
| 8,838,678 B1 | 9/2014 | Weiss |
| 8,849,891 B1 | 9/2014 | Suchter et al. |
| 8,874,755 B1 | 10/2014 | Deklich et al. |
| 8,874,961 B2 | 10/2014 | Pillai et al. |
| 8,924,476 B1 | 12/2014 | Granström et al. |
| 8,935,257 B1 | 1/2015 | Vermuri et al. |
| 8,935,302 B2 | 1/2015 | Flynn et al. |
| 8,943,569 B1 | 1/2015 | Luckett, Jr. et al. |
| 8,959,221 B2 | 2/2015 | Morgan |
| 8,983,912 B1 | 3/2015 | Beedgen et al. |
| 8,983,994 B2 | 3/2015 | Neels et al. |
| 8,990,148 B1 | 3/2015 | Ziegler et al. |
| 9,015,197 B2 | 4/2015 | Richards et al. |
| 9,087,030 B2 | 7/2015 | Basile |
| 9,087,090 B1 | 7/2015 | Cormier et al. |
| 9,124,612 B2 | 9/2015 | Vasan et al. |
| 9,128,636 B2 | 9/2015 | Arakawa |
| 9,128,980 B2 | 9/2015 | Neels et al. |
| 9,128,985 B2 | 9/2015 | Marquardt et al. |
| 9,130,971 B2 | 9/2015 | Vasan et al. |
| 9,135,560 B1 | 9/2015 | Saurabh et al. |
| 9,141,665 B1 | 9/2015 | Munro et al. |
| 9,173,801 B2 | 11/2015 | Merza |
| 9,185,007 B2 | 11/2015 | Fletcher et al. |
| 9,215,240 B2 | 12/2015 | Merza et al. |
| 9,244,999 B2 | 1/2016 | Jin et al. |
| 9,248,068 B2 | 2/2016 | Merza |
| 9,256,467 B1 | 2/2016 | Singh et al. |
| 9,262,519 B1 | 2/2016 | Saurabh |
| 9,286,413 B1 | 3/2016 | Coates et al. |
| 9,292,620 B1 | 3/2016 | Hoover et al. |
| 9,336,327 B2 | 5/2016 | Melnik et al. |
| 9,342,571 B1 | 5/2016 | Kurtic et al. |
| 9,378,088 B1 | 6/2016 | Piszczek et al. |
| 9,426,045 B2 | 8/2016 | Fletcher et al. |
| 9,426,172 B2 | 8/2016 | Merza |
| 9,432,396 B2 | 8/2016 | Merza |
| 9,438,470 B2 | 9/2016 | Brady, Jr. et al. |
| 9,438,515 B2 | 9/2016 | McCormick et al. |
| 9,489,385 B1 | 11/2016 | Ladola |
| 9,495,427 B2 | 11/2016 | Adabi et al. |
| 9,514,146 B1 | 12/2016 | Wallace et al. |
| 9,514,189 B2 | 12/2016 | Bitincka et al. |
| 9,558,194 B1 | 1/2017 | Srivastav et al. |
| 9,589,012 B2 | 3/2017 | Neels et al. |
| 9,619,581 B2 | 4/2017 | Hughes et al. |
| 9,621,636 B1 | 4/2017 | McVeety et al. |
| 9,672,116 B1 | 6/2017 | Chopra et al. |
| 9,672,274 B1 | 6/2017 | Goo |
| 9,722,951 B2 | 8/2017 | Almadi |
| 9,734,180 B1 | 8/2017 | Graham et al. |
| 9,753,935 B1 | 9/2017 | Tobin et al. |
| 9,779,015 B1 | 10/2017 | Oikarinen et al. |
| 9,806,978 B2 | 10/2017 | McAlister et al. |
| 9,838,292 B2 | 12/2017 | Polychronis |
| 9,900,397 B1 | 2/2018 | Cope et al. |
| 9,959,062 B1 | 5/2018 | Piszczek et al. |
| 9,984,128 B2 | 5/2018 | Vasan et al. |
| 9,990,386 B2 | 6/2018 | Marquardt et al. |
| 9,992,741 B2 | 6/2018 | Trainin et al. |
| 9,996,400 B2 | 6/2018 | Nakagawa et al. |
| 10,025,795 B2 | 7/2018 | Fokoue-Nkoutche et al. |
| 10,031,922 B2 | 7/2018 | Fokoue-Nkoutche et al. |
| 10,037,341 B2 | 7/2018 | Bassov et al. |
| 10,049,160 B2 | 8/2018 | Bitincka et al. |
| 10,091,100 B1 | 10/2018 | Duerk |
| 10,095,993 B1 | 10/2018 | Bar-Menachem et al. |
| 10,120,898 B1 | 11/2018 | Betawadkar-Norwood et al. |
| 10,127,258 B2 | 11/2018 | Lamas et al. |
| 10,142,204 B2 | 11/2018 | Nickolov et al. |
| 10,169,465 B2 | 1/2019 | Andrews et al. |
| 10,216,774 B2 | 2/2019 | Dang et al. |
| 10,318,491 B1 | 6/2019 | Graham et al. |
| 10,318,511 B2 | 6/2019 | De Smet et al. |
| 10,320,638 B1 | 6/2019 | Lauinger et al. |
| 10,353,965 B2 | 7/2019 | Pal et al. |
| 10,437,653 B2 | 10/2019 | Cyr et al. |
| 10,445,311 B1 | 10/2019 | Saurabh et al. |
| 10,452,632 B1 | 10/2019 | Simmen et al. |
| 10,474,723 B2 | 11/2019 | Hodge et al. |
| 10,528,599 B1 | 1/2020 | Pandis et al. |

(56) References Cited

U.S. PATENT DOCUMENTS

| | | |
|---|---|---|
| 10,534,794 B2 | 1/2020 | Dageville et al. |
| 10,558,656 B2 | 2/2020 | Wells et al. |
| 10,585,951 B2 | 3/2020 | Bhattacharjee et al. |
| 10,592,561 B2 | 3/2020 | Bhattacharjee et al. |
| 10,592,562 B2 | 3/2020 | Pal et al. |
| 10,592,563 B2 | 3/2020 | Pal et al. |
| 10,599,662 B2 | 3/2020 | Constantino et al. |
| 10,599,723 B2 | 3/2020 | Bhattacharjee et al. |
| 10,599,724 B2 | 3/2020 | Pal et al. |
| 10,606,856 B2 | 3/2020 | Bath et al. |
| 10,657,061 B1 | 5/2020 | Marriner |
| 10,657,146 B2 | 5/2020 | Bath et al. |
| 10,706,056 B1 | 7/2020 | Lin et al. |
| 10,726,009 B2 | 7/2020 | Pal et al. |
| 10,769,148 B1 | 9/2020 | Binkert et al. |
| 10,776,355 B1 | 9/2020 | Bataskis et al. |
| 10,776,374 B2 | 9/2020 | Valine et al. |
| 10,795,884 B2 | 10/2020 | Bhattacharjee et al. |
| 10,896,182 B2 | 1/2021 | Bhattacharjee et al. |
| 10,956,415 B2 | 3/2021 | Pal et al. |
| 10,977,260 B2 | 4/2021 | Pal et al. |
| 10,984,044 B1 | 4/2021 | Batsakis et al. |
| 10,999,164 B1 | 5/2021 | Sridhar et al. |
| 11,003,714 B1 | 5/2021 | Batsakis et al. |
| 11,010,435 B2 | 5/2021 | Pal et al. |
| 11,023,463 B2 | 6/2021 | Pal et al. |
| 11,023,539 B2 | 6/2021 | Pal et al. |
| 11,080,345 B2 | 8/2021 | Pal et al. |
| 11,100,106 B1 | 8/2021 | Sainanee et al. |
| 11,106,734 B1 | 8/2021 | Batsakis et al. |
| 11,113,274 B1 | 9/2021 | Thiel et al. |
| 11,126,632 B2 | 9/2021 | Pal et al. |
| 11,151,137 B2 | 10/2021 | Bhattacharjee et al. |
| 11,163,758 B2 | 11/2021 | James et al. |
| 11,176,208 B2 | 11/2021 | Pal et al. |
| 11,222,066 B1 | 1/2022 | Batsakis et al. |
| 11,232,100 B2 | 1/2022 | Bhattacharjee et al. |
| 11,238,112 B2 | 2/2022 | Hodge et al. |
| 11,243,963 B2 | 2/2022 | Pal et al. |
| 11,250,056 B1 | 2/2022 | Batsakis et al. |
| 11,269,939 B1 | 3/2022 | Sammer et al. |
| 11,281,706 B2 | 3/2022 | Pal et al. |
| 11,294,941 B1 | 4/2022 | Sammer et al. |
| 11,314,753 B2 | 4/2022 | Pal et al. |
| 11,321,321 B2 | 5/2022 | Bhattacharjee et al. |
| 11,334,543 B1 | 5/2022 | Anwar et al. |
| 11,341,131 B2 | 5/2022 | Pal et al. |
| 11,392,654 B2 | 7/2022 | Pal et al. |
| 11,416,528 B2 | 8/2022 | Pal et al. |
| 11,442,935 B2 | 9/2022 | Pal et al. |
| 11,461,334 B2 | 10/2022 | Bhattacharjee et al. |
| 11,494,380 B2 | 11/2022 | Rao et al. |
| 11,500,875 B2 | 11/2022 | Bhattacharjee et al. |
| 11,537,311 B1 | 12/2022 | Dhupelia et al. |
| 11,550,847 B1 | 1/2023 | Batsakis et al. |
| 11,562,023 B1 | 1/2023 | Batsakis et al. |
| 11,567,993 B1 | 1/2023 | Batsakis et al. |
| 11,580,107 B2 | 2/2023 | Pal et al. |
| 11,586,627 B2 | 2/2023 | Bhattacharjee et al. |
| 11,586,692 B2 | 2/2023 | Bhattacharjee et al. |
| 11,593,377 B2 | 2/2023 | Bhattacharjee et al. |
| 11,599,541 B2 | 3/2023 | Pal et al. |
| 11,604,795 B2 | 3/2023 | Pal et al. |
| 11,615,087 B2 | 3/2023 | Pal et al. |
| 11,615,104 B2 | 3/2023 | Pal et al. |
| 11,620,336 B1 | 4/2023 | Batsakis et al. |
| 11,636,105 B2 | 4/2023 | Pal et al. |
| 11,663,227 B2 | 5/2023 | Pal et al. |
| 11,704,313 B1 | 7/2023 | Andrade et al. |
| 11,720,537 B2 | 8/2023 | Anwar et al. |
| 11,797,618 B2 | 10/2023 | Pal et al. |
| 11,860,874 B2 | 1/2024 | Bhattacharjee et al. |
| 11,860,940 B1 | 1/2024 | Batsakis et al. |
| 11,874,691 B1 | 1/2024 | Batsakis et al. |
| 11,921,672 B2 | 3/2024 | Pal et al. |
| 11,922,222 B1 | 3/2024 | Chawla et al. |
| 11,966,391 B2 | 4/2024 | Pal et al. |
| 11,989,194 B2 | 5/2024 | Bhattacharjee et al. |
| 11,995,079 B2 | 5/2024 | Pal et al. |
| 12,007,996 B2 | 6/2024 | Rao et al. |
| 12,013,895 B2 | 6/2024 | Batsakis et al. |
| 12,072,939 B1 | 8/2024 | Batsakis et al. |
| 12,093,272 B1 | 9/2024 | Batsakis et al. |
| 12,118,009 B2 | 10/2024 | Bhattacharjee et al. |
| 2001/0016821 A1 | 8/2001 | DeBusk et al. |
| 2002/0070968 A1 | 6/2002 | Austin et al. |
| 2002/0112123 A1 | 8/2002 | Becker et al. |
| 2002/0138471 A1 | 9/2002 | Dutta et al. |
| 2002/0152299 A1 | 10/2002 | Traversat et al. |
| 2002/0198869 A1 | 12/2002 | Barnett |
| 2003/0014403 A1 | 1/2003 | Chandrasekar et al. |
| 2003/0066033 A1 | 4/2003 | Direen et al. |
| 2003/0106015 A1 | 6/2003 | Chu et al. |
| 2003/0120682 A1 | 6/2003 | Bestgen et al. |
| 2003/0120723 A1 | 6/2003 | Bright et al. |
| 2003/0130993 A1 | 7/2003 | Mendelevitch et al. |
| 2003/0154238 A1 | 8/2003 | Murphy et al. |
| 2003/0167270 A1 | 9/2003 | Werme et al. |
| 2003/0188198 A1 | 10/2003 | Holdsworth et al. |
| 2003/0229620 A1 | 12/2003 | Carlson et al. |
| 2004/0122845 A1 | 5/2004 | Lohman et al. |
| 2004/0117345 A1 | 6/2004 | Bamford et al. |
| 2004/0143604 A1 | 7/2004 | Glenner et al. |
| 2004/0230571 A1 | 11/2004 | Robertson |
| 2005/0022047 A1 | 1/2005 | Chandrasekaran |
| 2005/0027796 A1 | 2/2005 | San Andres et al. |
| 2005/0066027 A1 | 3/2005 | Hakiel et al. |
| 2005/0102325 A1 | 5/2005 | Gould et al. |
| 2005/0192937 A1 | 9/2005 | Barsness et al. |
| 2005/0289232 A1 | 12/2005 | Ebert |
| 2006/0026211 A1 | 2/2006 | Potteiger |
| 2006/0074916 A1 | 4/2006 | Beary |
| 2006/0155720 A1 | 7/2006 | Feinberg |
| 2006/0161560 A1 | 7/2006 | Khandelwal et al. |
| 2006/0173993 A1 | 8/2006 | Henseler et al. |
| 2006/0184998 A1 | 8/2006 | Smith et al. |
| 2006/0212607 A1 | 9/2006 | Riethmuller |
| 2006/0224587 A1 | 10/2006 | Zamir et al. |
| 2006/0224603 A1 | 10/2006 | Correll |
| 2006/0248045 A1 | 11/2006 | Toledano et al. |
| 2006/0259460 A1 | 11/2006 | Zurek et al. |
| 2006/0271504 A1 | 11/2006 | Anderson et al. |
| 2007/0033155 A1 | 2/2007 | Landsman |
| 2007/0050328 A1 | 3/2007 | Li et al. |
| 2007/0100873 A1 | 5/2007 | Yako et al. |
| 2007/0136311 A1 | 6/2007 | Kasten et al. |
| 2007/0143261 A1 | 6/2007 | Uppala |
| 2007/0156842 A1 | 7/2007 | Vermeulen et al. |
| 2007/0168336 A1 | 7/2007 | Ransil et al. |
| 2007/0168656 A1 | 7/2007 | Paganetti et al. |
| 2007/0198641 A1 | 8/2007 | Dorai et al. |
| 2007/0208669 A1 | 9/2007 | Rivette et al. |
| 2007/0233672 A1 | 10/2007 | Sanfacon et al. |
| 2007/0283194 A1 | 12/2007 | Villella et al. |
| 2008/0010337 A1 | 1/2008 | Hayes et al. |
| 2008/0033927 A1 | 2/2008 | Richards et al. |
| 2008/0065591 A1 | 3/2008 | Guzenda |
| 2008/0071755 A1 | 3/2008 | Barsness et al. |
| 2008/0114730 A1* | 5/2008 | Larimore ............ G06F 16/3331 707/E17.069 |
| 2008/0133235 A1 | 6/2008 | Simoneau et al. |
| 2008/0162592 A1 | 7/2008 | Huang et al. |
| 2008/0172357 A1 | 7/2008 | Rechis et al. |
| 2008/0192280 A1 | 8/2008 | Masuyama et al. |
| 2008/0208844 A1 | 8/2008 | Jenkins |
| 2008/0215546 A1 | 9/2008 | Baum et al. |
| 2008/0275857 A1 | 11/2008 | Dettinger et al. |
| 2008/0294660 A1 | 11/2008 | Patterson et al. |
| 2008/0300835 A1 | 12/2008 | Hixon |
| 2009/0006148 A1 | 1/2009 | Bacalski et al. |
| 2009/0006527 A1 | 1/2009 | Gingell et al. |
| 2009/0007125 A1 | 1/2009 | Barsness et al. |
| 2009/0125526 A1 | 5/2009 | Neufeld |
| 2009/0129163 A1 | 5/2009 | Danilak |

(56) References Cited

U.S. PATENT DOCUMENTS

| | | |
|---|---|---|
| 2009/0132488 A1 | 5/2009 | Wehrmeister et al. |
| 2009/0183162 A1 | 7/2009 | Kindel et al. |
| 2009/0193042 A1 | 7/2009 | Hornibrook et al. |
| 2009/0204551 A1 | 8/2009 | Wang et al. |
| 2009/0216781 A1 | 8/2009 | Chauvet et al. |
| 2009/0234799 A1 | 9/2009 | Betawadkar-Norwood et al. |
| 2009/0248764 A1 | 10/2009 | Day et al. |
| 2009/0284530 A1 | 11/2009 | Lester et al. |
| 2009/0292810 A1 | 11/2009 | Hotta et al. |
| 2009/0327242 A1 | 12/2009 | Brown et al. |
| 2010/0005056 A1 | 1/2010 | Bayliss |
| 2010/0005134 A1 | 1/2010 | Zamir et al. |
| 2010/0005151 A1 | 1/2010 | Gokhale |
| 2010/0011031 A1 | 1/2010 | Huang et al. |
| 2010/0011252 A1 | 1/2010 | Rivoir |
| 2010/0106934 A1 | 4/2010 | Calder et al. |
| 2010/0125565 A1 | 5/2010 | Burger et al. |
| 2010/0153285 A1 | 6/2010 | Anderson et al. |
| 2010/0153375 A1 | 6/2010 | Bilas et al. |
| 2010/0153431 A1 | 6/2010 | Burger |
| 2010/0199042 A1 | 8/2010 | Bates et al. |
| 2010/0229108 A1 | 9/2010 | Gerson et al. |
| 2010/0262740 A1 | 10/2010 | Borchers et al. |
| 2010/0332461 A1 | 12/2010 | Friedman et al. |
| 2011/0047169 A1 | 2/2011 | Leighton et al. |
| 2011/0055231 A1 | 3/2011 | Huck et al. |
| 2011/0060887 A1 | 3/2011 | Thatcher et al. |
| 2011/0078133 A1 | 3/2011 | Bordawekar et al. |
| 2011/0093491 A1 | 4/2011 | Zabback et al. |
| 2011/0099500 A1 | 4/2011 | Smith et al. |
| 2011/0125745 A1 | 5/2011 | Bright |
| 2011/0131200 A1 | 6/2011 | Zhou et al. |
| 2011/0173184 A1 | 7/2011 | Kelshikar et al. |
| 2011/0191373 A1 | 8/2011 | Botros et al. |
| 2011/0196804 A1 | 8/2011 | Sutter et al. |
| 2011/0213765 A1 | 9/2011 | Cui et al. |
| 2011/0213778 A1 | 9/2011 | Hess et al. |
| 2011/0213870 A1 | 9/2011 | Cai et al. |
| 2011/0225192 A1 | 9/2011 | Imig et al. |
| 2011/0231858 A1 | 9/2011 | Sampathkumar et al. |
| 2011/0246294 A1 | 10/2011 | Robb et al. |
| 2011/0289163 A1 | 11/2011 | Edwards et al. |
| 2011/0295838 A1 | 12/2011 | Collins et al. |
| 2011/0295968 A1 | 12/2011 | Takaoka et al. |
| 2011/0320550 A1 | 12/2011 | Lawson et al. |
| 2012/0005308 A1 | 1/2012 | Cok |
| 2012/0066205 A1 | 3/2012 | Chappell et al. |
| 2012/0078869 A1 | 3/2012 | Bellville et al. |
| 2012/0078881 A1 | 3/2012 | Crump et al. |
| 2012/0078975 A1 | 3/2012 | Chen et al. |
| 2012/0079004 A1 | 3/2012 | Herman |
| 2012/0130986 A1 | 5/2012 | Abdellatif et al. |
| 2012/0130988 A1 | 5/2012 | Nica et al. |
| 2012/0130997 A1 | 5/2012 | Risvik et al. |
| 2012/0143873 A1 | 6/2012 | Saadat |
| 2012/0150819 A1 | 6/2012 | Lindahl et al. |
| 2012/0166440 A1 | 6/2012 | Shmueli et al. |
| 2012/0173728 A1 | 7/2012 | Haskins et al. |
| 2012/0197856 A1 | 8/2012 | Banka et al. |
| 2012/0197934 A1 | 8/2012 | Zhang et al. |
| 2012/0226712 A1 | 9/2012 | Vermeulen et al. |
| 2012/0254269 A1 | 10/2012 | Carmichael |
| 2012/0278346 A1 | 11/2012 | Han et al. |
| 2012/0310916 A1 | 12/2012 | Abadi et al. |
| 2012/0331010 A1* | 12/2012 | Christie ................ G06F 16/27 707/802 |
| 2013/0018868 A1 | 1/2013 | Chi et al. |
| 2013/0054649 A1 | 2/2013 | Potapov et al. |
| 2013/0060783 A1 | 3/2013 | Baum et al. |
| 2013/0066674 A1 | 3/2013 | Vasters |
| 2013/0067564 A1 | 3/2013 | Fok Ah Chuen et al. |
| 2013/0084826 A1 | 4/2013 | Mo et al. |
| 2013/0086040 A1 | 4/2013 | Patadia et al. |
| 2013/0091119 A1* | 4/2013 | Huang ............... G06F 16/24535 707/736 |
| 2013/0097139 A1 | 4/2013 | Thoresen et al. |
| 2013/0110828 A1 | 5/2013 | Meyerzon et al. |
| 2013/0132392 A1 | 5/2013 | Kenedy et al. |
| 2013/0138626 A1 | 5/2013 | Delafranier et al. |
| 2013/0159251 A1 | 6/2013 | Skrenta et al. |
| 2013/0159324 A1 | 6/2013 | Xu et al. |
| 2013/0166502 A1 | 6/2013 | Walkauskas |
| 2013/0173160 A1 | 7/2013 | Meisels et al. |
| 2013/0173662 A1 | 7/2013 | Kaplinger et al. |
| 2013/0198475 A1 | 8/2013 | Serlet et al. |
| 2013/0204991 A1 | 8/2013 | Skjolsvold et al. |
| 2013/0212165 A1 | 8/2013 | Vermeulen et al. |
| 2013/0226971 A1 | 8/2013 | Shoolman et al. |
| 2013/0232187 A1 | 9/2013 | Workman et al. |
| 2013/0238663 A1 | 9/2013 | Mead et al. |
| 2013/0238706 A1 | 9/2013 | Desai |
| 2013/0246373 A1 | 9/2013 | Hansma et al. |
| 2013/0246608 A1 | 9/2013 | Liu et al. |
| 2013/0254761 A1 | 9/2013 | Reddy et al. |
| 2013/0311488 A1 | 11/2013 | Erdogan et al. |
| 2013/0318236 A1 | 11/2013 | Coates et al. |
| 2013/0318536 A1 | 11/2013 | Fletcher et al. |
| 2013/0325850 A1 | 12/2013 | Redmond et al. |
| 2013/0339298 A1 | 12/2013 | Muller et al. |
| 2013/0339567 A1 | 12/2013 | Carpentier et al. |
| 2014/0052733 A1 | 2/2014 | Blank, Jr. et al. |
| 2014/0067759 A1 | 3/2014 | Aguilera et al. |
| 2014/0067792 A1 | 3/2014 | Erdogan et al. |
| 2014/0068343 A1 | 3/2014 | Nakajima et al. |
| 2014/0074810 A1 | 3/2014 | Wang et al. |
| 2014/0089511 A1 | 3/2014 | McLean |
| 2014/0095470 A1 | 4/2014 | Chen et al. |
| 2014/0122117 A1 | 5/2014 | Masarie, Jr. et al. |
| 2014/0129515 A1 | 5/2014 | Venkatesan et al. |
| 2014/0149355 A1 | 5/2014 | Gupta et al. |
| 2014/0156642 A1 | 6/2014 | Johnson et al. |
| 2014/0180651 A1 | 6/2014 | Lysak et al. |
| 2014/0181373 A1 | 6/2014 | George et al. |
| 2014/0188841 A1 | 7/2014 | Sun et al. |
| 2014/0188885 A1 | 7/2014 | Kulkarni et al. |
| 2014/0189858 A1 | 7/2014 | Chen et al. |
| 2014/0195558 A1 | 7/2014 | Murthy et al. |
| 2014/0214799 A1 | 7/2014 | Li et al. |
| 2014/0214811 A1 | 7/2014 | Aramaki |
| 2014/0236889 A1 | 8/2014 | Vasan et al. |
| 2014/0236890 A1 | 8/2014 | Vasan et al. |
| 2014/0244585 A1 | 8/2014 | Sivasubramanian et al. |
| 2014/0258295 A1 | 9/2014 | Wang et al. |
| 2014/0278652 A1 | 9/2014 | Joyner et al. |
| 2014/0280021 A1 | 9/2014 | Singamshetty |
| 2014/0289414 A1 | 9/2014 | Chan et al. |
| 2014/0317084 A1 | 10/2014 | Chaudhry et al. |
| 2014/0324862 A1 | 10/2014 | Bingham et al. |
| 2014/0359598 A1 | 12/2014 | Oliver et al. |
| 2014/0379691 A1 | 12/2014 | Teletia et al. |
| 2014/0380322 A1 | 12/2014 | Ailamaki et al. |
| 2015/0019537 A1 | 1/2015 | Neels et al. |
| 2015/0039641 A1 | 2/2015 | Neeman et al. |
| 2015/0039650 A1 | 2/2015 | Andrews et al. |
| 2015/0039757 A1 | 2/2015 | Petersen et al. |
| 2015/0049163 A1 | 2/2015 | Smurro |
| 2015/0052125 A1 | 2/2015 | Ellis et al. |
| 2015/0058293 A1 | 2/2015 | Kobayashi et al. |
| 2015/0074819 A1 | 3/2015 | Borenstein |
| 2015/0095570 A1 | 4/2015 | Lee |
| 2015/0100412 A1 | 4/2015 | Sterns et al. |
| 2015/0100616 A1 | 4/2015 | Imamura |
| 2015/0112966 A1 | 4/2015 | Tokuda et al. |
| 2015/0113162 A1 | 4/2015 | Chan et al. |
| 2015/0120684 A1 | 4/2015 | Bawaskar et al. |
| 2015/0134795 A1 | 5/2015 | Theimer et al. |
| 2015/0134796 A1 | 5/2015 | Theimer et al. |
| 2015/0149440 A1 | 5/2015 | Bornea et al. |
| 2015/0149501 A1 | 5/2015 | Prakash et al. |
| 2015/0149507 A1 | 5/2015 | Imaki |
| 2015/0149509 A1 | 5/2015 | Leu et al. |
| 2015/0149879 A1 | 5/2015 | Miller et al. |
| 2015/0161211 A1 | 6/2015 | Patel et al. |
| 2015/0161237 A1 | 6/2015 | Agarwal et al. |

(56) References Cited

U.S. PATENT DOCUMENTS

| | | |
|---|---|---|
| 2015/0161239 A1 | 6/2015 | Stepinski et al. |
| 2015/0169684 A1 | 6/2015 | Li et al. |
| 2015/0169686 A1 | 6/2015 | Eliás et al. |
| 2015/0169786 A1 | 6/2015 | Jerzak et al. |
| 2015/0172148 A1 | 6/2015 | Ishida et al. |
| 2015/0180891 A1 | 6/2015 | Seward et al. |
| 2015/0188969 A1 | 7/2015 | Boshev et al. |
| 2015/0189033 A1 | 7/2015 | Han et al. |
| 2015/0199267 A1 | 7/2015 | Oh et al. |
| 2015/0199347 A1 | 7/2015 | Shnitko et al. |
| 2015/0207857 A1 | 7/2015 | Horton |
| 2015/0213631 A1 | 7/2015 | Vander Broek |
| 2015/0220601 A1 | 8/2015 | Leyba |
| 2015/0227624 A1 | 8/2015 | Busch et al. |
| 2015/0234682 A1 | 8/2015 | Dageville et al. |
| 2015/0244795 A1 | 8/2015 | Cantwell et al. |
| 2015/0254245 A1 | 9/2015 | Marais et al. |
| 2015/0254346 A1 | 9/2015 | Chang et al. |
| 2015/0295796 A1 | 10/2015 | Hsiao et al. |
| 2015/0295848 A1 | 10/2015 | Vlachogiannis et al. |
| 2015/0304879 A1 | 10/2015 | daCosta |
| 2015/0319256 A1 | 11/2015 | Casey |
| 2015/0324433 A1 | 11/2015 | Duffy et al. |
| 2015/0339312 A1 | 11/2015 | Lin et al. |
| 2015/0339357 A1 | 11/2015 | Carasso et al. |
| 2015/0341212 A1 | 11/2015 | Hsiao et al. |
| 2015/0347443 A1 | 12/2015 | Reid et al. |
| 2015/0347993 A1 | 12/2015 | Redmond et al. |
| 2015/0356153 A1 | 12/2015 | Schoening |
| 2015/0358433 A1 | 12/2015 | Parthasarathy et al. |
| 2015/0381725 A1 | 12/2015 | Haapaoja et al. |
| 2016/0026438 A1 | 1/2016 | Wolfram |
| 2016/0026684 A1 | 1/2016 | Mukherjee et al. |
| 2016/0027041 A1 | 1/2016 | Zhong et al. |
| 2016/0042039 A1 | 2/2016 | Kaufmann et al. |
| 2016/0044108 A1 | 2/2016 | Vermeulen et al. |
| 2016/0048408 A1 | 2/2016 | Madhu et al. |
| 2016/0050129 A1 | 2/2016 | Hoyne |
| 2016/0050261 A1 | 2/2016 | McDaid et al. |
| 2016/0055184 A1 | 2/2016 | Fokoue-Nkoutche et al. |
| 2016/0063037 A1 | 3/2016 | Savkli |
| 2016/0063209 A1 | 3/2016 | Malaviya |
| 2016/0070750 A1 | 3/2016 | Beutlberger et al. |
| 2016/0085639 A1 | 3/2016 | Abouzour et al. |
| 2016/0085810 A1 | 3/2016 | de Castro Alves et al. |
| 2016/0087880 A1 | 3/2016 | Shalita et al. |
| 2016/0092493 A1 | 3/2016 | Ko et al. |
| 2016/0092541 A1 | 3/2016 | Liu et al. |
| 2016/0092558 A1 | 3/2016 | Ago et al. |
| 2016/0092570 A1 | 3/2016 | Ago et al. |
| 2016/0092588 A1 | 3/2016 | Li |
| 2016/0110109 A1 | 4/2016 | Cowling et al. |
| 2016/0112531 A1 | 4/2016 | Milton et al. |
| 2016/0117129 A1 | 4/2016 | Shrader et al. |
| 2016/0117373 A1 | 4/2016 | Dang et al. |
| 2016/0139849 A1 | 5/2016 | Chaw et al. |
| 2016/0140174 A1 | 5/2016 | Weyerhaeuser et al. |
| 2016/0140196 A1 | 5/2016 | Kobayashi et al. |
| 2016/0150002 A1 | 5/2016 | Hildrum et al. |
| 2016/0156579 A1 | 6/2016 | Kaufmann |
| 2016/0162478 A1 | 6/2016 | Blassin et al. |
| 2016/0170987 A1 | 6/2016 | Kesselman |
| 2016/0180557 A1 | 6/2016 | Yousaf et al. |
| 2016/0188669 A1 | 6/2016 | Duffy et al. |
| 2016/0188742 A1 | 6/2016 | Ingvoldstad et al. |
| 2016/0203135 A1 | 7/2016 | Bhattacharjee et al. |
| 2016/0210340 A1 | 7/2016 | Cai et al. |
| 2016/0212007 A1 | 7/2016 | Alatorre et al. |
| 2016/0253361 A1 | 9/2016 | Nguyen et al. |
| 2016/0283511 A1 | 9/2016 | Fokoue-Nkoutche et al. |
| 2016/0283528 A1 | 9/2016 | Benke et al. |
| 2016/0286013 A1 | 9/2016 | Yu et al. |
| 2016/0291942 A1 | 10/2016 | Hutchison |
| 2016/0292166 A1 | 10/2016 | Russell |
| 2016/0306849 A1 | 10/2016 | Curino et al. |
| 2016/0316014 A1 | 10/2016 | Radu et al. |
| 2016/0335062 A1 | 11/2016 | Teodorescu et al. |
| 2016/0335352 A1 | 11/2016 | Teodorescu et al. |
| 2016/0343093 A1 | 11/2016 | Riland et al. |
| 2016/0357828 A1 | 12/2016 | Tobin et al. |
| 2016/0364093 A1 | 12/2016 | Denton et al. |
| 2016/0364424 A1 | 12/2016 | Chang et al. |
| 2016/0371356 A1 | 12/2016 | Lee et al. |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0011039 A1 | 1/2017 | Spaulding et al. |
| 2017/0012909 A1 | 1/2017 | Lieu |
| 2017/0024390 A1 | 1/2017 | Vuppala et al. |
| 2017/0024912 A1 | 1/2017 | de Castro Alves et al. |
| 2017/0026441 A1 | 1/2017 | Moudy et al. |
| 2017/0031599 A1 | 2/2017 | Bowman et al. |
| 2017/0031937 A1 | 2/2017 | Bowman et al. |
| 2017/0031988 A1 | 2/2017 | Sun et al. |
| 2017/0034023 A1 | 2/2017 | Nickolov et al. |
| 2017/0039239 A1 | 2/2017 | Saadat-Panah et al. |
| 2017/0046374 A1 | 2/2017 | Fletcher et al. |
| 2017/0046445 A1 | 2/2017 | Cormier et al. |
| 2017/0060903 A1 | 3/2017 | Botea et al. |
| 2017/0061286 A1 | 3/2017 | Kumar et al. |
| 2017/0068678 A1 | 3/2017 | Tripathi et al. |
| 2017/0083368 A1 | 3/2017 | Bishop et al. |
| 2017/0083386 A1 | 3/2017 | Wing et al. |
| 2017/0083588 A1 | 3/2017 | Lang et al. |
| 2017/0097957 A1 | 4/2017 | Bourbonnais et al. |
| 2017/0103116 A1 | 4/2017 | Hu et al. |
| 2017/0111675 A1 | 4/2017 | Song et al. |
| 2017/0116289 A1 | 4/2017 | Deshmukh et al. |
| 2017/0124151 A1 | 5/2017 | Ji et al. |
| 2017/0147224 A1 | 5/2017 | Kumar et al. |
| 2017/0147640 A1 | 5/2017 | Gaza et al. |
| 2017/0149624 A1 | 5/2017 | Chitti et al. |
| 2017/0149625 A1 | 5/2017 | Chitti et al. |
| 2017/0154057 A1 | 6/2017 | Wu et al. |
| 2017/0169336 A1 | 6/2017 | Singhal et al. |
| 2017/0170990 A1 | 6/2017 | Gaddehosur et al. |
| 2017/0177697 A1 | 6/2017 | Lee et al. |
| 2017/0178253 A1 | 6/2017 | Koufogiannakis et al. |
| 2017/0180289 A1 | 6/2017 | Chiappone et al. |
| 2017/0185574 A1 | 6/2017 | Fern et al. |
| 2017/0185648 A1 | 6/2017 | Kavulya et al. |
| 2017/0199910 A1 | 7/2017 | Konik et al. |
| 2017/0213257 A1 | 7/2017 | Murugesan et al. |
| 2017/0219357 A1 | 8/2017 | Pfeifle |
| 2017/0220685 A1 | 8/2017 | Yan et al. |
| 2017/0228257 A1 | 8/2017 | Dong et al. |
| 2017/0228460 A1 | 8/2017 | Amel et al. |
| 2017/0242630 A1 | 8/2017 | Kephart et al. |
| 2017/0243132 A1 | 8/2017 | Sainani et al. |
| 2017/0255790 A1 | 9/2017 | Barrett et al. |
| 2017/0262551 A1 | 9/2017 | Cho et al. |
| 2017/0286507 A1 | 10/2017 | Hosogi et al. |
| 2017/0286518 A1 | 10/2017 | Horowitz et al. |
| 2017/0300536 A1 | 10/2017 | Gupta et al. |
| 2017/0300702 A1 | 10/2017 | Tegegne et al. |
| 2017/0308573 A1 | 10/2017 | Brisebois et al. |
| 2017/0329543 A1 | 11/2017 | Slater et al. |
| 2017/0344609 A1 | 11/2017 | Wadley et al. |
| 2017/0373935 A1 | 12/2017 | Subramanian et al. |
| 2018/0004745 A1 | 1/2018 | Finkelstein et al. |
| 2018/0011655 A1 | 1/2018 | Gredler et al. |
| 2018/0032478 A1 | 2/2018 | Felderman et al. |
| 2018/0032570 A1 | 2/2018 | Miller et al. |
| 2018/0046503 A1 | 2/2018 | Feng et al. |
| 2018/0052765 A1 | 2/2018 | Imbierski |
| 2018/0060325 A1 | 3/2018 | Taylor et al. |
| 2018/0060389 A1 | 3/2018 | Hwang |
| 2018/0060395 A1 | 3/2018 | Pathak et al. |
| 2018/0060399 A1 | 3/2018 | Lee et al. |
| 2018/0060586 A1 | 3/2018 | Xiao et al. |
| 2018/0075097 A1 | 3/2018 | Hwang |
| 2018/0081579 A1 | 3/2018 | Verrilli et al. |
| 2018/0081941 A1 | 3/2018 | Foebel et al. |
| 2018/0089265 A1 | 3/2018 | Gerard |

(56) References Cited

U.S. PATENT DOCUMENTS

| | | |
|---|---|---|
| 2018/0089267 A1 | 3/2018 | Hatem et al. |
| 2018/0089272 A1 | 3/2018 | Bath et al. |
| 2018/0089276 A1 | 3/2018 | Victor et al. |
| 2018/0089324 A1 | 3/2018 | Pal et al. |
| 2018/0113902 A1 | 4/2018 | Chen et al. |
| 2018/0121426 A1 | 5/2018 | Barsness et al. |
| 2018/0123918 A1 | 5/2018 | Steinhauser et al. |
| 2018/0157711 A1 | 6/2018 | Lee |
| 2018/0159782 A1 | 6/2018 | Madan et al. |
| 2018/0165331 A1 | 6/2018 | Zhang et al. |
| 2018/0173753 A1 | 6/2018 | Pei et al. |
| 2018/0173759 A1 | 6/2018 | Barsness et al. |
| 2018/0205672 A1 | 7/2018 | Dong et al. |
| 2018/0218017 A1 | 8/2018 | Milrud |
| 2018/0218045 A1 | 8/2018 | Pal et al. |
| 2018/0225095 A1 | 8/2018 | Kamalakantha et al. |
| 2018/0285417 A1 | 10/2018 | Lazovic et al. |
| 2018/0307735 A1 | 10/2018 | Thayer et al. |
| 2018/0322017 A1 | 11/2018 | Maccanti et al. |
| 2018/0322168 A1 | 11/2018 | Levine et al. |
| 2018/0348715 A1 | 12/2018 | Bandaru et al. |
| 2018/0349095 A1 | 12/2018 | Wu et al. |
| 2018/0373756 A1 | 12/2018 | Madala |
| 2019/0005044 A1* | 1/2019 | Bell ............... G06F 16/353 |
| 2019/0028571 A1 | 1/2019 | Tomiyama |
| 2019/0050579 A1 | 1/2019 | Abraham et al. |
| 2019/0042146 A1 | 2/2019 | Wysoczanski et al. |
| 2019/0065278 A1 | 2/2019 | Jeuk et al. |
| 2019/0065553 A1 | 2/2019 | Young et al. |
| 2019/0095241 A1 | 3/2019 | Ago et al. |
| 2019/0098106 A1 | 3/2019 | Mungel et al. |
| 2019/0109848 A1 | 4/2019 | Clark et al. |
| 2019/0138642 A1 | 5/2019 | Pal et al. |
| 2019/0229924 A1 | 7/2019 | Chhabra et al. |
| 2019/0236182 A1 | 8/2019 | Tiyyagura et al. |
| 2019/0236203 A1 | 8/2019 | De Boer |
| 2019/0294344 A1 | 9/2019 | Hahn et al. |
| 2019/0340291 A1 | 11/2019 | Raman et al. |
| 2019/0349426 A1 | 11/2019 | Smith et al. |
| 2019/0379650 A1 | 12/2019 | Hale et al. |
| 2020/0050586 A1 | 2/2020 | Pal et al. |
| 2020/0050607 A1 | 2/2020 | Pal et al. |
| 2020/0050612 A1 | 2/2020 | Bhattacharjee et al. |
| 2020/0057818 A1 | 2/2020 | Kim |
| 2020/0082010 A1* | 3/2020 | Bodziony ............ G06F 16/256 |
| 2020/0133916 A1 | 4/2020 | Liao et al. |
| 2020/0301941 A1 | 9/2020 | Wilson et al. |
| 2020/0327252 A1 | 10/2020 | McFall et al. |
| 2020/0364141 A1 | 11/2020 | Shinha et al. |
| 2020/0364279 A1 | 11/2020 | Pal et al. |
| 2020/0401591 A1 | 12/2020 | Bhoite et al. |
| 2020/0409948 A1 | 12/2020 | Corvinelli et al. |
| 2021/0019557 A1 | 1/2021 | Jothi et al. |
| 2021/0034623 A1 | 2/2021 | Sabhanatarajan et al. |
| 2021/0034625 A1 | 2/2021 | Shah et al. |
| 2021/0049177 A1 | 2/2021 | Bhattacharjee et al. |
| 2021/0109902 A1 | 4/2021 | Glasser |
| 2021/0149895 A1 | 5/2021 | Tran et al. |
| 2021/0224051 A1 | 7/2021 | Bequet et al. |
| 2021/0286812 A1 | 9/2021 | Neugebauer et al. |
| 2021/0294801 A1* | 9/2021 | Pal ............... G06F 16/24545 |
| 2021/0303570 A1 | 9/2021 | Kondiles et al. |
| 2021/0390103 A1 | 12/2021 | Cejudo et al. |
| 2022/0019597 A1* | 1/2022 | Takagi ............... G06F 16/25 |
| 2022/0164349 A1 | 5/2022 | Safaie et al. |
| 2022/0207084 A1 | 6/2022 | Al-Omari et al. |
| 2022/0269727 A1 | 8/2022 | Batsakis et al. |
| 2022/0327125 A1 | 10/2022 | Pal et al. |
| 2022/0327149 A1 | 10/2022 | Pal et al. |
| 2023/0072930 A1 | 3/2023 | Shah et al. |
| 2023/0130267 A1 | 4/2023 | Mukherjee et al. |
| 2023/0315757 A1 | 10/2023 | DiPalma et al. |
| 2024/0086471 A1 | 3/2024 | Pal et al. |
| 2024/0178001 A1 | 5/2024 | Li et al. |
| 2024/0220497 A1 | 7/2024 | Pal et al. |
| 2024/0256545 A1 | 8/2024 | James et al. |
| 2024/0320231 A1 | 9/2024 | Bhattacharjee et al. |

FOREIGN PATENT DOCUMENTS

| | | |
|---|---|---|
| CN | 107506447 A | 12/2017 |
| CN | 109299110 A | 2/2019 |
| CN | 109416643 A | 3/2019 |
| EP | 2453370 A1 | 5/2012 |
| EP | 3675418 | 7/2020 |
| KR | 20200004835 | 1/2020 |
| WO | WO 2007/062429 A2 | 5/2007 |
| WO | WO 2020/027867 | 2/2020 |
| WO | WO 2020/220216 | 11/2020 |

OTHER PUBLICATIONS

U.S. Appl. No. 18/888,003, filed Sep. 17, 2024, Bhattacharjee et al.

U.S. Appl. No. 18/907,894, filed Oct. 7, 2024, Arora et al.

Bakliwal S., "A Comprehensive Guide to Apache Flink Ecosystem Components," published Feb. 17, 2017; 7 pages.

Beame et al., "Communication Steps for Parallel Query Processing", PODS '13: Proceedings of the 32nd ACM SIGMOD-SIGACT-SIGAI Symposium on Principles of Database Systems; Jun. 2013, pp. 273-284.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010; 9 pages.

Carraso D., "Exploring Splunk," published by CITO Research, New York, NY, Apr. 2012; 156 pages.

Chen et al., "ParaLite: Supporting Collective Queries in Database System to Parallelize User-Defined Executable," 2012 12th IEEE/ACM International Symposium on Cluster, Clout and Grid Computing, IEEE Computer Society, pp. 474-481, May 2012.

Dayal U., "Of Nests and Trees: A Unified Approach to Processing Queries That Contain Nested Subqueries, Aggregates, and Quantifiers." Proceedings of the 13th Int'l Conference on Very Large Data Bases [VLDB], Brighton, 1987, pp. 197-208.

Di et al., "Social-optimized Win-win Resource Allocation for Self-organizing Cloud". In 2011 IEEE Int Conf on Cloud and Service Computing Dec. 12, 2011; 251-258.

Ejarque et al., "Using Semantics for Resource Allocation in Computing Service Providers". In 2008 IEEE Int Conf on Services Computing Jul. 7, 2008; 2: 583-587.

Friedman, et al., SQL/MapReduce: A Practical Approach to Self-Describing, Polymorphic, and Parallelizable Use-Defined Functions, Proc. VLDB Endow, 12 pages 1402-1413 Aug. 2009.

Gotz et al., "A methodology for interactive mining and visual analysis of clinical event patterns using electronic health record data". Journal Biomed Info. Apr. 1, 2014:48: 148-159.

Han et al., "Elastic Allocator: An Adaptive Task Scheduler for Streaming Query in the Cloud," IEEE Computer Society—2014, IEEE 8th International Symposium on Service Oriented System Engineering, pp. 284-289, 2014.

Hu et al., Dynamic Optimization of Subquery Processing in Grid Database, Third International Conference on Natural Communication, 6 pages, vol. 5, Nov. 2007.

Huang et al., "Query-aware Locality-sensitive Hashing for Approximate Nearest Neighbor Search", In Proceedings of the VLDB Endowment. Sep. 1, 2015;9(1):1-2 in 12 pages.

Hull et al., "Querying Across Languages: A Dictionary-Based Approach to Multilingual Information Retrieval." Proceedings of the 19th Annual International ACM SIGIR Conference on Research and Development in Information Retrieval Aug. 18, 1996; pp. 49-57.

Jayaram, SQLShack: "SQL Union overview, usage, and examples," https://sqlshack.com/sql/sql-sub-queries.htm. 2021, in 13 pages.

Kafka + Flink: A Practical, How-To Guide, Sep. 2, 2015 by R. Metzger; retrieved from https://www.ververica.com/blog/kafka-flink-a-practical-how-to; 13 pages.

(56) References Cited

OTHER PUBLICATIONS

Keystone Real-time Stream Processing Platform, The Netflix Tech Blog, Sep. 10, 2018, retrieved from https://netflixtechblog.com/keystone-real-time-stream-processing-platform-a3ee651812a?gi=71cc12ef6b89.

Kuo et al., "Query Expansion for Hash-based Image Object Retrieval". In Proceedings of the 17th ACM international conference on Multimedia Oct. 19, 2009 (pp. 65-74).

Limsopatham et al., "Learning to Combine Representations for Medical Records Search". SIGIR'13, Jul. 28-Aug. 1, 2013, ACM 2013; pp. 833-836.

McNamee et al., "Comparing Cross-Language Query Expansion Techniques by Degrading Translation Resources." Proceedings of the 25th Annual International ACM SIGIR Conference on Research and Development in Information Retrieval Aug. 11, 2002: pp. 159-166.

Myers W., "Skating Out the Graphics Display Pipeline". IEEE Computer Graphics & Applications, Jul. 1984;4(7): 60-65.

Nadanam et al., "QoS Evaluation for Web Services In Cloud computing," IEEE, 2012, ICCCNT'12, Jul. 26-28, 2012, Coimbatore, India.

Netflix Keystone SPaaS: Real-time Stream Processing as a Service—ABD320—re:Invent 2017 clip slide, retrieved from https://www.slideshare.net/AmazonWebServices/netflix-keystone-spaas-realtime-stream-processing-as-a-service-abd320-reinvent-2017.

Nguyen et al., "An IndexScheme for Similarity Search on Cloud Computing using MapReduce over Docker Container," IMCOM '16: Proceedings of the 10 International Conference on Ubiquitous Information Management and Communication Jan. 2016 Article No. 60 pages 1-6 9year: 2016).

Pääkkönen et al., "Reference Architecture and Classification of Technologies, Products and Services for Big Data Systems," Big Data Research vol. 2, Issue 4, Dec. 2015, pp. 166-186.

SLAML 10 Reports, Workshop On Managing Systems via Log Analysis and Machine Learning Techniques. ;login: Feb. 2011—Conference Reports—vol. 36, No. 1, pp. 104-110.

Smith et al., "Distributed Query Processing on the Grid," In Grid Computing-GRID 2002: Third International Workshop Baltimore, MD, USA, Nov. 18, 2002 Proceedings 3 2002 (pp. 279-290). Springer Verlag: Berlin/Heidelberg. (12 pages).

Splunk Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020; 17 pages.

Splunk Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020; 66 pages.

Splunk Quick Reference Guide, updated 2019, available online at https://www.splunk.com/pdfs/solution-guides/splunk-quick-reference-guide.pdf, retrieved May 20, 2020; 6 pages.

"Subqueries with the INSERT Statement," https://www.tutorialspoint.com/sql/sql-sub-queries.htm. (Mar. 8, 2021); 4 pages.

Vaid K., Workshop on Managing Systems via log Analysis and Machine Learning Techniques (SLAML '10), ;login: vol. 36, No. 1, Oct. 3, 2010, Vancouver, BC, Canada; 7 pages.

Wongsuphasawat et al., "Querying event sequences by exact match or similarity search: Design and empirical evaluation". Interacting with Computers. Mar. 1, 2012;24(2): 55-68.

Wu S., Building Stream Processing as a Service (SPaaS), retrieved from https://cdn.oreillystatic.com/en/assets/1/event/281/Building%20stream%20processing%20as%20a%20service%20at%20Netflix%20Presentation.pdf. Netflix Presentation Dec. 2017; 113 pages.

Yasu et al., Performance of Splunk for the TDAQ Information Service at the ATLAS Experiment, 2014 19th IEEE-NPSS Real Time Conference, 6 pages, May 2014.

Zhu et al., "Combining Multi-level Evidence for Medical Record Retrieval". SHB'12, Oct. 29, 2012, ACM 2012; pp. 49-56.

U.S. Appl. No. 15/967,570, filed Apr. 30, 2018, Sammer et al.
U.S. Appl. No. 15/967,582, filed Apr. 30, 2018, Batsakis et al.
U.S. Appl. No. 15/967,586, filed Apr. 30, 2018, Batsakis et al.
U.S. Appl. No. 15/967,595, filed Apr. 30, 2018, Batsakis et al.
U.S. Appl. No. 16/000,664, filed Jun. 5, 2018, Batsakis et al.
U.S. Appl. No. 16/430,983, filed Jun. 4, 2019, Pal et al.
U.S. Appl. No. 17/233,193, filed Apr. 16, 2021, Batsakis et al.
U.S. Appl. No. 17/445,701, filed Aug. 23, 2021, Batsakis et al.
U.S. Appl. No. 17/589,712, filed Jan. 31, 2022, Batsakis et al.
U.S. Appl. No. 17/661,528, filed Apr. 29, 2022, Rao B.
U.S. Appl. No. 17/661,529, filed Apr. 29, 2022, Rao B.
U.S. Appl. No. 17/816,254, filed Jul. 29, 2022, Arora et al.
U.S. Appl. No. 17/816,132, filed Jul. 29, 2022, Arora et al.
U.S. Appl. No. 18/326,802, filed May 31, 2023, Andrade et al.
U.S. Appl. No. 18/342,671, filed Jun. 27, 2023, Chawla et al.
U.S. Appl. No. 18/496,759, filed Oct. 27, 2023, Bhattacharjee et al.
U.S. Appl. No. 18/420,173, filed Jan. 23, 2024, Pal et al.
U.S. Appl. No. 18/609,798, filed Mar. 19, 2024, Pal et al.
U.S. Appl. No. 18/661,319, filed May 10, 2024, Batsakis et al.
U.S. Appl. No. 18/748,595, filed Jun. 20, 2024, Batsakis et al.
U.S. Appl. No. 18/773,273, filed Jul. 15, 2024, Batsakis et al.
U.S. Appl. No. 18/428,428, filed Jan. 31, 2024, Davis et al.
U.S. Appl. No. 18/428,372, filed Jan. 31, 2024, Davis et al.
U.S. Appl. No. 18/428,405, filed Jan. 31, 2024, Davis et al.
International Search Report and Written Opinion mailed Nov. 25, 2024 in International Application No. PCT/US2024/038253. 13 pages.

* cited by examiner

MODIFYING A QUERY FOR PROCESSING BY MULTIPLE DATA PROCESSING SYSTEMS

RELATED APPLICATIONS

Any and all applications for which a foreign or domestic priority claim is identified in the Application Data Sheet as filed with the present application are incorporated by reference under 37 CFR 1.57 and made a part of this specification. This application claims the benefit of priority of U.S. Provisional Patent Application No. 63/514,076, filed Jul. 17, 2023, and entitled "SPL QUERY EXECUTION IN SPARK," which is hereby incorporated by reference in its entirety herein.

This application is being filed concurrently with U.S. Non-Provisional patent application Ser. No. 18/428,372, filed Jan. 31, 2024, and entitled "IDENTIFYING COMPONENTS TO OBTAIN AND PROCESS DATA ACCORDING TO A QUERY," and U.S. Non-Provisional patent application Ser. No. 18/428,405, filed Jan. 31, 2024, and entitled "QUERY EXECUTION USING A DATA PROCESSING SCHEME OF A SEPARATE DATA PROCESSING SYSTEM," which are each hereby incorporated by reference in its entirety herein.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

Figure 1:
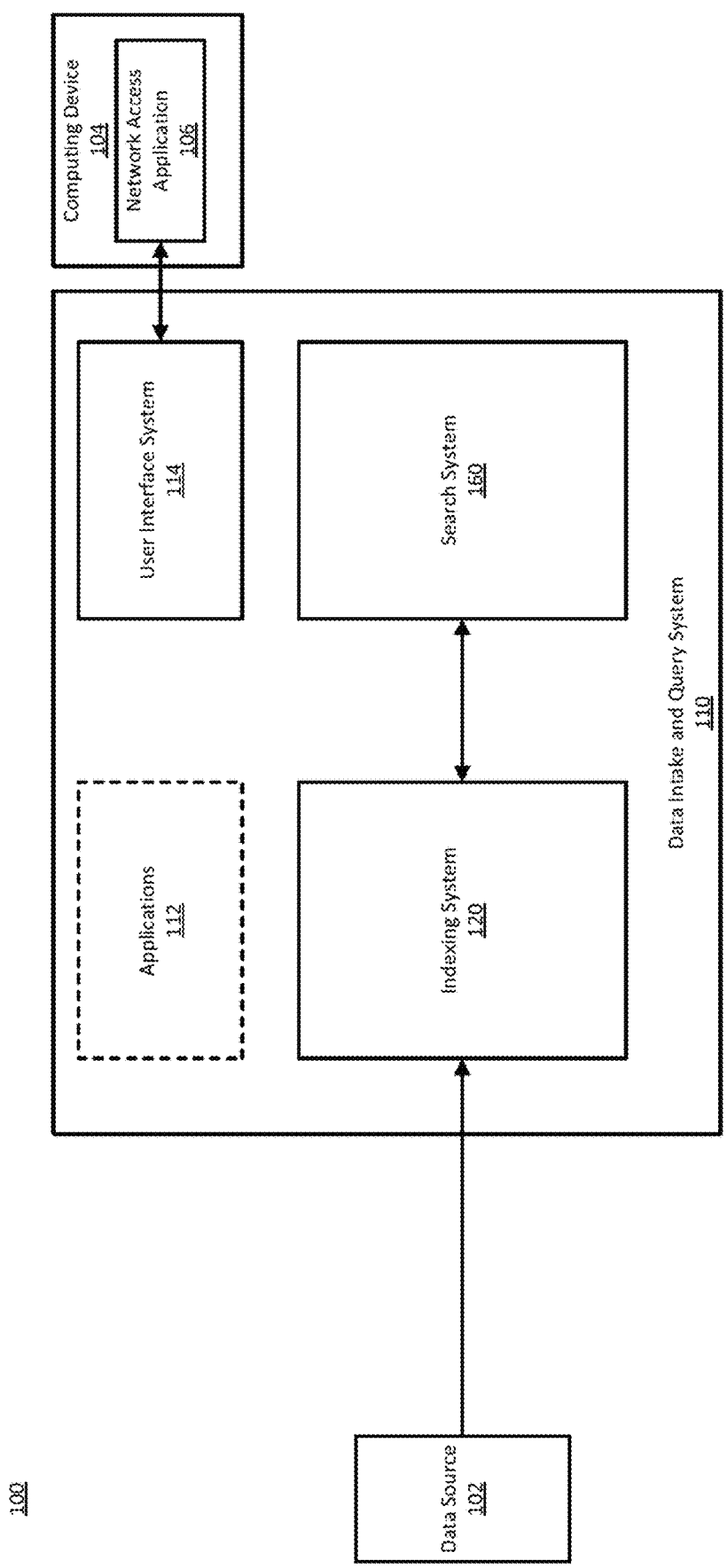
FIG. 1 is a block diagram of an example computing environment, in accordance with example embodiments.

Embodiments are described herein according to the following outline:
  1.0. GENERAL OVERVIEW
  2.0 QUERY EXECUTION VIA DATA PROCESSING SYSTEMS OVERVIEW
    2.1. ARCHITECTURE FOR QUERY EXECUTION
    2.2. EXECUTING A QUERY ACROSS MULTIPLE DATA PROCESSING SYSTEMS
    2.3. QUERY MODIFICATION FOR MULTIPLE DATA PROCESSING SYSTEMS
    2.4. COMPONENT IDENTIFICATION FOR QUERY EXECUTION
    2.5. QUERY EXECUTION ACCORDING TO DATA SEMANTICS OF A DIFFERENT DATA PROCESSING SYSTEM
  3.0. DATA PROCESSING SYSTEM ARCHITECTURE
  4.0. HARDWARE EMBODIMENT
  5.0. EXAMPLE EMBODIMENTS
  6.0. TERMINOLOGY In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment.

On the other hand, the embodiments referred to are also not necessarily mutually exclusive.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

1.0. GENERAL OVERVIEW

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include applications 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces and/or stores machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail herein, the indexing system 120 obtains machine date from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index may identify portions of the events (e.g., keywords). The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing system 120. As discussed in greater detail herein, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as keywords, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 104. In such examples, the network access application 106 can access the user interface system 114 without going over a network.

The data intake and query system 110 can optionally include applications 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
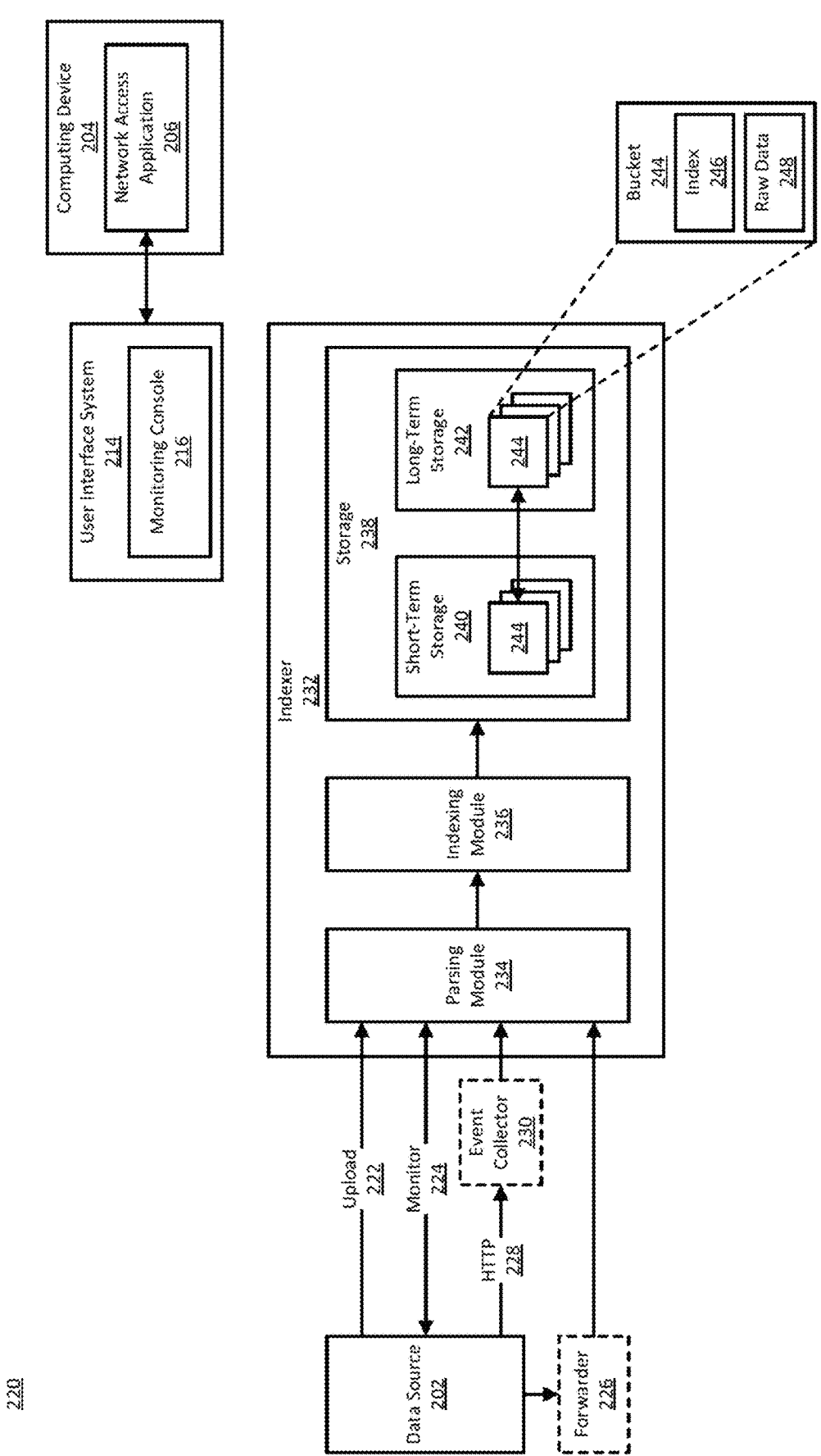
FIG. 2 is a block diagram of an example indexing system, in accordance with example embodiments.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 246 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 202; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further herein.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or maybe on the computing device where the indexer 232 is executing. Once uploading is initiated, the indexer 232 processes the file, as discussed further herein. Uploading is a manual process and occurs when instigated by a user. For automated data ingestion, the other ingestion methods are used.

The monitor 224 method enables the indexing system to monitor the data source 202 and continuously or periodically obtain data produced by the data source 202 for ingestion by the indexer 232. For example, using the monitoring console 216, a user can specify a file or directory for monitoring. In this example, the indexing system can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further herein) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executing on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and keep separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further herein) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been indexed.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes generating an index (e.g., identifying keywords associated with the generated events) based on the generated events. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated in FIG. 2 to facilitate discussion, with the understanding that implementations with other components are possible to achieve the same functionality.

The parsing module 234 determines information about incoming event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field in the event data or using machine learning techniques applied to the event data.

Other information that the parsing module 234 can determine includes timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields (key-value pairs) for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing module 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further herein, the search system can use the lexicon, which is stored in an index 246 (e.g., an index file), to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

The storage 238 may be a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 232 has access to over a network. The indexer 232 can manage more than one index and can manage indexes of different types. For example, the indexer 232 can manage event indexes, which impose minimal structure on stored data and can accommodate any type of data. As another example, the indexer 232 can manage metrics indexes, which use a highly structured format to handle the higher volume and lower latency demands associated with metrics data.

The indexing module 236 organizes files in the storage 238 in directories referred to as buckets. The files in a bucket 244 can include raw data files, indexes, and possibly also other metadata files. As used herein, "raw data" means data as when the data was produced by the data source 202, without alteration to the format or content. As noted previously, the parsing module 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index 246, which may also be referred to herein as a "time-series index" or tsidx file, contains metadata that the indexer 232 can use to search a corresponding raw data file 248. As noted above, the metadata in the index 246 includes a lexicon of the event data, which associates each unique keyword in the event data with a reference to the location of event data within the raw data file 248. The keyword data in the index 246 may also be referred to as an inverted index. In various implementations, the data intake and query system can use indexes for other purposes, such as to store data summarizations that can be used to accelerate searches.

A bucket 244 includes event data for a particular range of time. The indexing module 236 arranges buckets in the storage 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moves from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the indexer 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
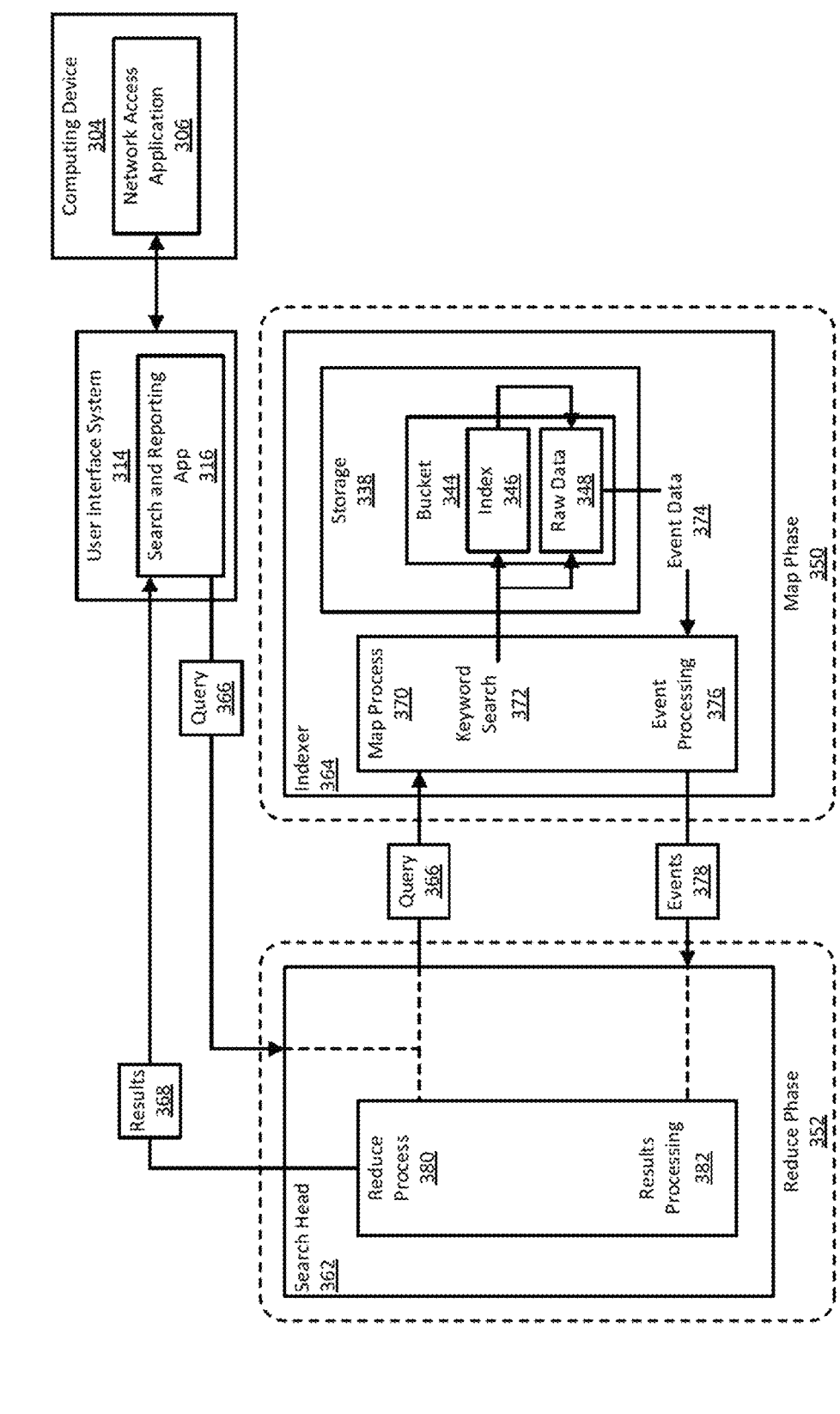
FIG. 3 is a block diagram of an example search system, in accordance with example embodiments.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to an indexer 364 (e.g., a search peer, a search node, etc.). Using a map process 370, the indexer 364 searches the appropriate storage 338 for events identified by the query 366 and sends events 378 so identified back to the search head 362. Using a reduce process 382, the search head 362 processes the events 378 and produces results 368 to respond to the query 366. The results 368 can provide useful insights about the data stored in the storage 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 maybe referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands or search terms that the indexer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("|" or "pipe") symbol.

In addition to one or more search commands, the query 366 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more indexers. In the map phase 350, the indexers locate event data that matches the search terms in the search query 366 and sorts the event data into field-value pairs. When the map phase 350 is complete, the indexers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more indexers, such as the indexer 364 illustrated in FIG. 3. "Search peer" is an alternate name for "indexer" and a search peer may be largely similar to the indexer described previously. The indexer 364 may be referred to as a "peer node" when the indexer 364 is part of an indexer cluster. The indexer 364, which may also be referred to as a search execution component, can be implemented using program code that can be executed on a computing device. In some implementations, one set of program code implements both the search head 362 and the indexer 364 such that the search head 362 and the indexer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular indexer 364. For example, the search system 360 may be configured to include multiple indexers that each have duplicative copies of at least some of the event data and are implanted using different hardware resources. In this example, the sending the search query 366 to more than one indexer allows the search system 360 to distribute the search workload across different hardware resources. As another example, search system 360 may include different indexers for different purposes (e.g., one has an index storing a first type of data or from a first data source while a second has an index storing a second type of data or from a second data source). In this example, the search query 366 may specify which indexes to search, and the search head 362 will send the query 366 to the indexers that have those indexes.

To identify events 378 to send back to the search head 362, the indexer 364 performs a map process 370 to obtain event data 374 from the storage 338 that is maintained by the indexer 364. During a first phase of the map process 370, the indexer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the indexer 364 performs a keyword search 372 using search terms specified in the search query 366. The search terms can be one or more of keywords, phrases, fields, Boolean expressions, and/or comparison expressions that in combination describe events being searched for. When segmentation is enabled at index time, the indexer 364 performs the keyword search 372 on the bucket's index 346. As noted previously, the index 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index 346 that matches a search term in the query 366, the indexer 364 can use the location references to extract from the raw data 348 file the event data 374 for each event that include the searchable term.

In cases where segmentation was disabled at index time, the indexer 364 performs the keyword search 372 directly on the raw data 348 file. To search the raw data 348, the indexer 364 may identify searchable segments in events in a similar manner as when the data was indexed. Thus, depending on how the indexer 364 is configured, the indexer 364 may look at event fields and/or parts of event fields to determine whether an event matches the query 366. Any matching events can be added to the event data 374 read from the raw data 348 file. The indexer 364 can further be configured to enable segmentation at search time, so that searching of the storage 338 causes the indexer 364 to build a lexicon in the index 346.

The event data 374 obtained from the raw data 348 file includes the full text of each event found by the keyword search 372. During a third phase of the map process 370, the indexer 364 performs event processing 376 on the event data 374, with the steps performed being determined by the configuration of the indexer 364 and/or commands in the search query 366. For example, the indexer 364 can be configured to perform field discovery and field extraction. Field discovery is a process by which the indexer 364 identifies and extracts key-value pairs from the events in the event data 374. The indexer 364 can, for example, be configured to automatically extract the first 100 fields (or another number of fields) in the event data 374 that can be identified as key-value pairs. As another example, the indexer 364 can extract any fields explicitly mentioned in the search query 366. The indexer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The indexer 364 sends processed events 378 to the search head 362, which performs a reduce process 380. The reduce process 380 potentially receives events from multiple indexers and performs various results processing 382 steps on the received events. The results processing 382 steps can include, for example, aggregating the events received from different indexers into a single set of events, deduplicating and aggregating fields discovered by different indexers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Chloropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 368. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 4:
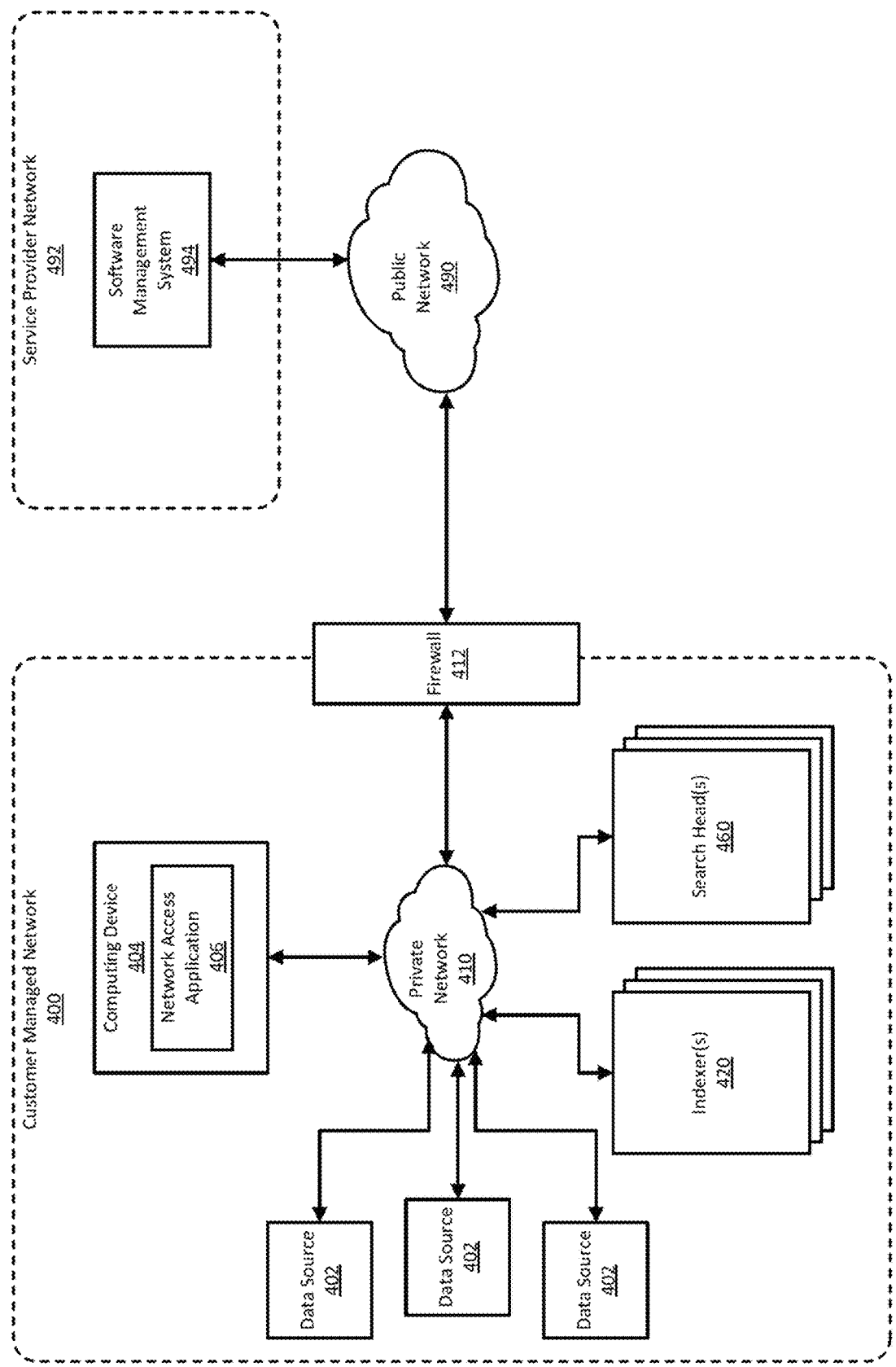
FIG. 4 is a block diagram of an example self-managed network, in accordance with example embodiments.

FIG. 4 illustrates an example of a self-managed network 400 that includes a data intake and query system. "Self-managed" in this instance means that the entity that is operating the self-managed network 400 configures, administers, maintains, and/or operates the data intake and query system using its own compute resources and people. Further, the self-managed network 400 of this example is part of the entity's on-premise network and includes a set of compute, memory, and networking resources that are located, for example, within the confines of an entity's data center. These resources can include software and hardware resources. The entity can, for example, be a company or enterprise, a school, government entity, or other entity. Since the self-managed network 400 is located within the customer's on-prem environment, such as in the entity's data center, the operation and management of the self-managed network 400, including of the resources in the self-managed network 400, is under the control of the entity. For example, administrative personnel of the entity have complete access to and control over the configuration, management, and security of the self-managed network 400 and its resources.

The self-managed network 400 can execute one or more instances of the data intake and query system. An instance of the data intake and query system may be executed by one or more computing devices that are part of the self-managed network 400. A data intake and query system instance can include an indexing system and a search system, where the indexing system includes one or more indexers 420 and the search system includes one or more search heads 460.

As depicted in FIG. 4, the self-managed network 400 can include one or more data sources 402. Data received from these data sources may be processed by an instance of the data intake and query system within self-managed network 400. The data sources 402 and the data intake and query system instance can be communicatively coupled to each other via a private network 410.

Users associated with the entity can interact with and avail themselves of the functions performed by a data intake and query system instance using computing devices. As depicted in FIG. 4, a computing device 404 can execute a network access application 406 (e.g., a web browser), that can communicate with the data intake and query system instance and with data sources 402 via the private network 410. Using the computing device 404, a user can perform various operations with respect to the data intake and query system, such as management and administration of the data intake and query system, generation of knowledge objects, and other functions. Results generated from processing performed by the data intake and query system instance may be communicated to the computing device 404 and output to the user via an output system (e.g., a screen) of the computing device 404.

The self-managed network 400 can also be connected to other networks that are outside the entity's on-premise environment/network, such as networks outside the entity's data center. Connectivity to these other external networks is controlled and regulated through one or more layers of security provided by the self-managed network 400. One or more of these security layers can be implemented using firewalls 412. The firewalls 412 form a layer of security around the self-managed network 400 and regulate the transmission of traffic from the self-managed network 400 to the other networks and from these other networks to the self-managed network 400.

Networks external to the self-managed network can include various types of networks including public networks 490, other private networks, and/or cloud networks provided by one or more cloud service providers. An example of a public network 490 is the Internet. In the example depicted in FIG. 4, the self-managed network 400 is connected to a service provider network 492 provided by a cloud service provider via the public network 490.

In some implementations, resources provided by a cloud service provider may be used to facilitate the configuration and management of resources within the self-managed network 400. For example, configuration and management of a data intake and query system instance in the self-managed network 400 may be facilitated by a software management system 494 operating in the service provider network 492. There are various ways in which the software management system 494 can facilitate the configuration and management of a data intake and query system instance within the self-managed network 400. As one example, the software management system 494 may facilitate the download of software including software updates for the data intake and query system. In this example, the software management system 494 may store information indicative of the versions of the various data intake and query system instances present in the self-managed network 400. When a software patch or upgrade is available for an instance, the software management system 494 may inform the self-managed network 400 of the patch or upgrade. This can be done via messages communicated from the software management system 494 to the self-managed network 400.

The software management system 494 may also provide simplified ways for the patches and/or upgrades to be downloaded and applied to the self-managed network 400. For example, a message communicated from the software management system 494 to the self-managed network 400 regarding a software upgrade may include a Uniform Resource Identifier (URI) that can be used by a system administrator of the self-managed network 400 to download the upgrade to the self-managed network 400. In this manner, management resources provided by a cloud service provider using the service provider network 492 and which are located outside the self-managed network 400 can be used to facilitate the configuration and management of one or more resources within the entity's on-prem environment. In some implementations, the download of the upgrades and patches may be automated, whereby the software management system 494 is authorized to, upon determining that a patch is applicable to a data intake and query system instance inside the self-managed network 400, automatically communicate the upgrade or patch to self-managed network 400 and cause it to be installed within self-managed network 400.

2.0. QUERY EXECUTION VIA DATA PROCESSING SYSTEMS OVERVIEW

A query coordinator (which may also be referred to herein as a data orchestrator) may facilitate execution of queries across multiple systems (e.g., across a first data processing system and a second data processing system). For example, the query coordinator can route the query to a first data processing system and a second data processing system. In some cases, the query coordinator can convert or translate a query from a first query language (e.g., interpretable by the first data processing system) to a second query language (e.g., interpretable by the second data processing system) and can route the converted or translated query to the second data processing system. In some cases, the query coordinator can convert or translate a query from a first query language (e.g., interpretable by the first data processing system) to a second query language (e.g., interpretable by the second data processing system) and can convert or translate the same query from the first query language to a third query language (e.g., interpretable by a third data processing system).

Such a system may prove unsatisfactory where execution of the queries across multiple data processing systems results in a data processing system executing a query for which the data processing system is not equipped to execute (e.g., execution of at least a portion of the query by the data processing system does not satisfy one or more query parameters). For example, a query parameter may indicate that, to execute at least a portion of a query, the data processing system should be capable of executing the at least a portion of the query (e.g., the data processing system should be capable of understanding, translating, executing, etc. one or more commands, functions, expressions, data, etc. associated with the query). Execution of such a portion of a query that the data processing system is not capable of understanding, translating, executing, etc. (e.g., cannot understand, translate, execute, etc.) may result in output of a null data set, an output of an error, an incomplete query execution, etc. For example, a particular command within the query (e.g., StreamStats) may not be mapped to an operation that the data processing system can execute such that execution of the query by the data processing system may cause the data processing system to output an error.

In another example, a query parameter may indicate that execution of at least a portion of the query by the data processing system should result in an execution time (e.g., query execution time), a translation time (e.g., a query translation time), and/or a resource utilization that satisfies (e.g., is less than, matches, is within, etc.) a threshold (e.g., a threshold value, a threshold range, etc.). Execution of such a query by the second data processing system that results in an execution time, a translation time, and/or a resource utilization that does not satisfy (e.g., is greater than, matches, is outside of, etc.) a threshold may result in inefficient or ineffective query execution.

In another example, a query parameter may indicate that the data processing system should be capable of processing (e.g., is trained to process, processing satisfies a threshold, etc.) data associated with the query having a particular data type (e.g., streaming data, batch data, structured data, unstructured data, etc.). Execution of such a query associated with data (e.g., batch data) that the data processing system is not capable of processing may result in an inefficient query execution.

In another example, a query parameter may indicate that the data processing system should process data according to data semantics (e.g., a data processing scheme) of a different data processing system. For example, the query parameter may indicate that the second data processing system should process data according to data semantics of the second data processing system. The data semantics may indicate a manner of execution, translation, processing, etc. of a query, a manner of generation, translation, processing, etc. of query results, a manner of translation, processing, etc. of data associated with the query, etc. by a data processing system. For example, the data semantics may indicate a manner of filtering data associated with a query, one or more field values for execution of at least a portion of the query, one or more outputs based on one or more query results, etc.

Execution of such a query by a data processing system according to data semantics of the data processing system (which may be different from data semantics of another data processing system) may result in efficiency issues and an inefficient query execution. In some cases, execution of such a query may result in an inadequate user experience as the query results provided by data processing systems may be semantically different based on the data semantics used by each data processing system.

Further, such a system may prove unsatisfactory where multiple components of the multiple data processing systems can execute at least a portion of the query. For example, such a system may prove unsatisfactory where multiple components of the first data processing system and/or the second data processing system are able to retrieve the (same) data from the (same) data sources and/or execute at least a portion of the query. Such a system may not dynamically assign the at least a portion of the query based on the query parameters. Instead, such a system may convert or translate a query and provide the query to a data processing system without identifying how to distribute the query among the multiple data processing systems that can each access the same data. Such a system may be limited to executing a query or translating a query for execution of the translated query by another data processing system while it may be more efficient for the first data processing system to optimize the query and the second data processing system to execute the optimized query. This can lead a loss in efficiency which may be undesirable as it can lead to longer search times and/or the inability to execute certain queries.

Thus, by executing queries in such a manner (e.g., by a data processing system), the system may experience a longer search time and/or an inability to execute certain queries. This may cause inadequate performance.

To address these issues, embodiments of the present disclosure relate to a system that includes a query coordinator that can receive a first query, identify (e.g., dynamically assign) a data processing system (e.g., the first data processing system, the second data processing system, a component (e.g., a search head, an indexer, etc.) of the first data processing system, a component of the second data processing system, etc.) to execute at least a portion of the first query, and define a query processing scheme (e.g., a query plan, a query command tree, query instructions, etc.) for execution of the at least a portion of the first query by the identified data processing systems.

The query coordinator can receive and process the first query to identify data associated with the first query. The query coordinator can identify components and/or data processing systems (e.g., the first data processing system, the second data processing system, etc.) that can access the same data (e.g., a same copy, version, etc. of the data at a particular data store) for execution of the first query (e.g., the first query identifying the data and a manner of processing the data). Accordingly, the query coordinator can dynamically assign a portion of the first query to any of the components and/or the data processing systems for execution and provide instructions indicating how to route an output based on the assigned portion of the first query.

In some cases, the query coordinator may identify a portion of the first query for execution by at least one of the identified components and/or data processing systems based on receiving and processing the first query. For example, the query coordinator can identify a first portion of the first query, a second portion of the first query, etc.

The query coordinator can parse the identified components and/or data processing systems and assign the first data processing system to execute a respective portion of the first query. For example, the query coordinator can receive a first query, translate the first query (e.g., from SPL1 to SPL2 to SPL2 SQL), parse the translated first query (e.g., to identify particular commands, expressions, functions, data, etc. associated with the data), identify a plurality of components and/or data processing systems, and assign the first data processing system for execution of at least a portion of the first query based on parsing the translated first query. In some cases, the query coordinator may assign the second data processing system, a third data processing system, etc. a respective portion of the first query for execution. In some cases, the query coordinator may assign a plurality of components and/or a plurality of data processing systems to each execute a respective portion of the first query.

Based on assigning the first data processing system to execute a respective portion of the first query, the query coordinator can modify the first query to indicate the first data processing system is associated with (e.g., is assigned to execute) the at least a portion of the first query.

In some cases, to modify the first query, the query coordinator can generate a query identifier (or query token)

and replace the at least a portion of the first query within the first query with the query identifier (or query token) to obtain the modified first query. For example, the query identifier may be a view-type query, a subquery identifier, a query indicator, a query placeholder, etc.

Based on the modified first query, the query coordinator can define a query processing scheme indicating that the first data processing system are to execute the at least a portion of the first query (e.g., are to obtain and process data according to the at least a portion of the first query).

In some cases, the query coordinator (or a data processing system) can identify data semantics of a data processing system (e.g., the first data processing system). The data semantics may indicate a manner of execution, translation, processing, etc. of a query, a manner of generation, translation, processing, etc. of query results, a manner of translation, processing, etc. of data associated with the query, etc. by the data processing system. For example, the data semantics may indicate that the first data processing system provides a null set of query results based on the first data processing system not executing the query, failing to execute the query, encountering an error in executing the query, etc. In another example, the data semantics may indicate that the first data processing system generates query results in a particular format (e.g., a column oriented format, a row oriented format, with one or more tags, etc.), applies one or more filters or transformations to the query results, etc.

In some cases, the query coordinator can define the query processing scheme according to the data semantics. For example, the query coordinator can define a query processing scheme indicating that the second data processing system is to process the first query (e.g., execute a particular portion of the first query) according to the data semantics of the first data processing system which may be different from the data semantics of the second data processing system based on assignment of the portion of the first query to the first data processing system. In traditional systems, as the data semantics of different data processing systems may be different, the output of such systems may be disparate such that a user experience may differ based on the particular system executing a portion of the first query which may be disadvantageous. By defining the query processing scheme according to the data semantics of a data processing system, the query coordinator can provide a uniform experience across multiple data processing systems.

The query coordinator can provide the query processing scheme to the second data processing system. In some cases, the query coordinator may identify the second data processing system for optimizing the first query based on receiving and processing the first query. The second data processing system may provide an output (e.g., one or more optimizations) to a data processing system interface and the data processing system interface may identify a second query based on the output. The data processing system interface may route the second query to the first data processing system for execution of the portion of the first query (corresponding to a portion of the second query) assigned to the first data processing system. In some cases, the second data processing system may execute at least a portion of the first query based on the query processing scheme and/or route the second query to a third data processing system for execution.

As such, the described query coordinator enables the efficient execution of queries as compared to other approaches. For example, the query coordinator can initiate the execution of queries across multiple data processing systems in an efficient manner based on a defined query processing scheme. As systems may translate queries and route the translated queries to other systems, the routing of different portions of the query to multiple data processing systems based on the query parameters of the query for execution of the respective portions of the query may not impact (e.g., increase) a time period for execution of the search process.

2.1. Architecture for Query Execution

As described herein, the query coordinator can obtain a first query and define a query processing scheme for execution of the query across multiple data processing data systems. For example, the query coordinator can obtain a first query and define a query processing scheme that indicates a first portion of the first query for execution by a first data processing system and a second portion of the first query for execution by a second data processing system.

The techniques described below can enable the execution of a first query (on a same set of data) using multiple data processing systems that may utilize different query languages, may execute queries according to different data semantics, may be optimized for execution of queries on different data (e.g., batch data v. streaming data, structured data v. unstructured data, etc.). For example, a first query language may be interpretable by a first data processing system which may use first data semantics to execute queries and a second query language may be interpretable by a second data processing system which may use second data semantics to execute queries. The query coordinator can facilitate execution of the first query using the multiple data processing systems by identifying a first data processing system to execute a portion of the first query and defining a query processing scheme that indicates the first data processing system. The query coordinator can provide the query processing scheme to a second data processing system for optimization of the first query prior to routing of a second query (e.g., an optimized first query) to the first data processing system. These techniques solve challenges of existing data processing systems in that these systems may enable queries to be executed in a more efficient manner using multiple data processing systems based on dynamic identification of the multiple data processing systems to use to process the data as part of executing a first query. Moreover, these techniques can reduce the workload at a single data processing system by identifying different portions of the first query for execution by different data processing systems.

In some cases, systems may be unable to dynamically identify particular data processing systems, dynamically identify particular portions of a query, and facilitate execution of the dynamically identified portions of the query by the dynamically identified data processing systems. As the number of diverse data processing systems (e.g., with different capabilities, different optimizations, etc.) increases, it may be beneficial for the system to dynamically identify and dynamically assign particular portions of a query to different data processing systems while also routing the query to a second data processing system for query optimization, especially where multiple data processing systems may be configured to access the data that is the subject of the query.

Figure 5:
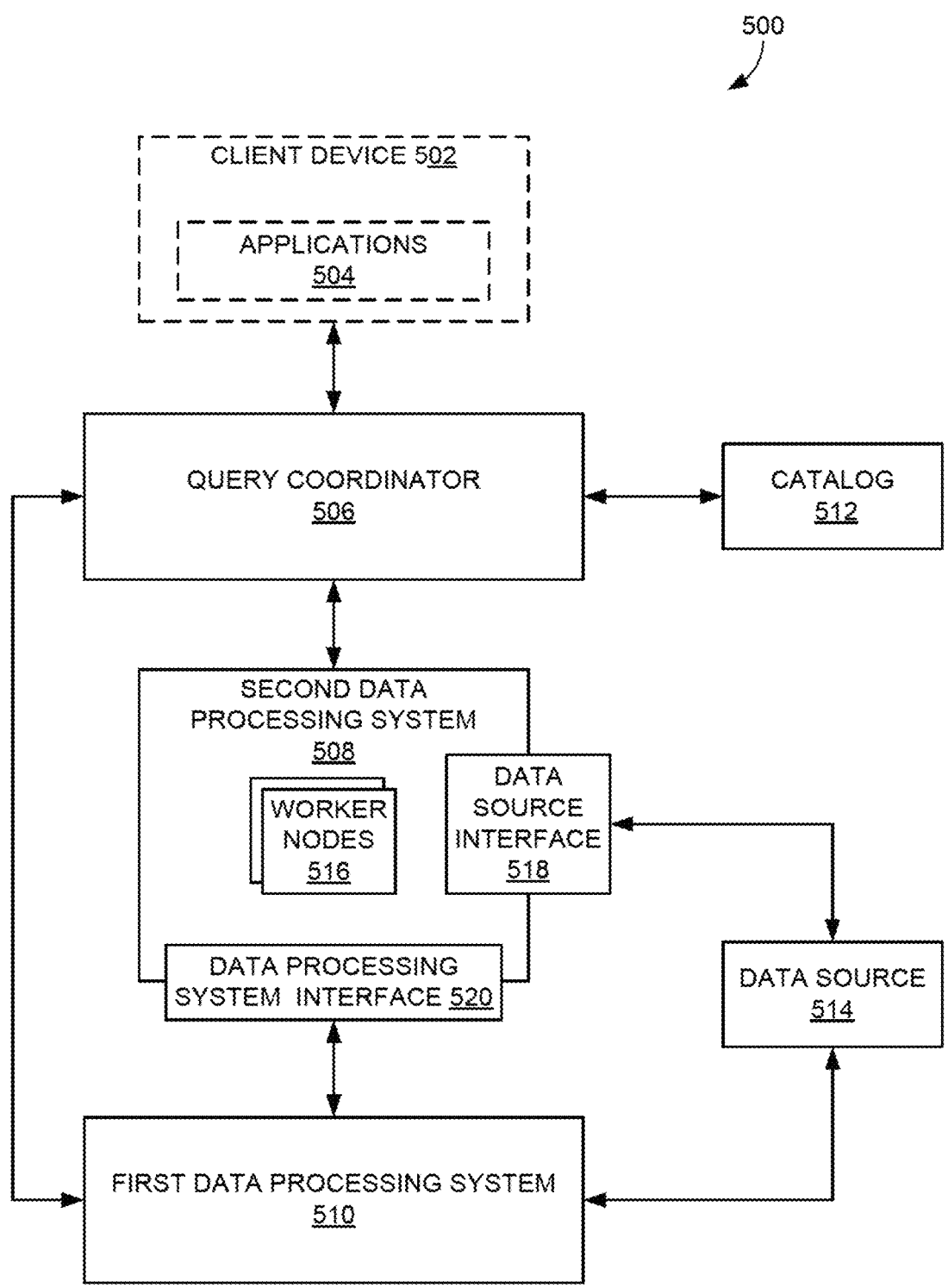
FIG. 5 is a block diagram of an example data processing system for definition of a query processing scheme based on a first query and provision of a second query according to an output based on the query processing scheme, in accordance with example embodiments.

FIG. 5 is an example of a data processing environment 500. Specifically, FIG. 5 illustrates an example environment 500 that includes a client device 502, a query coordinator 506, a second data processing system 508, a first data processing system 510, a catalog 512, and a data source 514. It will be understood that the elements illustrated in FIG. 5 are for illustrative purposes only and that the environment 500 can include fewer, more, and/or different elements. In some cases, the environment 500 may include multiple data sources, multiple catalogs, multiple second data processing systems, multiple query coordinators, multiple client devices, and/or multiple first data processing systems.

The client device 502 may be similar to and/or may include the computing device 104 as discussed with respect to FIG. 1. One or more applications 504 may run on the client device 502. For example, the one or more applications 504 may include an application to enable definition and provision of a first query to the query coordinator 506. As described herein, in some cases, the client device 502 may include a user interface system (e.g., to enable definition of the first query and/or to display query results).

The first data processing system 510 and/or the second data processing system 508 may include any data processing system. In some cases, the first data processing system 510 and/or the second data processing system 508 may be associated with different entities. For example, the second data processing system 508 may include any data processing system that may be designed, created, implemented, published, or otherwise made available from an entity that differs from an entity that designed, created, implemented, published, or otherwise made available to the first data processing system 510 as described with reference to FIGS. 10-11.

In some cases, the first data processing system 510 may be or may include one or more search heads, one or more indexers, one or more forwarders, one or more query coordinators, one or more worker nodes. In one example, the first data processing system 510 may be or may include a data intake and query system. FIGS. 1, 2, and 3 illustrate an example architecture of the first data processing system.

In certain cases, the second data processing system 508 may include one or more components (e.g., worker nodes 516) (as described herein at least with reference to FIGS. 10-11), and may further include or interface with one or more data source interface(s) 518, and/or data processing system interface(s) 520.

The data source interface 518 may be implemented as a network interface and may enable the second data processing system 508 to interface with (e.g., access) one or more data sources (e.g., data source 514). For example, the data source interface 518 may define one or more data streams, filters, pipelines, data routes, etc. between the second data processing system 508 and the one or more data sources. It will be understood that the second data processing system 508 may include one or more data source interfaces 518 to interface with the same data source 514 and/or to communicate with multiple data sources.

The data processing system interface 520 may be implemented as a network interface and may enable the second data processing system 508 to interface with one or more data processing systems (e.g., the first data processing system 510). For example, the data processing system interface 520 may define one or more data streams, filters, pipelines, data routes, etc. between the second data processing system 508 and the one or more data processing systems. In some cases, the second data processing system 508 may include multiple data processing system interfaces 520 to interface with different components of the first data processing system 510 and/or to communicate with multiple instances of first data processing systems 510. For example, a first data processing system interface 520 may be configured to interface with a search head of the first data processing systems 510, while a second data processing system interface 520 may be configured to interface with one or more search nodes, worker nodes, or indexers (or search peers) of the first data processing systems 510. The second data processing system 508 can select (or be directed by the query coordinator 506 to select or use) between multiple data processing system interfaces 520 depending on the component with which the second data processing system 508 is to communicate (according to the query processing scheme). In certain cases, the data processing system interface 520 may be considered part of the query coordinator 506 as it may continue to process the first query prior to execution by the first data processing system 510. For example, the data processing system interface 520 may use output from the 508 to generate the first query to be executed by the first data processing system 510 and/or to translate the generated query into a query language interpretable by the first data processing system 510. In some such cases, the data processing system interface 520 may form part of the query coordinator 506 but may be co-located with the second data processing system 508.

The first data processing system 510 and the second data processing system 508 may utilize particular query languages, command languages, interface languages, etc. (e.g., different query languages, command languages, interface languages, etc.). For example, a first query language may be interpretable by the first data processing system 510 and a second query language may be interpretable by the second data processing system 508. In some cases, the first data processing system 510 may be a SPLUNK® system that is configured to use SPL and the second data processing system 508 may be a third-party data processing system (e.g., a third-party data processing system relative to the first data processing system 510) that is configured to use SPL2 SQL.

The query coordinator 506 may be implemented on a separate computing device or system from the first data processing system 510 and the second data processing system 508. In some cases, the query coordinator 506 may be related to or associated with the first data processing system 510. For example, the query coordinator 506 may be provided by the same company that provides the first data processing system, may use the same query language as the first data processing system 510. In certain cases, the query coordinator 506 may be a component of (e.g., may be implemented by) the first data processing system 510, the second data processing system 508, a third data processing system, etc. In some cases, the query coordinator 506 may be implemented separate from and/or located remotely from the first data processing system 510.

The catalog 512 may include a catalog of expression compensations (e.g., mapping a portion of a query in a first query language to a portion of a query in a second query language), a catalog of data semantics (e.g., data semantics of the first data processing system 510), a catalog of query parameters, a catalog of metadata associated with a query and/or entity, a catalog of query transformations (e.g., field transformations), etc. For example, the query coordinator 506 may store expression compensations, data semantics, query parameters, metadata, query transformations, etc. in the catalog. In some cases, the query coordinator 506 may store the expression compensations, the query parameters, the metadata, query transformations, and/or the data semantics in separate catalogs. In some cases, the client device 502 may provide an input defining data (e.g., expression compensations, query parameters, metadata, query transformations, and/or data semantics) for the catalog 512. In some cases, the query coordinator 506 may update (e.g., periodically, aperiodically, etc.) the catalog 512. The query coordinator 506 may use the query transformations to transform a query (e.g., automatically transform fields of a query, inject custom fields into a query, etc.).

In some cases, the query coordinator 506 may include an expression compensation module, a query parameter module, a metadata module, a query transformation module, and/or a data semantics module and may utilize the expression compensation module, the query parameter module, the metadata module, query transformation module, and/or the data semantics module to access, store data in, obtain data from, manage, update, etc. the catalog 512.

The data source 514 may be similar to and/or may include the data source 202 and/or the long-term storage 242 as discussed with reference to FIG. 2, or may be implemented as a data store configured to store machine data or other types of data in one or more formats. The data source 514 may form part of the first data processing system 510 and/or the second data processing system 508, or may be a distinct source of data for consumption by the first data processing system 510 and/or the second data processing system 508, etc. All or a portion of the first data processing system 510 and/or the second data processing system 508 may access the same data (e.g., a same copy or version of the data) as provided by and/or as stored at the data source 514. In some cases, the query coordinator 506 may access the same data at the data source 514. As discussed herein, the data source 514 may include data files, directories of files, data sent over a network, event logs, registries, raw machine data, etc.

As described herein, the query coordinator 506 can receive a first query and parse the first query. In some cases, the query coordinator 506 can obtain metadata associated with the first query and parse the metadata. For example, the metadata may indicate commands, functions, expression, data, etc. associated with the first query, a data type associated with the first query, capabilities (e.g., processing capabilities, data access capabilities, etc.) of a data processing system (e.g., the first data processing system 510 the second data processing system 508, etc.).

In some cases, to obtain the metadata, the query coordinator 506 can communicate with the second data processing system 508 and/or the first data processing system 510 to determine metadata associated with (e.g., the respective capabilities of) the second data processing system 508 and/or the first data processing system 510. In some cases, the query coordinator 506 may obtain metadata associated with one or more data processing systems from a particular data processing system and/or from the catalog 512. For example, the query coordinator 506 may obtain metadata associated with the first data processing system 510 from the second data processing system 506 (e.g., the second data processing system 506 may extract and/or obtain metadata from the first data processing system 510). In another example, the second data processing system 506 may extract and/or obtain metadata from and associated with the first data processing system 510 and may store the metadata in the catalog 512. The query coordinator 506 may obtain the metadata from the catalog 512. In some cases, the query coordinator 506 may not receive data from and/or provide data to the first data processing system 510 (e.g., the second data processing system 506 may act as an intermediary between the query coordinator 506 and the first data processing system 510).

Based on parsing the first query and/or the metadata (e.g., the capability of one or more data processing systems configured in and/or indicated by the metadata), the query coordinator 506 can identify one or more data processing systems (e.g., the first data processing system 510, the second data processing system 508, etc.) that can access data associated with the first query and can dynamically assign a respective portion of the first query to all or a portion of the identified one or more data processing systems. For example, the query coordinator 506 can dynamically assign a first portion of the first query to the first data processing system 510, a second portion of the first query to the second data processing system 508, etc. In some cases, dynamic assignment of a particular portion of the first query may include a dynamic assignment of the query optimizations.

The query coordinator 506 may dynamically assign one or more portions of the first query to one or more particular components and/or data processing systems based on one or more query parameters and/or component prioritization data. The one or more query parameters may include parameters for identifying components and/or data processing systems to route a portion of a query for execution and the component prioritization data may include a ranking of the components and/or data processing systems to route a portion of a query for execution. The one or more query parameters may indicate parameters for executing a portion of a query and/or may indicate how to assign a portion of a query.

The one or more query parameters may indicate parameters for selecting between data processing systems to route a portion of a query for execution. For example, a query parameter may indicate that, to execute at least a portion of a query, the query coordinator 506 is to route and/or is to define a query processing scheme indicating to route at least a portion of the query to a data processing system that is, the data processing system should be capable of executing the at least a portion of the query (e.g., the data processing system should be capable of understanding, translating, executing, etc. one or more commands, functions, expressions, data, etc. associated with the query). If a particular data processing system (e.g., the second data processing system 508) cannot execute a portion of a query, the one or more query parameters may indicate that the query coordinator 506 is to route and/or is to define a query processing scheme indicating to route the portion of the query to a different data processing system (e.g., the first data processing system 510).

The one or more query parameters may indicate parameters for selecting between components (e.g., search heads, indexers, etc.) of data processing systems to route a portion of a query for execution. For example, a query parameter may indicate that, to execute at least a portion of a query, the query coordinator 506 is to route and/or is to define a query processing scheme indicating to route the at least a portion of the query to an indexer of a data processing system if the at least a portion of a query is associated with an index. In another example, a query parameter may indicate that, if a portion of the query includes a filter that reduces the set of data associated with the query by a particular threshold, the query coordinator 506 is to route and/or is to define a query processing scheme indicating to route the portion of the query to an indexer and, if the portion of the query does not include such a filter, the query coordinator 506 is to route and/or is to define a query processing scheme indicating to route the portion of the query to the second data processing system 508. In another example, a query parameter may indicate that, to execute at least a portion of a query, the query coordinator 506 is to route and/or is to define a query processing scheme indicating to route the at least a portion of the query to an indexer of a data processing system if the at least a portion of the query is distributable and/or parallelizable.

In another example of the one or more query parameters, a query parameter may indicate that, to execute at least a portion of a query, the query coordinator 506 is to route and/or is to define a query processing scheme indicating to route the at least a portion of the query to a component and/or a data processing system that can execute the at least a portion of a query such that an execution time (e.g., query execution time), a translation time (e.g., a query translation time), and/or a resource utilization satisfies (e.g., is less than or matches) a threshold (e.g., a threshold value, a threshold range, etc.). In another example, a query parameter may indicate that, to execute at least a portion of a query, the query coordinator 506 is to route and/or is to define a query processing scheme indicating to route the at least a portion of the query to a component and/or a data processing system that can process (e.g., is trained to process, processing satisfies a threshold, etc.) data associated with the at least a portion of the query having a particular data type (e.g., streaming data, batch data, structured data, unstructured data, etc.). In another example, a query parameter may indicate that, to execute at least a portion of a query, the query coordinator 506 is to route and/or is to define a query processing scheme indicating to route the at least a portion of the query to a data processing system that can execute the at least a portion of the query according to data semantics (e.g., a data processing scheme) of a different data processing system.

Based on the dynamic assignment of the respective portion of the first query to all or a portion of the identified one or more data processing systems, the query coordinator 506 can generate a modified first query. To generate the modified first query, the query coordinator 506 can identify one or more respective portions of the first query dynamically assigned to the identified one or more data processing systems, generate one or more respective query identifiers based on all or a portion of the one or more respective portions of the first query and the identified one or more data processing systems, and replace the one or more respective portions of the query with the one or more respective query identifiers (or query tokens). For example, while a portion of the first query may include one or more expressions, commands, functions, data, etc., the query coordinator 506 may replace the portion of the first query with a query identifier that may not include the one or more expressions, commands, functions, data, etc. In some cases, the query coordinator 506 may generate the modified first query by adding data to the first query (e.g., via the query identifier) indicating that a first portion of the first query is assigned to the first data processing system 510, a second portion of the first query is assigned to the second data processing system 508, etc.

In some cases, the query coordinator 506 may identify data semantics of the identified one or more data processing systems. For example, the query coordinator 506 may determine a first portion of the first query is assigned to the first data processing system 510 and may identify data semantics indicating a manner of execution of one or more queries and provision of query results by the first data processing system 510. In some cases, the query coordinator 506 may monitor execution of the one or more queries and provision of the query results to identify the data semantics of the data semantics.

Based on the modified first query, the query coordinator 506 may define a query processing scheme indicating a manner of identifying a set of data and processing the set of data according to the modified first query. As the modified first query may include the query identifier instead of the portion of the first query assigned to the first data processing system 510, the query processing scheme may not include instructions to identify data and/or process the data as indicated by the portion of the first query. In some cases, the query processing scheme may include or may indicate the data semantics.

The query coordinator 506 may distribute the query processing scheme to the second data processing system 508. Based on the query processing scheme, the second data processing system 508 may execute at least a portion of the first query assigned to the second data processing system 508. For example, the second data processing system 508 may parse the query processing scheme to identify a portion of the first query assigned to the second data processing system 508 and may execute the portion of the first query on data as stored by or provided by the data source 514. In some cases, as part of executing the portion of the first query assigned to the second data processing system 508, the second data processing system 508 may use the data source interface 518 to access data from the data source 514.

In some cases, the second data processing system 508 may parse the query processing scheme to identify a portion of the first query assigned to the first data processing system 510 and may route the portion of the first query to the first data processing system 510 via the data processing system interface 520. In certain cases, the query coordinator 506 may identify the portion of the first query assigned to the first data processing system 510 and instruct the second data processing system 508 to route the portion of the first query to the first data processing system 510 via the data processing system interface 520. The first data processing system 510 may execute the portion of the first query and may return the results to the second data processing system 508. The second data processing system 508 may further process the results and/or may provide the results as an output.

In some cases, the second data processing system 508 may perform one or more optimizations to the first query based on the query processing scheme. For example, the second data processing system 508 may perform one or more of semantic based optimizations to optimize the first query. In some cases, the second data processing system 508 may identify one or more portions of the first query, a portion of a set of data corresponding to the first query, etc. to be modified, removed, etc. For example, the second data processing system 508 may identify the optimizations by identifying portions of the first query or alternative commands, expressions, functions, etc. that a system may use to achieve the same result as the portion of the first query. For example, if a first query includes a request for data from two fields of a table but only the data from one field is required or used by the first query, the second data processing system 508 may identify an optimization to remove the request for data from the unused field. As another example, the second data processing system 508 may determine that a field or filter criteria included near the end of the first query may be used as a filter to reduce the amount of data retrieved from the data source 514. In some such cases, the second data processing system 508 may indicate that the identified field should be included earlier in or at near the beginning of the first query.

In some cases, the second data processing system 508 may provide an output (e.g., the optimizations, results of execution of a portion of the first query assigned to the second data processing system 508, etc.) to the data processing system interface 520. Based on the output, the data processing system interface 520 may generate a second query (e.g., an optimized first query). For example, the data processing system interface 520 may generate a second query and/or further modify the first query based on the output of the second data processing system 508. In some cases, the data processing system interface 520 may parse the second query to identify a portion of the second query assigned to the first data processing system 510 and route the portion of the second query to the first data processing system 510. Based on execution of the portion of the second query, the second data processing system 508 may obtain query results (e.g., query results based on a join of query results generated by the first data processing system 510 and the second data processing system 508) and may provide the query results to the client device 502 as an output.

2.2 Executing a Query Across Multiple Data Processing Systems

As described herein, the query coordinator 506 can obtain a first query and define a query processing scheme for execution of the first query using multiple data processing data systems. For example, the query coordinator 506 can identify a portion of the first query for execution by the first data processing system 510 (or a component of the first data processing system 510) and can modify the first query by replacing the portion of the first query with a query identifier. In some cases, the query coordinator 506 and the first data processing system 510 may be part of the same system (e.g., the query coordinator 506 may be part of the first data processing system 510) and the query coordinator 506 may be executed or co-located within the second data processing system 508.

The techniques described below can enable the execution of a first query (on a same set of data) using multiple data processing systems based on modification of the first query using the query identifier. The query coordinator 506 can route the modified first query to a second data processing system 508 and obtain an output from the second data processing system 508 (e.g., one or more optimizations, one or more query results, etc.). The query coordinator 506 can facilitate execution of a second query based on the output (e.g., execution by the data first processing system 510, by a component of the first data processing system 510, etc.).

In some cases, systems may be unable to dynamically identify particular components and/or data processing systems, assign particular portions of the first query to particular data processing systems, modify the first query based on the assignment, and facilitate execution of the modified first query. This can cause inefficiencies as queries may be executed by a system or component without regard to the corresponding query parameters. To facilitate execution of queries in a reliable and efficient manner, it may be helpful for a system to identify and facilitate execution of queries by data processing systems that satisfy particular query parameters.

Figure 6:
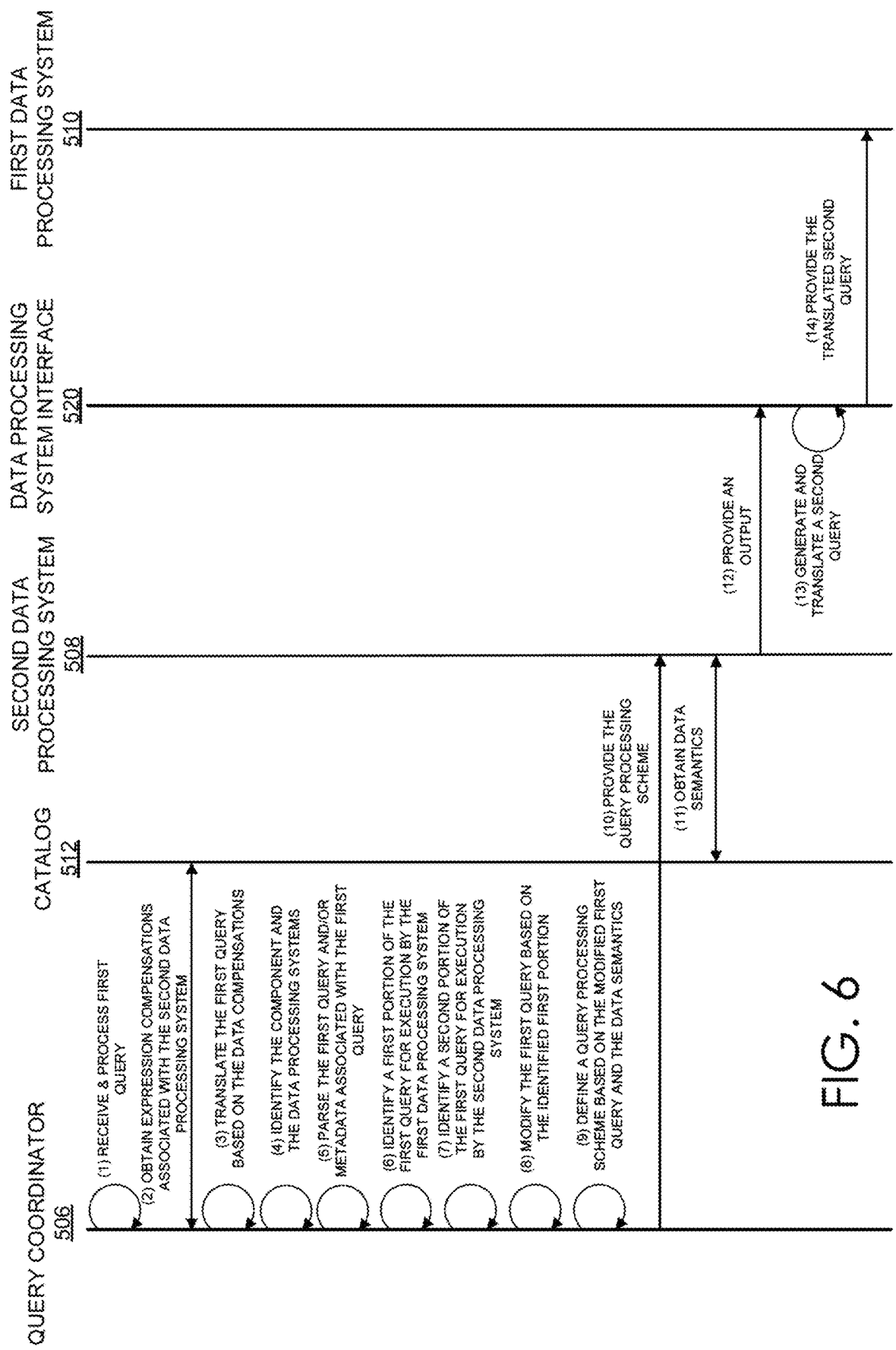
FIG. 6 is a data flow diagram illustrating an example of data flow and communications illustrating an example method for definition of a query processing scheme based on a first query and provision of a second query according to an output based on the query processing scheme.

FIG. 6 is a data flow diagram illustrating an example of data flow and communications between a variety of the components of a distributed data processing system, such as the query coordinator 506 as described with respect to FIG. 5, for processing and executing queries. The data flow diagram of FIG. 6 illustrates an example of data flow and communications between the query coordinator 506, the second data processing system 508, and the first data processing system 510. However, it will be understood that in some cases, one or more of the functions described herein with respect to FIG. 6 can be omitted, performed concurrently or in a different order and/or performed by a different component of the distributed data processing system. Accordingly, the illustrated example and description should not be construed as limiting. Moreover, although one query coordinator 506, one catalog 512, one second data processing system 508, one data processing system interface 520, and one first data processing system 510 are shown, it will be understood the query coordinator 506 may utilize multiple catalogs and/or may interface with multiple data processing systems that may utilize multiple data processing system interfaces to interact with other data processing systems. For example, the query coordinator 506 may interface with multiple second data processing systems 508.

Although not illustrated in FIG. 6, to perform various operations noted below, the query coordinator 506 may include and/or may be a query translator, a query planner, etc., the second data processing system 508 may include and/or may be a query planner, a data semantics enforcer, etc. In some cases, the query coordinator 506 may provide an extension to the second data processing system 508 (and may update the extension) that includes the data semantics enforcer. In some cases, the query coordinator 506 may also provide one or more interfaces to the second data processing system 508, such as the data processing system interface 520 to enable processing of the output from the second data processing system 508.

At (1), the query coordinator 506 receives and process a first query. The query coordinator 506 may receive the first query and process the first query to identify one or more commands, expressions, functions, data, etc. associated with the first query. The first query may correspond to a first query language (e.g., SPL1, SPL2, SPL2 SQL). To process the first query, the query coordinator 506 may translate the first query from a first query language to a second query language.

For example, the first query may correspond to SPL1 and the query coordinator 506 may translate the first query from SPL1 to SPL2. In some cases, the first query may correspond to SPL2 (e.g., the query coordinator 506 may obtain the first query in SPL2). In some cases, the first query may correspond to SPL2 SQL (e.g., the query coordinator 506 may obtain the first query in SPL2 SQL).

At (2), the query coordinator 506 obtains expression compensations (e.g., data compensations) associated with the second data processing system 508. For example, the query coordinator 506 may obtain the expression compensations from the catalog 512. The expression compensations may correspond to one or more commands, expressions, functions, data, etc. associated with a query. The expression compensations may indicate a portion of a query in a first query language corresponds to (e.g., can be compensated by) a portion of a query in a second query language. In some cases, the query coordinator 506 (or a separate system) may update the expression compensations.

At (3), the query coordinator 506 translates (e.g., canonicalizes and compensates) the first query based on the expression compensations. For example, the query coordinator 506 may translate the first query from SPL2 to SPL2 SQL based on the expression compensations. In some cases, the query coordinator 506 may translate a portion of the first query (e.g., that can be compensated according to the expression compensations) and may not translate another portion of the first query (e.g., that cannot be compensated according to the expression compensations).

In some cases, the query coordinator 506 may receive the first query in SPL2 SQL and may not translate the first query.

At (4), the query coordinator 506 identifies the first data processing system 510 and the second data processing system 508. To identify the first data processing system 510 and the second data processing system 508, the query coordinator 506 may identify data processing systems that can access data associated with the first query (e.g., data to be processed based on the first query). The query coordinator 506 may identify that all or a portion of the data processing systems (or components of the data processing systems) may be able to access data associated with the first query as provided by and/or as stored at a data source. For example, the first query may identify a set of data and a manner of processing the set of data and the query coordinator 506 may identify that the first data processing system 510 and the second data processing system 508 may access the set of data.

At (5), the query coordinator 506 parses the first query and/or metadata associated with the first query. The query coordinator 506 may parse the first query and/or the metadata based on one or more query parameters and/or component prioritization data (e.g., as obtained from the catalog 512) and may assign one or more portions of the first query to one or more data processing systems and/or components based on parsing. The query coordinator 506 may parse the first query to identify one or more portions of the first query that do not satisfy the one or more query parameters for particular data processing systems (e.g., that the query coordinator 506 did not translate into a query language interpretable by the second data processing system 508). The query coordinator 506 may parse the first query and the metadata to identify commands, functions, expressions, data, etc. associated with the one or more portions of the first query and may analyze the first query based on the commands, functions, expressions, data, etc. and the identified data processing systems (e.g., the first data processing system 510, the second data processing system 508, and/or specific components thereof such as a search head or an indexer of the first data processing system 510).

In one example, the one or more query parameters may indicate that, for execution of a portion of a query, a data processing system and/or a component thereof should be capable of execution the portion of the query (e.g., the first data processing system 510 and/or a component thereof should be capable of understanding, translating, executing, etc. one or more commands, functions, expressions, data, etc. associated with the portion of the query). For example, a particular command within a query (e.g., StreamStats) may be mapped to an operation (e.g., via the expression compensations) that the first data processing system 510 can execute but that the second data processing system 508 cannot execute.

In another example, the one or more query parameters may indicate that execution of at least a portion of a query by the first data processing system 510 and/or a component thereof should result in an execution time, a translation time, and/or a resource utilization that satisfies (e.g., is less than or matches) a threshold (e.g., a threshold value, a threshold range, etc.).

In another example, the one or more query parameters may indicate that, for execution of a portion of a query, a data processing system and/or a component thereof should be capable of processing (e.g., is trained to process, processing satisfies a threshold, etc.) data associated with the portion of the query having a particular data type (e.g., streaming data, batch data, structured data, unstructured data, etc.).

In another example, the one or more query parameters may indicate that the query coordinator 506 should assign a portion of a query to an indexer if the portion of the query includes a filter that reduces a set of data associated with the query by a threshold and assign the portion of the query to the second data processing system if the portion of the query does not include such a filter.

In another example, the one or more query parameters may indicate that the query coordinator 506 should assign a portion of a query to an indexer if the portion of the query is distributable and/or parallelizable (e.g., the portion of the query includes one or more commands, expressions, functions, etc. that are distributable).

The query coordinator 506 may identify a respective data processing system (or a component thereof) for execution of all or a portion of the portions of the first query. In some cases, the query coordinator 506 may identify the data processing system based on component prioritization data (e.g., a hierarchical plurality of components and/or systems, a ranking, etc.). For example, the hierarchical plurality of components and/or systems may indicate a preference for the second data processing system 508 to execute a portion of a query and, if execution of the portion of the query by the second data processing system 508 does not satisfy one or more query parameters, the hierarchical plurality of components and/or systems may indicate a preference for a first component of the first data processing system 510 (e.g., an indexer) to execute the portion of the query and, if execution of the portion of the query by the second data processing system 508 or the indexer does not satisfy one or more query parameters, the hierarchical plurality of components and/or systems may indicate a preference for a second component of the first data processing system 510 (e.g., a search head of the first data processing system 510) to execute the portion of the query. In another example, the hierarchical plurality of components and/or systems may indicate a preference for the first component of the first data processing system 510 (e.g., an indexer) to execute a portion of the query and, if execution of the portion of the query by the first component does not satisfy one or more query parameters, the hierarchical plurality of components and/or systems may indicate a preference for the second data processing system 508 to execute the portion of the query and, if execution of the portion of the query by the second data processing system 508 or the first component does not satisfy one or more query parameters, the hierarchical plurality of components and/or systems may indicate a preference for a second component of the first data processing system 510 (e.g., a search head) to execute the portion of the query.

At (6), the query coordinator 506 identifies a first portion of the first query for execution by the first data processing system 510 (e.g., based on the one or more query parameters and/or the component prioritization data). The query coordinator 506 may identify the first portion of the first query for execution by the first data processing system 510 (e.g., by an indexer, a search head, etc. of the first data processing system 510) based on parsing the first query. For example, the query coordinator 506 may identify the first portion of the first query for execution by the first data processing system 510 based on parsing the first query according to the one or more query parameters and/or the component prioritization data (e.g., and identifying that the second data processing system 508 cannot execute the first portion of the first query).

The query coordinator 506 may identify a portion of the first query that the second data processing system 508 cannot execute (e.g., a smallest portion of the first query that the second data processing system 508) as the first portion of the first query for execution by the first data processing system 510. In some cases, the query coordinator 506 may identify a portion of the first query that the second data processing system 508 cannot execute and any associated commands, functions, expressions, data, etc. as the first portion of the first query for execution by the first data processing system 510

At (7), the query coordinator 506 identifies a second portion of the second query for execution by the second data processing system 508 (e.g., based on the component prioritization data). The query coordinator 506 may identify the second portion of the first query for execution by the second data processing system 508 based on parsing the first query. For example, the query coordinator 506 may identify the second portion of the first query for execution by the second data processing system 508 based on parsing the first query according to the one or more query parameters and/or the component prioritization data (e.g., and identifying that the second data processing system 508 can execute the second portion of the first query).

At (8), the query coordinator 506 modifies the first query (e.g., the translated first query) based on the identified first portion. The query coordinator 506 may generate a query identifier and may modify the translated query by replacing the first portion of the first query with the query identifier. The query identifier may associate (e.g., link) the first query and the first data processing system 510 based on the query coordinator 506 identifying the first portion of the first query for execution by the first data processing system 510.

At (9), the query coordinator 506 defines a query processing scheme based on the modified first query. For example, the query processing scheme may include or may be a query plan, a command tree (e.g., a Catalyst tree), query instructions, etc. The query processing scheme may indicate the first portion of the first query for execution by the first data processing system 510 (indirectly via the query identifier) and the second portion of the first query for execution by the second data processing system 508.

At (10), the query coordinator 506 provides the query processing scheme to the second data processing system 508. In some cases, the query processing scheme may include instructions for the second data processing system 508 to perform one or more operations (e.g., to execute the second portion of the first query, to optimize the modified query).

At (11), the second data processing system 508 obtains data semantics. For example, the second data processing system 508 may obtain the data semantics from the catalog 512. The data semantics may be data semantics of the query coordinator 506, the first data processing system 510, etc. The data semantics may indicate a manner of execution, translation, processing, etc. of a query, a manner of generation, translation, processing, etc. of query results, a manner of translation, processing, etc. of data associated with the query, etc. by the query coordinator 506, the second data processing system 508, etc. For example, the data semantics may indicate that the first data processing system 510 provides a null set of query results based on a portion of a query not being executed, failing to execute the query, encountering an error in executing the query, etc. In some cases, the second data processing system 508 may transform the query processing scheme based on the data semantics (e.g., may include the data semantics within the query processing scheme). For example, the second data processing system 508 may obtain data semantics associated with the first data processing system 510 based on determining the query processing scheme indicates a portion of the query is to be executed by the first data processing system 510 and may transform the query processing scheme based on the data semantics. In some cases, the query coordinator 506 may obtain the data semantics and may define the query processing scheme based on the data semantics.

At (12), the second data processing system 508 provides an output to the data processing system interface 520. The second data processing system 508 may identify the data processing system interface 520 based on the modified query (e.g., indicating that the output is to be routed to the first data processing system 510, an indexer of the first data processing system 510, a search head of the first data processing system 510, etc.). To generate the output, the second data processing system 508 may performs one or more operations. In some cases, the one or more operations may include execution of the second portion of the first query (e.g., by the second data processing system 508). In some cases, the one or more operations may include identifying one or more optimizations to the modified query. The output may be based on the one or more operations performed by the second data processing system 508. In some cases, the output may include and/or may identify one or more optimizations to the modified query.

At (13), the data processing system interface 520 generates and translates a second query. The second query may correspond to the first portion of the first query for execution by the first data processing system 510. To generate the second query, the data processing system interface 520 may modify the first query based on the output.

At (14), the data processing system interface 520 provides the translated second query to the first data processing system 510 (e.g., a component of the first data processing system 510). The first data processing system 510 may execute at least a portion of the translated second query (corresponding to the first portion of the first query), obtain query results based on execution of the at least a portion of the translated second query, and may route the query results to the second data processing system 508. In some cases, the first data processing system 510 may obtain and route the query results to the to the second data processing system 508 (e.g., via the data processing system interface 520).

The second data processing system 508 may process (e.g., perform a join operation, a merge operation, etc. on) the query results. For example, the second data processing system 508 may join the query results with query results based on execution of a query corresponding to the second portion of the first query to obtain joined query results. In some cases, the second data processing system 508 may provide processed query results to a system (e.g., the query coordinator 506) and the system may cause display of the processed query results.

Although only one query coordinator 506, one second data processing system 508, and one first data processing system 510 are illustrated in FIG. 6, it will be understood that the data flow and processes described herein may be implemented using multiple data processing systems.

In an example of the processing and executing of a query, the query coordinator 506 may obtain a first query as noted below:

|search index=all_traffic
|streamstats count( ) as row_id
|where dst_ip='10.177.123.11' and row_id<100
|stats counto by src_ip In such an example, the first query may be a first query in a first query language (e.g., SPL2). The query coordinator 506 may determine expression compensations for the first query to identify portions of the first query that can be executed by the query coordinator 506, the second data processing system 508, the first data processing system 510, etc. The query coordinator 506 may determine one or more portions of the first query that can be semantically compensated (e.g., that the second data processing system 508 can execute) and one or more portions of the first query that cannot be semantically compensated (e.g., that the second data processing system 508 cannot execute).

In the example of the first query above, the query coordinator 506 may determine that the where clause ("where dst_ip='10.177.123.11'" and row_id<100") and the stats count clause ("stats count( ) by src_ip") correspond to one or more expression compensations (e.g., can be executed by the second data processing system 508) and the streamstats clause ("streamstats count( ) as row_id") does not correspond to one or more expression compensations (e.g., cannot be executed by the second data processing system 508). Based on the determination of the one or more portions of the first query that can or cannot be compensated, the query coordinator 506 may translate the first query based on the one or more expression compensations to obtain the translated first query as noted below:

FROM [FROM all_traffic| streamstats count( ) AS row_id)
    WHERE dst_ip="10.177.123.11" AND row_id<100
    GROUP BY src_ip
    SELECT src_ip, count( )

The query coordinator 506 may parse the translated first query to compare the translated first query to one or more query parameters associated with the second data processing system 508. As described herein, as the query coordinator 506 may determine the where clause and the stats count clause correspond to one or more expression compensations and the streamstats clause does not correspond to one or more expression compensations, the query coordinator 506 may translate the where clause and the stats count clause but may not translate the streamstats clause. The query coordinator 506 may parse the translated first query and metadata associated with the first query to identify a portion of the translated first query corresponding to non-translated clauses and a data processing system (or a component thereof) to execute the portion of the translated first query based on the hierarchical plurality of components and/or systems. The query coordinator 506 may generate a query identifier and replace the portion of the translated first query with the query identifier to obtain a modified first query.

In the example of the translated first query above, the query coordinator 506 may determine that the streamstats clause was not translated (e.g., is not executable by the second data processing system 508) and is a non-distributable command and cannot be executed on an indexer of the first data processing system 510 and should be routed to a search head (e.g., a search head of the first data processing system 510). The query coordinator 506 generates the query identifier ("all_traffic_977043a44653") which associates the streamstats clause with the first data processing system 510 and, by replacing the portion of the translated first query with the query identifier, generates a modified first query as noted below:

FROM all_traffic_977043a44653
    WHERE dst_ip="10.177.123.11" AND row_id<100
    GROUP BY src_ip
    SELECT src_ip, count( )

Based on the modified first query, the query coordinator 506 can define (e.g., generate) a query processing scheme to provide to the second data processing system 508. In the example, the query processing scheme includes a command tree (e.g., a Catalyst tree) as noted below:

'Aggregate ['src_ip], ['src_ip, unresolvedalias(cast ('count(1) as double), None)]
    +–'Filter (('dst_ip=10.177.123.11) AND ('row_id<100))
    +–'UnresolvedRelation [all_traffic_977043a44653], [ ], false Based on the query processing scheme, the second data processing system 508 can perform one or more operations (e.g., process a portion of the first query assigned to the second data processing system 508) and generates an output. For example, the one or more operations may include performance of one or more optimizations. Based on the query processing scheme, the second data processing system 508 may determine that the portion of the query is assigned to a search head of the of the first data processing system 510 and may route the output to the data processing system interface 520 that corresponds to the search head (e.g., a search head interface or search head connector) to provide to the search head. The output may include filters, functions, groups, etc. as noted below that, if possible, are to be used by the first data processing system 510 to reduce the amount of processing done and/or reduce the amount of data retrieved. For example, the "pushed filters" may be applied by the first data processing system 510 to reduce the amount of data retrieved from the data source 514. Similarly, the pushed functions and groups may reduce the amount of data retrieved from the data source 514 and/or reduce the amount of data earlier on during query execution thereby reducing the amount of processing by downstream nodes.

Pushed Filters:
    IsNotNull(dst_ip), IsNotNull(row_id)
    EqualTo(dst_ip, 10.177.123.11), LessThan(row_id, 100)
    Pushed Aggregate Functions: COUNT(*)
    Pushed Group by: src_ip The data processing system interface 520 may generate a second query (e.g., in SPL2) based on the first query and the output. For example, the data processing system interface 520 may reconstruct a second query based on the first query and the output. The second query, as noted below, may include one or more optimizations, to the first query based on the output of the second data processing system 508.

FROM [FROM all_traffic| streamstats count( ) AS row_id]
    WHERE
        isnotnull(dst_ip) AND isnotnull(row_id) AND dst_ip="10.177.123.11" AND row_id<100L
        GROUP BY src_ip SELECT src_ip, count( ) AS 'COUNT( )'

The data processing system interface 520 may translate the second query (e.g., from SPL2 and SPL1), as noted below, and route the translated second query to the search head of the data processing system interface 520 based on the portion of the first query being assigned to the search head.

search index=all_traffic
    |streamstats count( ) AS row_id
    |where isnotnull(dst_ip) AND isnotnull(row_id) AND dst_ip="10.177.123.11" AND
    row_id<100
    |stats count BY src_ip| eval count( )=count|fields src_ip, "count("

In another example, of the processing and executing of a query, the query coordinator 506 may receive a first query as noted below:

|search index=all_traffic
    |where dst_ip='10.177.123.11"
    |stats count( ) by src_ip The query coordinator 506 may translate the first query to obtain a translated first query as noted below:
FROM all_traffic
WHERE dst_ip="10.177.123.11"
GROUP BY src_ip
SELECT src_ip, count( )

The query coordinator 506 may parse the translated first query to compare the translated first query to one or more query parameters associated with the second data processing system 508. In this case, as the portion of the translated first query (the data retrieval of the translated first query) that does not satisfy the one or more query parameters (e.g., cannot be executed by the second data processing system 508, execution by the second data processing system 508 would be less efficient as compared to execution by a component of the first data processing system 510, etc.) includes a distributable command, the query coordinator 506 may dynamically assign the portion of the translated first query to an indexer (e.g., an indexer of the first data processing system 510). As part of assigning the portion of the translated first query to an indexer, the query coordinator 506 may generate the query identifier ("all_traffic_6c5a694d2806") which associates the data retrieval of the query with the first data processing system 510 and, by replacing the portion of the translated first query with the query identifier, generates a modified first query as noted below:
FROM all_traffic_6c5a694d2806
WHERE dst_ip="10.177.123.11"
GROUP BY src_ip
SELECT src_ip, count( )

The query coordinator 506 can define the query processing scheme based on the modified first query. Moreover, the query processing scheme indicates that a portion of the modified first query is to be routed to an indexer of the first data processing system 510 as noted below:
'Aggregate ['src_ip], ['src_ip, unresolvedalias(cast ('count(1) as double), None)]
+-'Filter ('dst_ip=10.177.123.11)
+-'UnresolvedRelation [all_traffic_6c5a694d2806], [ ], false Based on the query processing scheme, the second data processing system 508 may process the query processing scheme and generate an output, such as one or more optimizations as noted below:
Pushed Filters: IsNotNull(dst_ip), EqualTo(dst_ip, 10.177.123.11)
Pushed Aggregate Functions: COUNT(*)
Pushed Group by: src_ip The data processing system interface 520 may generate a second query based on the (translated and/or compensated) first query and the output as noted below:
FROM [FROM all_traffic]
WHERE isnotnull(dst_ip) AND dst_ip="10.177.123.11"
]
GROUP BY src_ip
SELECT src_ip, count( ) AS 'COUNT0'

The data processing system interface 520 may translate the second query, as noted below, and route the translated second query to the indexer of the first data processing system 510 based on the portion of the query being assigned to the indexer.
search index=all_traffic dst_ip=CASE(10.177.123.11)
|where isnotnull(dst_ip)
|stats count BY src_ip
|eval count( )=count
|fields src_ip, "count( )"

2.3 Query Modification for Multiple Data Processing Systems

As described herein, the query coordinator 506 can obtain a query and modify the query to provide to a second data processing system 508 by replacing a portion of the query to be executed by a component of the first data processing system 510 with a query identifier.

The techniques described below can enable the execution of different portions of a query (on a same set of data) by different data processing systems. The first data processing system 510 can execute a first portion of the query and a second data processing system 508 can execute a second portion of the query.

In some cases, systems may be unable to dynamically identify particular components and/or data processing systems, modify queries based on the dynamically identified components and/or data processing systems, and facilitate execution of the modified query. This can cause inefficiencies as queries may be routed to a data processing system that may not satisfy one or more query parameters in executing the query.

Figure 7:
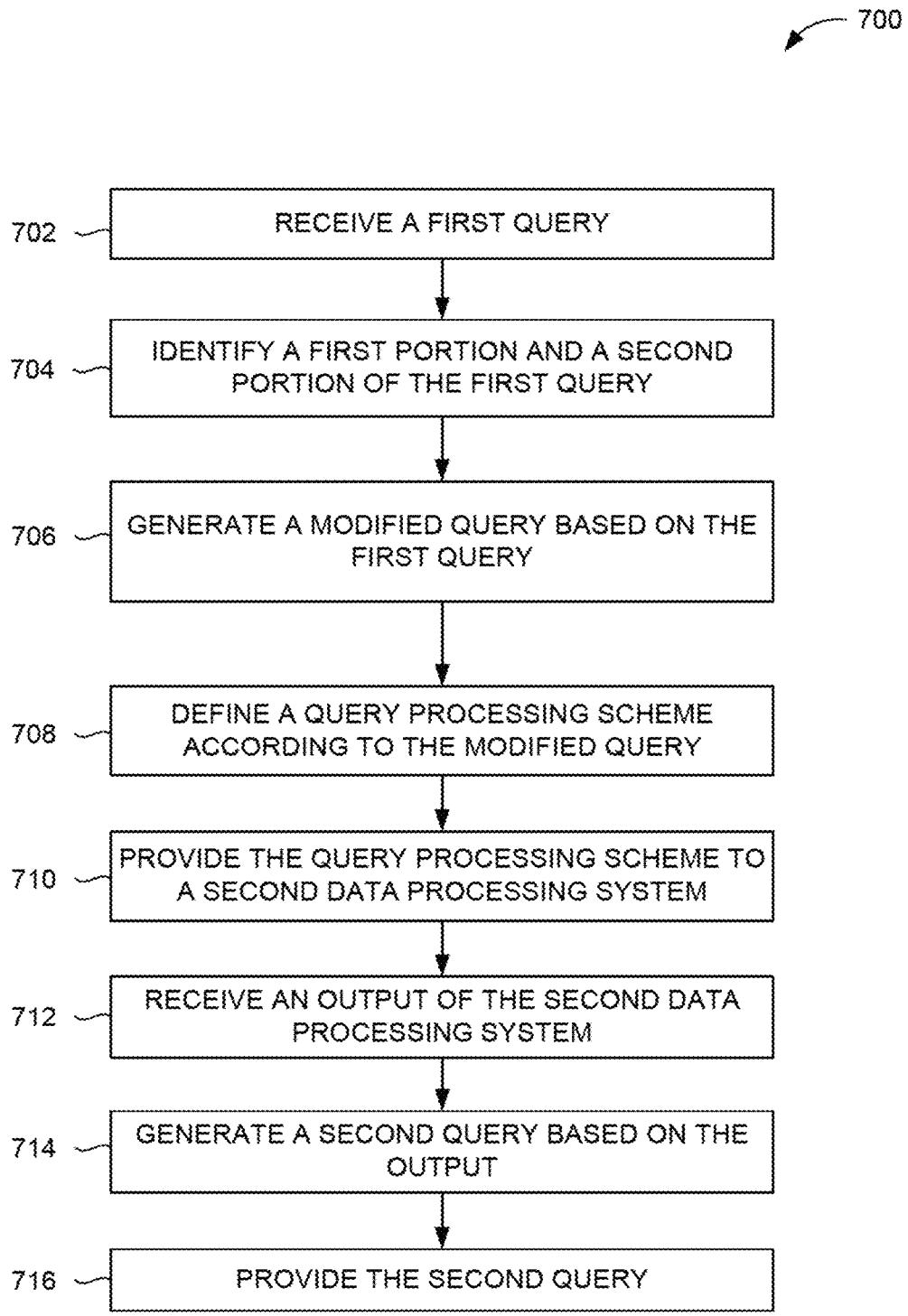
FIG. 7 is a flow diagram illustrative of an example of a routine, implemented by a query coordinator, for identification of portions of a query, identification of a second query based on the portions of the query, and provision of the second query.

Turning to FIG. 7, an illustrative algorithm or routine 700 will be described for a query processing and execution process. The routine 700 may be implemented, for example, by the query coordinator 506 and the data processing system interface 520 described herein with reference to FIG. 5. The routine begins at block 702, where the query coordinator 506 receives a first query. The first query may identify a set of data to be processed and a manner of processing the set of data. The set of data may be accessible by a first data processing system and a second data processing system In some cases, the query coordinator 506 may translate the first query from a first query language interpretable by the first data processing system 510 to a second query language interpretable by the second data processing system 508 to obtain a translated first query. The query coordinator 506 may obtain a catalog to translate the first query. For example, the catalog may map one or more portions of a query according to the first query language to one or more portions of a query according to the second query language. In some cases, the query coordinator 506 may identify (e.g., obtain) one or more updates to the catalog based on an input obtained from a computing device to obtain an updated catalog and may translate the first query using the updated catalog.

In some cases, the query coordinator 506 may filter the first query to obtain a filtered first query. For example, the query coordinator 506 may filter the first query to remove one or more portions of the query where execution of the one or more portions of the query by a second data processing system 508 do not satisfy a query parameter.

At block 704, the query coordinator 506 identifies a first portion and a second portion of the first query. The query coordinator 506 may identify that the first portion of the first query is to be processed (e.g., executed) by the first data processing system 510 and the second portion of the first query is to be processed (e.g., executed, optimized, etc.) by a second data processing system 508. The first data processing system 510 may be separate and/or remote from the second data processing system 508. In some cases, the first data processing system 510 and the second data processing system 508 may have different data semantics. For example, the first data processing system 510 may execute queries on unstructured data and the second data processing system 508 may execute queries on structured data.

In some cases, the query coordinator 506 may identify the first portion and the second portion of the first query based on query parameters. For example, the query coordinator 506 may determine query parameters that may include one or more of a query processing time, a query translation time, a resource utilization, a processing capability, or data associated with the first query.

In some cases, the query coordinator 506 may identify a component (e.g., of the first data processing system 510) for execution of the first portion of the first query (e.g., to provide a second query corresponding to the first portion of the first query).

At block 706, the query coordinator 506 generates a modified query (e.g., a modified first query) based on the first query. In some cases, the query coordinator 506 may generate the modified query based on identifying that the first portion of the first query is to be processed by (e.g., executed by) the first data processing system 510 and the second portion of the first query is to be processed by (e.g., executed by) the second data processing system 508.

In some cases, to generate the modified query, the query coordinator 506 may modify the first query (e.g., the translated first query, the filtered first query, etc.). For example, the query coordinator 506 may modify the first query by replacing the first portion of the first query with a query identifier (e.g., indicating that the query coordinator 506 identified that the first portion of the first query is to be processed by the first data processing system 510). Further, the query coordinator 506 may generate a modified query that includes the query identifier and the second portion of the first query, but does not include the first portion of the first query.

In some cases, to generate the modified query, the query coordinator 506 may apply metadata bindings to the first query. For example, the query coordinator 506 may bind metadata associated with the first query to the first query to obtain the modified query.

At block 708, the query coordinator 506 defines a query processing scheme according to the modified query. For example, the query processing scheme may be a query processing scheme for obtaining and processing at least a portion of the set of data according to the modified query. In some cases, the query processing scheme may include a command tree (e.g., a Catalyst tree, a query plan, query instructions, etc.). For example, the query coordinator 506 may generate the command tree based on the modified query and the query processing scheme may include the command tree.

In some cases, the query processing scheme may include instructions for the second data processing system 508 to route the second portion of the first query to one or more components of the second data processing system 508 (e.g., one or more worker nodes). In some cases, the query processing scheme may include instructions for the second data processing system 508 to process the second portion of the first query, generate an output based on processing the second portion of the first query, and route the output to the first data processing system 510 (e.g., via a data processing system interface 520).

At block 710, the query coordinator 506 provides the query processing scheme to a second data processing system 508. For example, the query coordinator 506 can route the query processing scheme as a Catalyst tree to the second data processing system 508.

At block 712, a data processing system interface 520 (e.g., a data processing system interface 520 associated with the first data processing system 510 and the second data processing system 508, a data processing system interface 520 of the second data processing system 508, etc.) receives an output of the second data processing system 508. The data processing system interface 520 may receive the output based on the second data processing system 508 obtaining and processing the query processing scheme and/or at least a portion of the set of data according to the modified query. The output may include one or more optimizations to the first query (e.g., by the second data processing system 508).

At block 714, the data processing system interface 520 generates a second query based on the output. The data processing system interface 520 may generate the second query to be processed by the first data processing system 510 and/or a component of the first data processing system 510 based on the first portion of the first query, the modified query, and/or the output. In some cases, to generate the second query, the data processing system interface 520 may modify the first query based on one or more optimizations, indicated by the output, to the first query. In some cases, to generate the second query, the data processing system interface 520 may generate the second query based on the one or more optimizations.

In some cases, the data processing system interface 520 may translate the second query from the second query language to the first query language to obtain a translated second query for execution by the component.

At block 716, the data processing system interface 520 provides the second query (e.g., the translated second query). For example, the data processing system interface 520 can provide the second query to the component of the first data processing system 510. In another example, the data processing system interface 520 may route the second query to the component and instructions to execute the second query to the component. The data processing system interface 520 may obtain query results from the component based on execution of the second query.

In some cases, the data processing system interface 520 may obtain query results (e.g., first query results) from the component. The query processing scheme may indicate that the second data processing system 508 is identified to execute the second portion of the first query. As described herein, the second data processing system 508 may execute the second portion of the first query to generate second query results based on the query processing scheme. The second data processing system 508 may perform a join of the query results and the second query results.

2.4 Component Identification for Query Execution

As described herein, the query coordinator 506 can obtain a query and dynamically identify particular components and/or data processing systems for execution of all or a portion of the query.

The techniques described below can enable the dynamic identification of components and/or data processing systems and execution of different portions of a query (on a same set of data) by the dynamically identified components and/or data processing systems. The first data processing system 510 can execute a first portion of the query and a second data processing system 508 can execute a second portion of the query.

In some cases, systems may be unable to dynamically identify particular components and/or data processing systems, assign all or a portion of the query to dynamically identified components and/or data processing systems, and facilitate execution of the query. This can cause inefficiencies in the query execution process.

Figure 8:
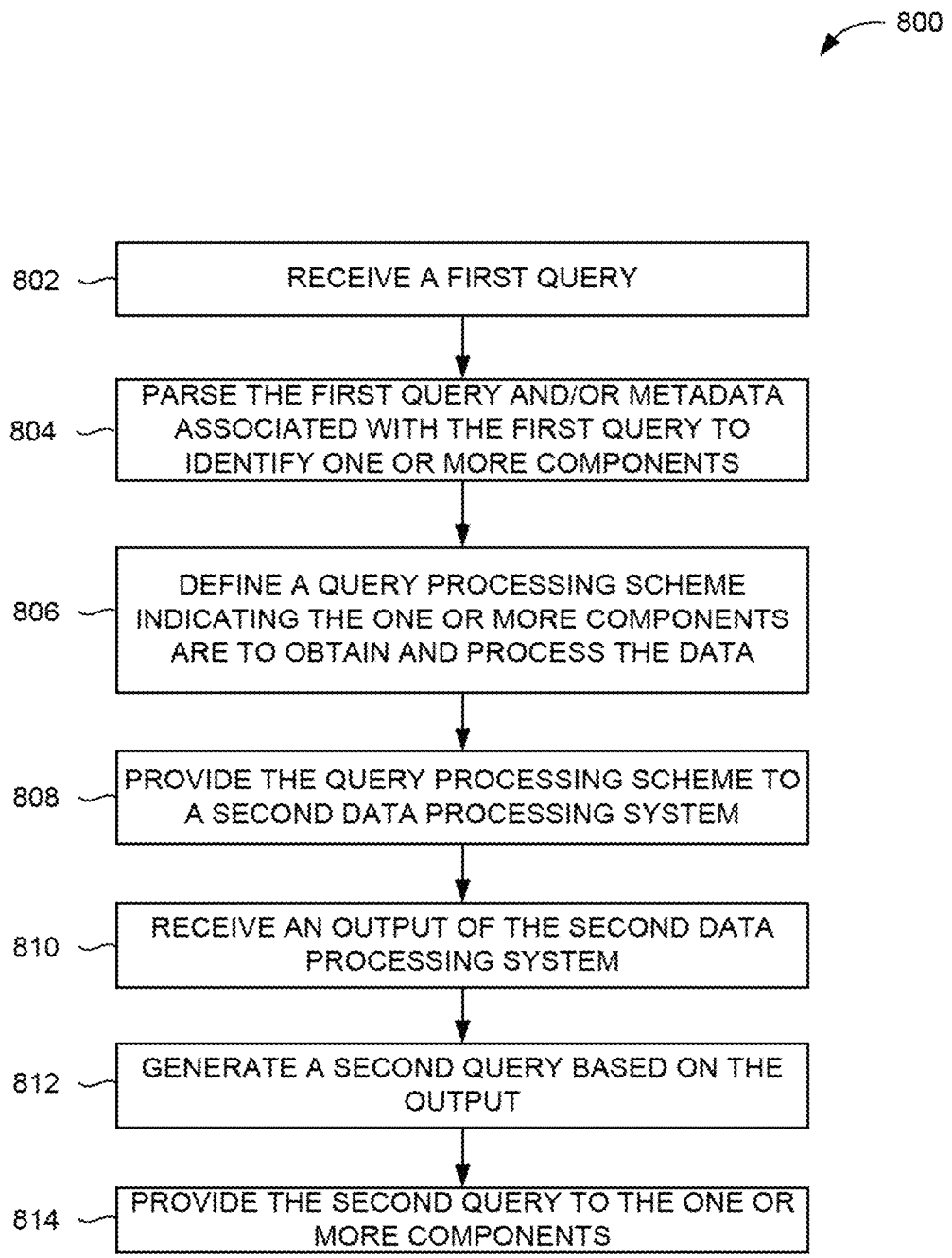
FIG. 8 is a flow diagram illustrative of an example of a routine, implemented by a query coordinator, for identification of a query based on the output of a data processing system and provision of the query to one or more identified components.

Turning to FIG. 8, an illustrative algorithm or routine 800 will be described for a query processing and execution process. The routine 800 may be implemented, for example, by the query coordinator 506 and the data processing system interface 520 described with reference to FIG. 5. The routine begins at block 802, where the query coordinator 506 (e.g., a first data processing system of a plurality of data processing systems) receives a first query. The first query may identify a set of data to be processed and a manner of processing the set of data. The set of data (e.g., as stored by, as provided by, etc.) may be accessible by all or a portion of the plurality of data processing systems. In some cases, the first query may correspond to a second data processing system 508 of the plurality of data processing systems. For example, the first query may be assigned to be optimized by the second data processing system 508, the second data processing system 508 may be capable of execution of at least a portion of the first query, etc.

The query coordinator 506 may identify the set of data based on the first query. In some cases, the query coordinator 506 may identify components and/or data processing systems (e.g., one or more components, the plurality of data processing systems, etc.) based on the set of data (e.g., as provided by a same data source or as stored in a same data store) being accessible by all or a portion of the components and/or data processing systems.

At block 804, the query coordinator 506 parses the first query and/or metadata associated with the first query to identify one or more components (e.g., of one or more data processing systems of the plurality of data processing systems) to obtain and process data (e.g., a first portion of the set of data) according to the first query. For example, the query coordinator 506 may parse the first query and/or the metadata to identify commands, expressions, functions, data, etc. associated with the first query, query parameters, etc.

In some cases, based on parsing the first query and/or the metadata, the query coordinator 506 may translate the first query to obtain a translated first query (e.g., from a first query language to a second query language). For example, the query coordinator 506 may perform expression compensation and/or data canonicalization to translate the query.

The one or more components may include a search head, an indexer, worker node, a forwarder, a query coordinator, etc. In some cases, the one or more components may include one or more components of the first data processing system 510, one or more components of one or more third data processing systems of the plurality of data processing systems, and/or the one or more third data processing systems.

In some cases, the query coordinator 506 may identify the one or more components to obtain and process the data based on identifying that the first query is associated with batch data, streaming data, a filter (e.g., that reduces the set of data by an amount that matches or exceeds a threshold), a pre-aggregate function, a distributable command, etc. In another example, the query coordinator 506 may determine a first portion of the first query includes a non-distributable command and cannot be executed (e.g., efficiently, within a particular time period, etc.) by an indexer and a second portion of the first query includes a distributable command and can be executed by an indexer. The query coordinator 506 may identify a search head to execute the first portion of the first query and the indexer to execute the second portion of the first query.

In some cases, the query coordinator 506 may identify the one or more components based on translating the query. For example, the query coordinator 506 may obtain a catalog mapping one or more portions of a query according to a first query language interpretable by the first data processing system to one or more portions of a query according to a second query language interpretable by the second data processing system 508.

Based on the catalog, the query coordinator 506 may identify that one or more portions of the query can be translated into a query language interpretable by the second data processing system 508 and may assign the one or more portions of the query to the second data processing system 508. Further, the query coordinator 506 may identify that one or more portions of the query cannot be translated into a query language interpretable by the second data processing system 508 and may assign the one or more portions of the query to the one or more components (e.g., one or more components of the query coordinator 506).

In some cases, the query coordinator 506 may identify the one or more components based on determining the first query corresponds to an index. For example, the query coordinator 506 may identify an indexer to execute a portion of the query corresponding to an index based on the indexer being configured to utilize an index.

In some cases, the query coordinator 506 may identify the one or more components based on a query processing time associated with the one or more components and the first query, a query translation time associated with the first query, a resource utilization associated with the first query, or an amount of data associated with the first query.

In some cases, the query coordinator 506 may identify the one or more components based on component prioritization data. For example, the component prioritization data may indicate that a priority of at least one of the indexer or a component of the second data processing system 508 is greater as compared to a priority of the search head.

In some cases, the query coordinator 506 may identify the one or more components based on a cost-based optimization problem. For example, the query coordinator 506 may implement a cost-based optimization problem to identify the one or more components.

At block 806, the query coordinator 506 defines a query processing scheme indicating the one or more components are to obtain and process the data. The query processing scheme may further indicate that the one or more components are identified to obtain and process the at least a first portion of the set of data according to the first query. In some cases, the query coordinator 506 may define the query processing scheme based on the first query (e.g., the translated first query).

In some cases, the query processing scheme may further indicate that the second data processing system 508 is identified to obtain and process at least a second portion of the set of data according to the first query. The query processing scheme may further include instructions to instruct the second data processing system 508 to execute at least a portion of the first query.

At block 808, the query coordinator 506 provides the query processing scheme to a second data processing system 508. For example, the query coordinator 506 can route the query processing scheme as a Catalyst tree to the second data processing system 508.

At block 810, a data processing system interface 520 (e.g., a data processing system interface 520 associated with the first data processing system 510 and the second data processing system 508, a data processing system interface 520 of the second data processing system 508, etc.) receives an output of the second data processing system 508. The data processing system interface 520 may obtain the output based on the query coordinator 506 providing the query processing scheme to the second data processing system 508. The output may include one or more optimizations to the first query (e.g., by the second data processing system 508).

At block 812, the data processing system interface 520 generates a second query based on the output. The data processing system interface 520 can generate the second query to be processed by the one or more components of the first data processing system 510 based on the query processing scheme. In some cases, to generate the second query, the data processing system interface 520 may modify the first query based on one or more optimizations, indicated by the output, to the first query. In some cases, to generate the second query, the data processing system interface 520 may generate the second query based on the one or more optimizations.

At block 814, the data processing system interface 520 provides the second query to the one or more components. For example, the data processing system interface 520 may route the second query to the one or more components of the first data processing system 510 and instructions to execute the second query to the one or more components. The data processing system interface 520 may obtain query results from the one or more components based on execution of the second query.

In some cases, the data processing system interface 520 may obtain query results (e.g., first query results) from the one or more components. The query processing scheme may indicate that the second data processing system 508 is identified to obtain and process at least a second portion of the set of data according to the first query. As described herein, the second data processing system 508 may execute at least a portion of the first query based on the query processing scheme. The second data processing system 508 may perform a join of the query results and the second query results.

2.5 Query Execution According to Data Semantics of a Different Data Processing System The query coordinator 506 can obtain a query and dynamically assign portions of the query to one or more components and/or data processing systems for execution according to data semantics of the first data processing system 510.

The techniques described below can enable the definition of a query processing scheme that indicates data semantics of the first data processing system 510 such that an identified component and/or an identified data processing system can execute a portion of a query according to data semantics of the first data processing system 510 (which may be different as compared to data semantics of the identified component and/or the identified data processing system). The identified component and/or the identified data processing system can execute the portion of the query and route query results to the query coordinator 506

In some cases, systems may be unable to execute queries according to data semantics of different systems. This can cause inefficiencies in the query execution process.

Figure 9:
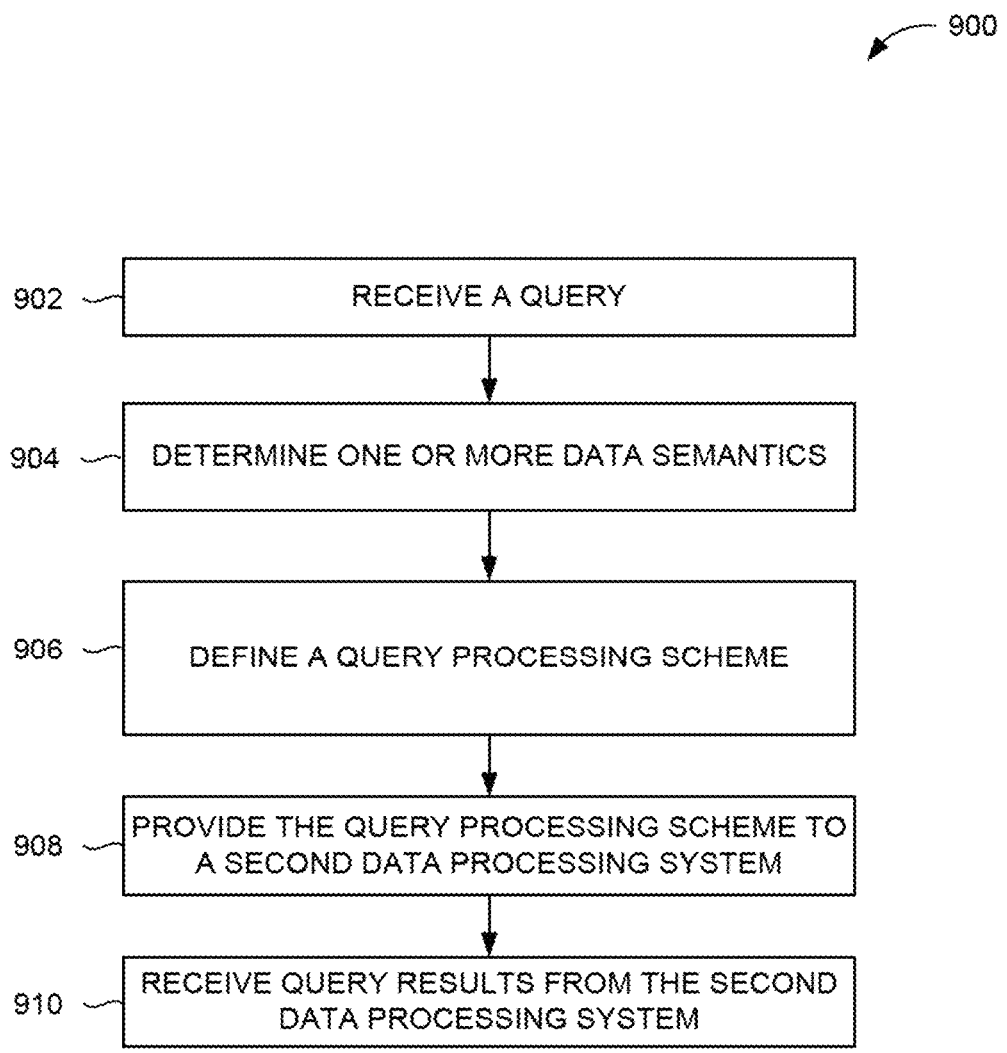
FIG. 9 is a flow diagram illustrative of an example of a routine, implemented by a query coordinator, for definition of a query processing scheme based on data semantics of a data processing system and provision of the query processing scheme to a second data processing system.

Turning to FIG. 9, an illustrative algorithm or routine 900 will be described for a query processing and execution process. The routine 900 may be implemented, for example, by the query coordinator 506 and/or the first data processing system 510 described with reference to FIG. 5. The routine begins at block 902, where the query coordinator 506 receives a query. The query may identify a set of data to be processed and a manner of processing the set of data. The set of data (e.g., as stored by, as provided by, etc.) may be accessible by all or a portion of a plurality of data processing systems.

At block 904, the query coordinator 506 determines one or more data semantics. For example, the one or more data semantics may be one or more data semantics of a first data processing system 510 of the plurality of data processing systems. The one or more data semantics may be different from data semantics of other data processing systems and/or components. For example, the one or more data semantics may indicate different manners of execution, translation, processing, etc. of a query, query results, data associated with the query, etc. as compared to data semantics of a second data processing system 508.

In some cases, the query coordinator 506 or a data processing system (e.g., the second data processing system 508) may obtain the one or more data semantics from a catalog (e.g., as stored in a data store). The one or more data semantics of the first data processing system 510 may be based on execution of one or more queries by the first data processing system 510. For example, the first data processing system 510 may execute one or more queries and the first data processing system 510, the second data processing system 508, and/or the query coordinator 506 may determine the one or more data semantics based on the execution of the one or more queries and store the one or more data semantics.

The one or more data semantics may indicate a manner of execution, translation, processing, etc. of the query, a manner of generation, translation, processing, etc. of query results, a manner of translation, processing, etc. of data associated with the query, etc. by the first data processing system 510. For example, the one or more data semantics may indicate a manner of filtering data associated with the query, one or more field values for execution of at least a portion of the query, one or more outputs based on one or more query results, etc.

At block 906, the query coordinator 506 defines a query processing scheme (e.g., for obtaining and processing at least a portion of the set of data based on at least a portion of the query). In some cases, the query processing scheme may indicate one or more components and/or data processing systems are to obtain and process the data according to the query. In some cases, the query coordinator 506 may define the query processing scheme based on the query (e.g., the translated query).

In some cases, to define the query processing scheme, the query coordinator 506 may generate instructions for a second data processing system 508 to execute at least a portion of the query according to the one or more data semantics (e.g., of the first data processing system 510). The query processing scheme may include or indicate the generated instructions. As described herein, the query coordinator 506 may dynamically assign the at least a portion of the query to the second data processing system 508. To dynamically assign the at least a portion of the query, the query coordinator 506 may analyze the at least a portion of the query based on component prioritization data and/or query parameters. For example, the query coordinator 506 may determine query parameters that may include one or more of a query processing time, a query translation time, a resource utilization, a processing capability (e.g., of the second data processing system 508), or data associated with the first query and may filter the query based on the query parameters to obtain a filtered query. The at least a portion of the query may include a first portion of the filtered query.

In some cases, the query processing scheme may include or may indicate additional instructions (for the second data processing system 508) indicating one or more operations for the second data processing system 508 to perform based on results of the execution of the query. For example, the additional instructions may include instructions for the second data processing system 508 to merge a first portion of the results based on execution of a first portion of the query with a second portion of the results based on execution of a second portion of the query to obtain the query results.

In some cases, the query coordinator 506 may identify one or more components to provide at least a portion of the query. For example, the query coordinator 506 may identify one or more components of a plurality of components (e.g., of a second data processing system 508) to provide the at least a portion of the query. In another example, the query coordinator 506 may identify one or more first components, of the plurality of components, (e.g., a search head of the first data processing system 510) to execute a first portion of the query and one or more second components, of the plurality of components, to execute a second portion of the query (e.g., an indexer of the first data processing system). The query coordinator 506 may define the query processing scheme according to the identified one or more components (e.g., such that the query processing scheme indicates the identified one or more components are assigned to at least a portion of the query).

At block 908, the query coordinator 506 provides the query processing scheme to a second data processing system 508 (which may be separate and/or remote from the first data processing system 510). The query coordinator 506 may provide the query processing scheme to an extension of the second data processing system 508. The extension may process (e.g., filter, translate, transform, etc.) the query, the set of data, and/or query results according to the one or more data semantics. For example, the extension may determine that query results provided by the second data processing system 508 are invalid (e.g., according to the one or more data semantics) and may generate replacement query results (e.g., indicating a null data set of query results). In some cases, the second data processing system 508 may process the query, the set of data, and/or the query results according to the one or more data semantics. In some cases, the second data processing system 508 (e.g., the extension) may obtain the data semantics from a catalog 512 based on the query processing scheme.

In some cases, the query coordinator 506 may provide the extension to the second data processing system 508. For example, the query coordinator 506 may generate the extension and provide the generated extension to the second data processing system 508.

At block 910, a data processing system interface 520 (e.g., of the second data processing system 508) receives query results from the second data processing system 508. In one example of the one or more data semantics, the second data processing system 508 may indicate a query failure for the query based on one or more data semantics of the second data processing system 508 and the second data processing system 508 may indicate a null set of query results for the query based on the one or more data semantics of the first data processing system 510. Execution of the at least a portion of the query by the second data processing system 508 according to the one or more data semantics of the first data processing system 510 may correspond to (e.g., may provide the same output and/or query results as, may semantically match, etc.) execution of the at least a portion of the query by the first data processing system 510.

In some cases, the query results may be first query results. To obtain the first query results, the second data processing system 508 may execute at least a portion of the query, generate second query results based on the execution of the at least a portion of the query, process (e.g., filter, transform, etc.) the second query results based on the one or more data semantics, and obtain the first query results based on processing the second query results.

In some cases, the query coordinator 506, the second data processing system 508, and/or the first data processing system 510 may update the extension and/or the one or more data semantics. For example, the query coordinator 506 may identify one or more updated data semantics of the first data processing system 510 and may provide the one or more updated data semantics to the second data processing system 508 (and/or to the extension). In another example, the second data processing system 508 may identify one or more updated data semantics of the first data processing system 510 and may store the one or more updated data semantics in the data catalog 512. In some cases, the query coordinator 506, the second data processing system 508, and/or the first data processing system 510 may generate the one or more updated data semantics (e.g., based on execution of one or more queries by the first data processing system 510). For example, the query coordinator 506 may generate the one or more updated data semantics in real time as queries are executed by the first data processing system 510.

3.0. DATA PROCESSING SYSTEM ARCHITECTURE

Figure 10:
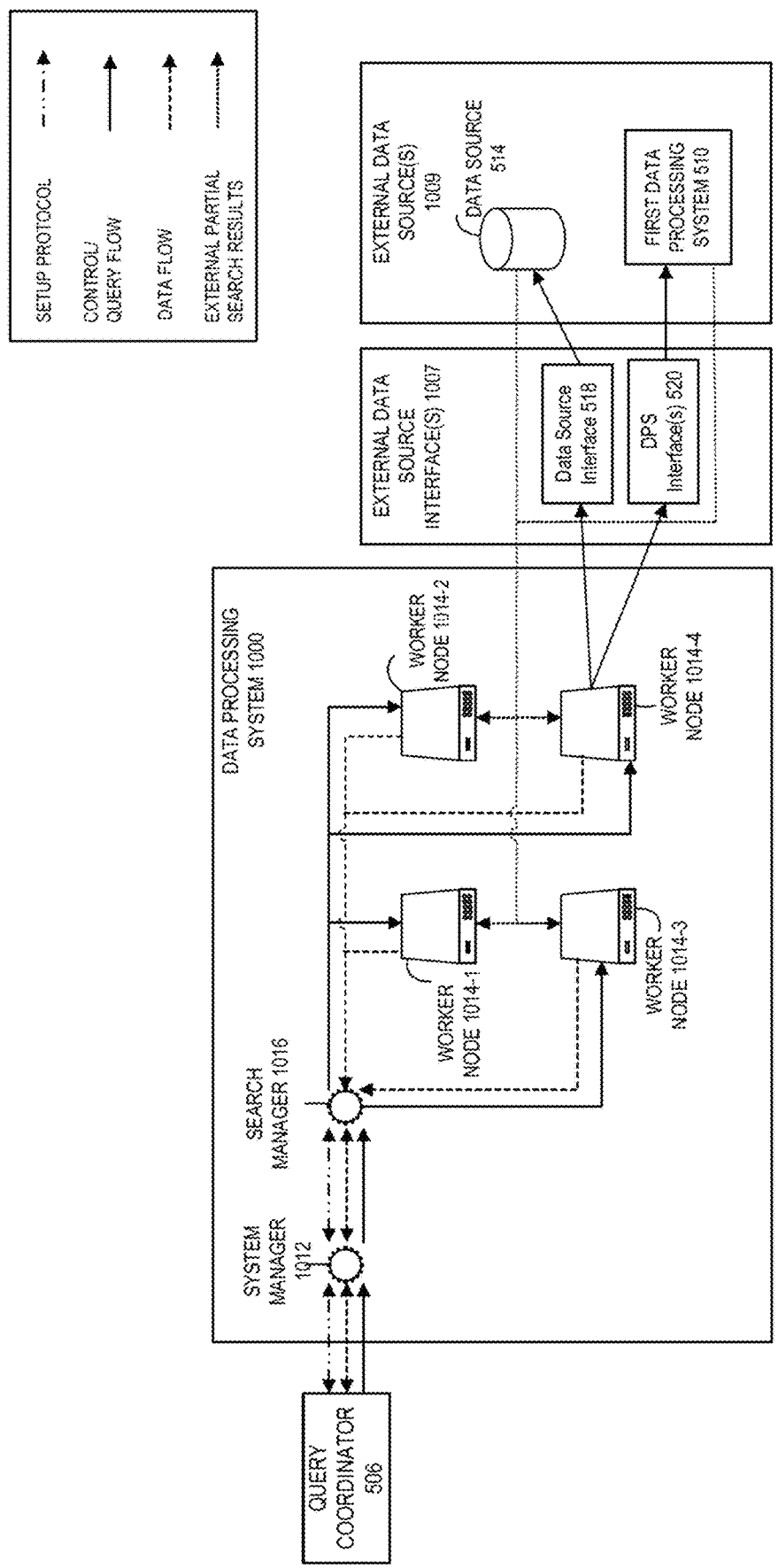
FIG. 10 is a system diagram illustrating a data fabric service system architecture ("DFS system") in which an embodiment may be implemented.

FIG. 10 is a system diagram illustrating an example of a data processing system 1000, such as the second data processing system 508, communicatively coupled with a query coordinator 506, one or more interface(s) 1007, and one or more external data sources 1009. In some cases, the data processing system 1000 is configured to process and execute queries or query processing schemes received from the query coordinator 506.

In the illustrated example, the data processing system 1000 includes a system manager 1012, search manager 1016, and multiple worker nodes 1014. It will be understood that the data processing system 1000 may include fewer or more components. For example, the data processing system 1000 may include multiple system managers 1012 and/or search managers 1016, or a single worker node 1014. In some cases, the data processing system 1000 does not include long term storage to store data long term within the system. For example, the data processing system 1000 may be configured to retrieve and process data from various (external) data sources.

In some cases, the data processing system 1000 may receive queries or query processing schemes from the query coordinator 506, process the query processing schemes as described herein, provide an output to external data source interface(s) 1007 (e.g., data source interface 518) and/or one or more data processing system interfaces 520, receive partial results from external data sources 1009 (e.g., from the data source 514, the first data processing system 510, and/or other data stores or data processing systems), process the partial results from the external data sources 1009, and provide the results of the processing to the query coordinator 506. In certain cases, the data processing system 1000 may obtain and harmonize results from the external data source 1009 (e.g., from the data source 514 and/or from the first data processing system 510, which may also process data from the data source 514).

The system manager 1012 may be communicatively coupled to the query coordinator 506 via the daemon 1011-3 and/or a network. In some embodiments, the system manager 1012 may include software components running on a device of any system, including the query coordinator 506 and/or the first data processing system 510. As such, the system manager 1012 can include software and underlying logic for establishing a logical connection to the query coordinator 506.

Although shown as separate components, the system manager 1012 and the search manager 1016 may reside on the same machine, or may be distributed across multiple machines. In some embodiments, running the system manager 1012 and the search manager 1016 on the same machine can increase performance of the data processing system 1000 by reducing communications over networks. As such, the query coordinator 506 can interact with the system manager 1012 and the search manager 1016 residing on the same machine or on different machines. For example, the query coordinator 506 can dispatch requests for search queries to the system manager 1012, which can spawn search managers 1016 for each search query.

Other functions of the search manager 1016 can include providing data isolation across different searches based on role/access control, as well as fault tolerance (e.g., localized to a search head). For example, if a search operation fails, then its spawned search manager may fail but other search managers for other searches can continue to operate.

The query coordinator 506 may receive a search query as described herein. For example, an analyst may submit a search query to the query coordinator 506 over a network from an application (e.g., web browser) running on a client device, through a network portal (e.g., website). In another example, the query coordinator 506 may receive the search query in accordance with a schedule of search queries. The search query can be expressed in a variety of languages such as a pipeline search language, a structured query language, etc.

The query coordinator 506 may process the search query to determine whether the data processing system 1000 is to handle the search query. In some embodiments, if the search query only requires searching the first data processing system 510, the query coordinator 506 may communicate the search query to the first data processing system 510 for execution. In some embodiments, however, the query coordinator 506 can invoke or engage the data processing system 1000 to utilize the worker nodes 1014 to receive partial results from the first data processing system 510 alone (or other data processing systems), search data source 514 alone (or other data sources), or search both and harmonize the partial search results of the first data processing system 510 and the data source 514 (or other external data sources), and return the search results to the query coordinator 506 via the system manager 1012 and/or the search manager 1016.

If query coordinator 506 determines that the data processing system 1000 is to handle the search query, then the query coordinator 506 can invoke and engage the data processing system 1000. Accordingly, in some embodiments, the query coordinator 506 can engage the data processing system 1000 when a search query is to be applied to the first data processing system 510 and/or other data sources, or is otherwise to be handled by the data processing system 1000. The query coordinator 506 can pass a search query and/or a defined query processing scheme to the system manager 1012, which can create (e.g., spawn) a search manager (e.g., search manager 1016) to conduct the search. As described herein, in some cases, the search query and/or query processing scheme passed to the data processing system 1000 can identify some portion of the query to be executed by the first data processing system 510 and/or another portion to be executed by the data processing system 1000.

The search manager 1016 can process the query processing scheme to generate one or more optimizations for the search query and provide those optimization to a data processing system interface 520 or other interface(s) 1007. As described herein, the data processing system interface 520 may generate a query for the first data processing system 510 using the optimizations and/or translate the (optimized) query, and communicate the query, optimized query, and/or translated (optimized) query to the first data processing system 510 for execution. In the illustrated example, the search manager 1016 provides the outputs or optimizations to the data processing system interface 520 via worker node 1014-4. It will be understood, however, that the search manager 1016 may provide the outputs or optimizations to the data processing system interface 520 directly (e.g., without the use of a worker node 1014).

The search manager 1016 can collect and aggregate partial search results from the first data processing system 510 and/or the worker nodes 1014, and communicate the aggregate partial search results to the query coordinator 506. In some embodiments, the system manager 1012, query coordinator 506, or the worker nodes 1014 can produce the final search results, which the query coordinator 506 can cause to be presented on a user interface of a display device.

The worker nodes 1014 may be implemented on one or more computing devices. In some cases, the worker nodes 1014 are implemented on separate computing devices. In certain cases, the worker nodes 1014 are implemented in a cloud environment, such as AWS. The worker nodes 1014 may act as agents of the system manager 1012 via the search manager 1016, which can act on behalf of the query coordinator 506 to apply a search query to distributed data systems. For example, the system manager 1012 can manage different search operations and balance workloads in the data processing system 1000 by keeping track of resource utilization while the search manager 1016 is responsible for executing search operations and obtaining the search results.

For example, the search manager 1016 can cause the worker nodes 1014 to apply a search query to the data source 514 (e.g., using the data source interface 518). The search manager 1016 can also cause the worker nodes 1014 to collect the partial search results from the first data processing system 510 (e.g., directly or via the data processing system interface 520) or other data processing systems. Moreover, the search manager 1016 can cause the worker nodes 1014 to aggregate the partial search results collected from the first data processing system 510, the data source 514, and/or other external data sources 1009.

Hence, the query coordinator 506 can offload at least some processing to the worker nodes 1014 because the distributed worker nodes 1014 can obtain data and/or process partial search results from external data sources 1009. Moreover, the worker nodes 1014 can aggregate the partial search results collected from the diverse data systems and transfer them to the search manager 1016, which can finalize the search results and send them to the query coordinator 506. Aggregating the partial search results of the diverse data systems can include combining partial search results, arranging the partial search results in an ordered manner, and/or performing operations derive other search results from the collected partial search results (e.g., transform the partial search results).

Once a logical connection is established between the query coordinator 506 and the data processing system 1000, the control and data flows can traverse the components of the data processing system 1000. For example, the control flow can include instructions from the system manager 1012 to the worker nodes 1014 to carry out the operations detailed further herein. Moreover, the data flow can include aggregate partial search results transferred to the search manager 1016 from the worker nodes 1014. In some embodiments, the data processing system 1000 can use a redistribute operator to distribute data in a sharded manner to the different worker nodes 1014.

The worker nodes 1014 can be communicatively coupled to each other, and to the external data sources 1009. Each worker node 1014 can include one or more software components or modules 1018 ("modules") operable to carry out the functions of the data processing system 1000 by communicating with the search manager 1016, the indexers 1006, and the external data sources 1009. The modules 1018 can run on a programming interface of the worker nodes 1014. An example of such an interface is APACHE SPARK, which is an open source computing framework that can be used to execute the worker nodes 1014 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 1014). The RDDs function as a working set for distributed programs that offer a form of distributed shared memory.

Thus, the search manager 1016 can act as a manager of the worker nodes 1014, including their distributed data storage systems, to extract, collect, and store partial search results via their modules 1018 running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules 1018 for the system manager 1012 to apply search queries to the distributed data systems.

Accordingly, the worker nodes 1014 can harmonize the partial search results of the external data sources 1009, and provide those aggregated partial search results to the search manager 1016. In some embodiments, the search manager 1016 or system manager 1012 can further operate on the aggregated partial search results to obtain final results that are communicated to the query coordinator 506, which can output the search results as reports or visualizations on a display device.

The data processing system 1000 is scalable to accommodate any number of worker nodes 1014. As such, the data processing system 1000 can scale to accommodate any number of distributed data systems upon which a search query can be applied and the search results can be returned to the search head and presented in a concise or comprehensive way for an analyst to obtain insights into big data.

In some embodiments, the data processing system 1000 can be launched by using a modular input, which may refer to a platform add-on that can be accessed in a variety of ways such as, for example, over the Internet on a network portal. For example, the query coordinator 506 can use a modular input to launch the data processing system 1000 (e.g., the system manager 1012, the search manager 1016, and/or the worker nodes 1014). In some embodiments, a modular input can be used to launch a monitor function used to monitor the worker nodes 1014 of the data processing system 1000. In the event that a component of the data processing system 1000 fails, the monitor may allow the system manager 1012 and/or query coordinator 506 to detect the failed component and re-launch it or launch or reuse another component of the data processing system 1000 to provide the functions of the component. In some embodiments, the monitor function for monitoring nodes can be launched and controlled by the search manager 1016.

As described herein, the query coordinator 506 may execute a search phase generation process to define a search scheme (e.g., query processing scheme) based on the scope of the search query. The search phase generation process may involve an evaluation of the scope of the search query to define one or more phases to be executed by the first data processing system 510 and/or the data processing system 1000, to obtain search results that would satisfy the search query. The search phases, or layers, may include a combination of phases for initiating search operations, searching the first data processing system 510, searching the data source 514, or other data sources 1009, and/or finalizing search results for return back to the query coordinator 506.

In some embodiments, the combination of search phases can include phases for operating on the partial search results retrieved from the first data processing system 510 and/or other external data sources 1009. For example, a search phase may include correlating or combining partial search results of the first data processing system 510 (e.g., from a search head or indexers of the first data processing system 510) and/or other external data sources 1009. In some embodiments, a combination of phases may be ordered as a sequence that requires an earlier phase to be completed before a subsequent phase can begin. However, the disclosure is not limited to any combination or order of search phases. Instead, a search scheme can include any number of search phases arranged in any order that could be different from another search scheme applied to the same or another arrangement or subset of data systems.

For example, a first search phase may be executed by the worker nodes 1014 to extract and collect partial search results from the data source 514. A second search phase may be executed by the first data processing system 510 to process other data from the data source 514 (or another data source) and communicate the partial search results to the worker nodes 1014 (e.g., in parallel from indexers of the first data processing system 510 and/or from a search head of the first data processing system 510). As such, the second phase involves collecting the partial search results from the first data processing system 510. A third search phase may be executed by the worker nodes 1014 to aggregate (e.g., combine and/or operate on) the partial search results of the first data processing system 510 and/or the data source 514. A fourth and fifth phase may involve further processing by the worker nodes 1014 and/or additional processing by the search manager 1016 to generate final search results. The search results may then be transmitted to the query coordinator 506. In some cases, a sixth search phase may involve further operating on the search results by the query coordinator 506 to obtain final search results that can be, for example, rendered on a user interface of a display device.

The query coordinator 506 may initiate a communications search protocol that establishes a logical connection with the worker nodes 1014 via the search manager 1016. Specifically, the query coordinator 506 may communicate information to the system manager 1012 and/or the search manager 1016, including a portion of the search scheme to be performed by the worker nodes 1014. For example, a portion of the search scheme transmitted to the system manager 1012 may include search phase(s) to be performed by the search manager 1016 and the worker nodes 1014. The information may also include specific control information enabling the worker nodes 1014 to access the data sources 1009 subject to the search query.

The query coordinator 506 may define an executable search process performed by the data processing system 1000. For example, the system manager 1012 or the search manager 1016 can define a search process as a logical directed acyclic graph (DAG) based on the search phases included in the portion of the search scheme received from the query coordinator 506. The DAG can be a directed graph that defines a topological ordering of the search phases performed by the data processing system 1000. As such, a sequence of the vertices of the DAG represents a sequence of search phases such that every edge is directed from earlier to later in the sequence of search phases. For example, the DAG may be defined based on a search string for each phase or metadata associated with a search string. The metadata may be indicative of an ordering of the search phases such as, for example, whether results of any search string depend on results of another search string such that the later search string must follow the former search string sequentially in the DAG.

As described herein, in some cases, the DAG may reference a portion of the query that is to be executed by the first data processing system 510 and/or a portion of the query to be executed by the data processing system 1000.

The data processing system 1000 may start executing the search phases that cause the worker nodes 1014 to extract partial search results from the external data sources 1009 and collect the extracted partial search results at the worker nodes 1014, respectively. For example, the search service can start executing the search phases of the DAG that cause the worker nodes 1014 to search the external data sources 1009. Then, the worker nodes may collect the partial search results extracted from the external data sources 1009.

The search phases executed by the data processing system 1000 can also cause the worker nodes 1014 to communicate with the data processing system interface 520 of the first data processing system 510. For example, the worker nodes 1014 (or the search manager 1016) may communicate optimizations (or other outputs generated by the search manager 1016 and/or worker nodes 1014) and a query to the first data processing system 510. The data processing system interface 520 may use the optimizations and query to generate a second query and may translate the query for execution by the first data processing system 510. The first data processing system 510 may execute the received (optimized and/or translated) query and return partial results. The worker nodes 1014, in turn, can collect the partial search results from the first data processing system 510.

The worker nodes 1014 can aggregate the partial search results and send them to the search manager 1016. For example, the search manager 1016 can begin collecting the aggregated search results from the worker nodes 1014. The aggregation of the partial search results may include combining the partial search results of the first data processing system 510, data source 514 and/or other external data sources 1009. In some embodiments, the aggregated partial search results can be time-ordered or unordered depending on the requirements of the type of search query.

In some embodiments, aggregation of the partial search results may involve performing one or more operations on a combination of partial search results. For example, the worker nodes 1014 may operate on a combination of partial search results with an operator to output a value derived from the combination of partial search results. This transformation may be required by the search query. For example, the search query may be an average or count of data events that include specific keywords. In another example, the transformation may involve determining a correlation among data from different data sources that have a common keyword. As such, transforming the search results may involve creating new data derived from the partial search results obtained from the external data sources 1009.

A data pipeline is formed to the query coordinator 506 through the search manager 1016 and/or system manager 1012 once the worker nodes 1014 have received the partial search results from the external data sources 1009 and aggregated the partial search results (e.g., and transformed the partial search results).

The aggregate search results received by the search manager 1016 and/or system manager 1012 may optionally be operated on to produce final search results. For example, the aggregate search results may include different statistical values of partial search results collected from different worker nodes 1014. The search manager 1016 and/or system manager 1012 may operate on those statistical values to produce search results that reflect statistical values of the statistical values obtained from the all the worker nodes 1014.

As such, the produced search results can be transferred in a big data pipeline to the query coordinator 506. The big data pipeline may be a pipeline of the data intake and query system 1002 extended into the big data ecosystem. Hence, the search results are transmitting to the query coordinator 506 where the search query was received by a user. The query coordinator 506 can render the search results or data indicative of the search results on a display device. For example, the query coordinator 506 can make the search results available for visualizing on a user interface rendered via a computer portal.

In some embodiments, for example, some of the tasks described as being performed by the query coordinator 506 can be performed by the search manager 1016 and/or system manager 1012. For example, upon receiving the search query, the query coordinator 506 can determine that the data processing system 1000 will handle the query. Accordingly, the query coordinator 506 can communicate the search query to the search service to initiate the search. In turn, the search manager 1016 can define the search scheme and search process. As part of defining the search scheme and process, the search manager 1016 can determine which external data sources 1009 will be accessed. Once the scheme and process are defined, the search manager 1016 can generate optimizations for the respective external data sources 1009 and communicate the optimizations and the queries to the external data source interface(s) 1007. The external data source interface(s) 1007 can use the optimizations and queries to generate queries for the respective external data sources 1009. The partial search results from both can be communicated to the worker nodes 1014 for processing, which can aggregate them together. The results can then be provided to the search manager 1016, further processed, and then communicated to the query coordinator 506 for rendering for the client device. In some cases, the further processing performed by the search manager 1016 can include additional transforms on the results received from the worker nodes 1014 based on the query. Accordingly, in such an embodiment, the data processing system 1000 can be delegated some of the query coordinator 506 processing, thereby freeing up the query coordinator 506 to handle additional queries.

In some cases, the data processing system 1000 may be deployed on a cloud computing platform (e.g., sharing processing resources and data in a multi-tenant network). A cloud-based system can include components of a data intake and query system extended by the data processing system 1000 implemented on a cloud computing platform. An example of a suitable cloud computing platform include Amazon web services (AWS), which includes elastic MapReduce (EMR) web services. However, the disclosed embodiments are not so limited. Instead, the cloud-based system could include any cloud computing platform that uses EMR-like clusters ("EMR clusters").

The scale of the cloud-based system can be changed dynamically as needed based on any number of metrics. For example, the scale can change based on pricing constraints, performance of search operations, a received search query, etc.

The cloud-based system can include any number of system manager 1012 and/or the search manager 1016 as tenant(s) of a cloud computing platform. The components of the cloud-based data processing system 1000 can be configured on the cloud computing platform.

The cloud-based data processing system 1000 can include any number of worker nodes as cloud instances ("cloud worker nodes"). The cloud worker nodes can include software modules running on hardware devices of a cloud computing platform. The software modules of the cloud worker nodes may be communicatively coupled to the system manager 1012 and/or the search manager 1016, which may be communicatively coupled to a daemon of the query coordinator 506 to collectively carry out operations of the cloud-based system. The cloud worker nodes can be communicatively coupled to one or more external data source interface(s) 1007 and/or external data sources 1009.

The cloud-based system can ensure that data (e.g., partial search results) from diverse data sources (e.g., including time-indexed events with raw data or other type of data) are reduced (e.g., combined) at scale on each EMR node of the EMR cluster before sending the aggregated search results to the 506// or the search manager 1016.

Figure 11:
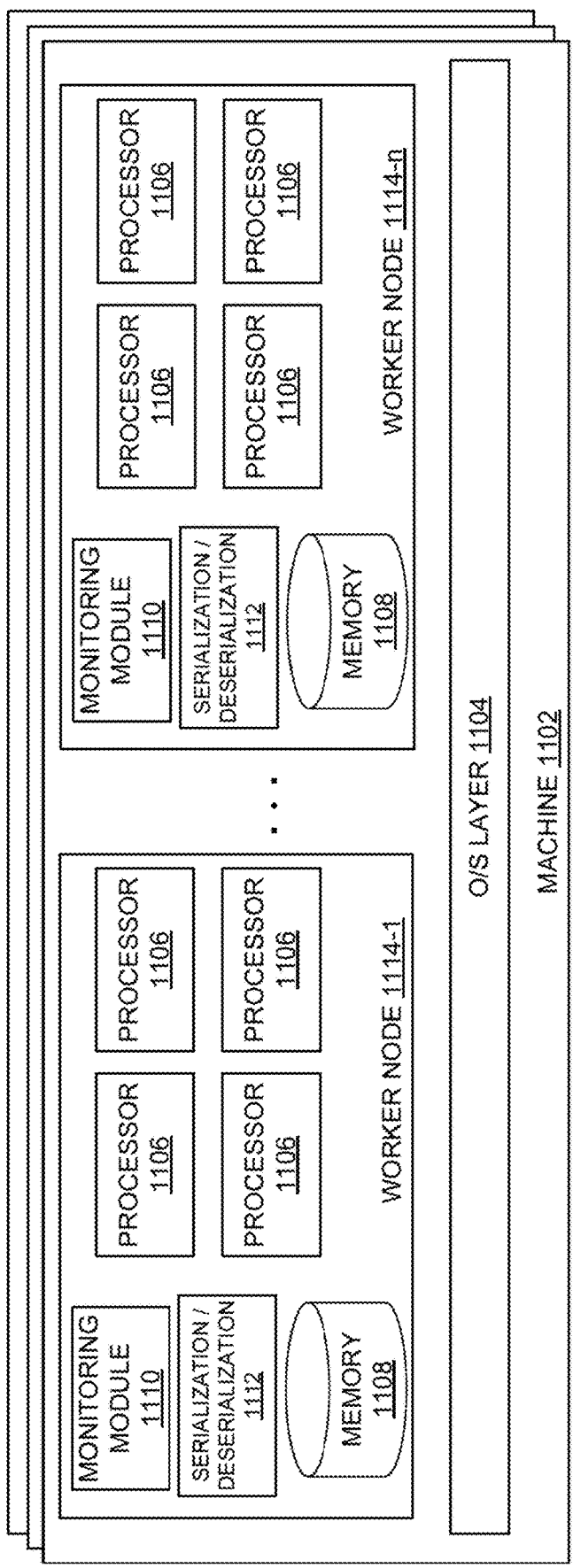
FIG. 11 is a block diagram illustrating an embodiment of multiple machines, each having multiple nodes.

FIG. 11 is a block diagram illustrating an embodiment of multiple machines 1102, each having multiple worker nodes 1114-1, 1114-n (individually and collectively referred to as node 1114 or nodes 1114) residing thereon. The worker nodes 1114 represent non-limiting examples of the worker nodes 516 and/or the worker nodes 1014.

The worker nodes 1114 across the various machines 1102 can be communicatively coupled to each other, to the various components of the data processing system 1000 (e.g., system manager 1012, the search manager 1016, etc.) and to the external data sources 1009 (e.g., via the interface(s) 1007).

The machines 1102 can be implemented using multi-core servers or computing systems and can include an operating system layer 1104 with which the nodes 1114 interact. For example, in some embodiments, each machine 1102 can include 32, 48, 64, or more processor cores, multiple terabytes of memory, etc.

In the illustrated embodiment, each node 1114 includes four processors 1106, memory 1108, a monitoring module 1110, and a serialization/deserialization module 1112. It will be understood that each node 1114 can include fewer or more components as desired. Furthermore, it will be understood that the nodes 1114 can include different components and resources from each other. For example, node 1114-1 can include fewer or more processors 1106 or memory 1108 than the node 1114-n.

The processors 1106 and memory 1108 can be used by the nodes 1114 to perform the tasks assigned to it by the search manager 1016 and can correspond to a subset of the memory and processors of the machine 1102. Thus, reference to a worker node 1114 can also be understood to be a reference to one or more processors 1106 of a worker node 1114 and vice versa (e.g., allocating, assigning, or selecting a worker node 1114 can refer to allocating, assigning, or selecting one or more processors 1106 of a worker node 1114). The serialization/deserialization module 1112 can be used to serialize/deserialize data for communication between components of the system.

The monitoring module 1110 can be used to monitor the state and utilization rate of the node 1114 or processors 1106 and report the information to the system manager 1012. For example, the monitoring module 1110 can indicate the number of processors in use by the node 1114, the utilization rate of each processor, whether a processor is unavailable or not functioning, the amount of memory used by the processors 1106 or node 1114, etc.

In addition, each worker node 1114 can include one or more software components or modules ("modules") operable to carry out the functions of the system by communicating with the system manager 1012, the search manager 1016, and/or external data sources 1009. The modules can run on a programming interface of the worker nodes 1114. An example of such an interface is APACHE SPARK, which is an open source computing framework that can be used to execute the worker nodes 1114 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 1114). The RDDs function as a working set for distributed programs that offer a form of distributed shared memory.

Based on instructions received from a search manager 1016, the worker nodes 1114 can collect and process data or partial search results of a distributed network of data storage systems, and provide aggregated partial search results or finalized search results to the search manager 1016 or other destination. Accordingly, the search manager 1016 can act as a manager of the worker nodes 1114, including their distributed data storage systems, to extract, collect, and store partial search results via their modules running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules for the search manager 1016 to apply search queries to the distributed node 1114.

As a non-limiting example, as part of processing a query, a node 1114 can receive instructions from the search manager 1016 to perform one or more tasks. For example, the node 1114 can be instructed to intake data from a particular external data sources 1009, parse received data from an external data sources 1009 to identify relevant data in the dataset, collect partial results from the parsing, join results from multiple datasets, or communicate partial or completed results to a destination, etc. In some cases, the instructions to perform a task can come in the form of a DAG or query processing scheme. In response, the node 1114 can determine what task it is to perform in the DAG, and execute it.

As part of performing the assigned task, the node 1114 can determine how many processors 1106 to allocate to the different tasks. In some embodiments the node can determine that all processors 1106 are to be used for a particular task or only a subset of the processors 1106. In certain embodiments, each processor 1106 of the node 1114 can be used in association with one or more partitions to intake, process, or collect data according to a task. Upon completion of the task, the node 1114 can inform the search manager 1016 that the task has been completed.

Depending on its context, partition can refer to different things. For example, in some cases, a partition can refer to a set of data in one or more data stores, such as an index, or a stream of data. In certain cases, a partition can refer to smaller sets of data, such as when data is partitioned (or split up) into smaller parts. In yet other cases, one or more partitions can be assigned to a processor 1106 or a worker node 1114, and reference to a partition performing an action can refer to a processor 1106 performing the action on one or more groups of data or data entries assigned thereto. Similarly, in some cases, reference to assigning a job or action to a partition can refer to the assignment of a processor 1106 or worker node 1114 to perform that job or action. For example, the assignment of a partition to receive data from an external data source can refer to a processor 1106 receiving data from the external data source and grouping the data into one or more groups or partitions of data. Thus, as used herein and based on the context provided, a partition can refer to an index, a task, a set or group of data, data entries, events, or records, or can refer to a processor 1106 that performs a particular action on one or more groups or sets of data, data entries, or records. Further, in some instances, a partition can refer to a group of data, data entries, events, or records and computer-executable instructions that indicate how the group of data is to be processed by a processor 1106 or worker node 1114.

When instructed to intake data, the processors 1106 of the node 1114 can be used to communicate with external data sources 1009 (non-limiting examples: data source 514, first data processing system 510, etc.). Once the node 1114 is in communication with the external data sources 1009, it can intake the data from the external data sources 1009. As described in greater detail herein, in some embodiments, multiple processors of a node (or different nodes) can be assigned to intake data from a particular source as one or more partitions.

When instructed to parse or otherwise process data, the processors 1106 of the node 1114 can be used to review the data and identify portions of the data that are relevant to the query. For example, if a query includes a request for events with certain errors or error types, the processors 1106 of the node 1114 can parse the incoming data to identify different events, parse the different events to identify error fields or error keywords in the events, and determine the error type of the error. In some cases, this processing can be similar to the processing described in greater detail above with reference to the indexers processing data to identify relevant results in the data stores.

When instructed to collect data, the processors 1106 of the node 1114 can be used to receive data from external data sources 1009 or from another node 1114. With continued reference to the error example, a collector partition can collect all of the errors of a certain type from one or more parsing partitions. For example, if there are seven possible types of errors coming from a particular external data sources 1009, a collector partition could collect all type 1 errors (or events with a type 1 error), while another collector partition could collect all type 2 errors (or events with a type 2 error), etc.

When instructed to join results from multiple datasets, the processors 1106 of the node 1114 can be used to receive data corresponding to two different datasets and combine or further process them. For example, if data is being retrieved from an external data source and a data store of the indexers, join partitions could be used to compare and collate data from the different data stores in order to aggregate the results.

When instructed to communicate results to a particular destination, the processors 1106 of the node 1114 can be used to prepare the data for communication to the destination and then communicate the data to the destination. For example, in communicating the data to a particular destination, the node 1114 can communicate with the particular destination to ensure the data will be received. Once communication with the destination has been established, the partition, or processor associated with the partition, can begin sending the data to the destination. As described in greater detail herein, in some embodiments, multiple partitions of a node (or different nodes) can be assigned to communicate data to a particular destination. Furthermore, the nodes 1114 can be instructed to transform the data so that the destination can properly understand and store the data. Furthermore, the nodes can communicate the data to multiple destinations. For example, one copy of the data may be communicated to the search manager 1016 and another copy can be communicated to another destination.

The system is scalable to accommodate any number of worker nodes 1114. As such, the system can scale to accommodate any number of distributed data systems upon which a search query can be applied and the search results can be returned to the search head and presented in a concise or comprehensive way for an analyst to obtain insights into big data.

In some cases, the serialization/deserialization module 1112 can generate and transmit serialized event groups. An event group can include the following information: number of events in the group, header information, event information, and changes to the cache or cache deltas. The serialization/deserialization module 1112 can identify the differences between the pieces of information using a type code or token. As part of generating the group and serializing the data, the serialization/deserialization module 1112 can determine the number of events to group, determine the order and field names for the fields in the events of the group, parse the events, determine the number of fields for each event, identify and serialize serializable field values in the event fields, and identify cache deltas.

4.0. HARDWARE EMBODIMENT

Figure 12:
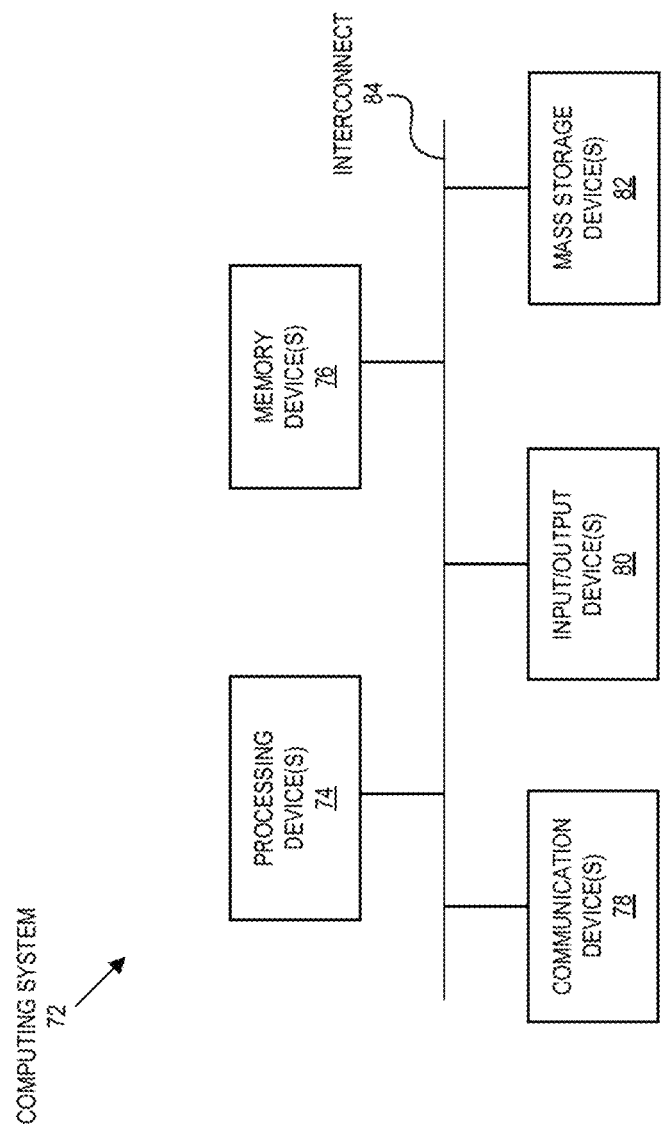
FIG. 12 is a block diagram illustrating a high-level example of a hardware architecture of a computing system in which an embodiment may be implemented.

FIG. 12 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, server computer system, edge device, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described herein.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

5.0. EXAMPLE EMBODIMENTS

Embodiments of the present disclosure can be described in view of the following clauses:

Clause 1: A method, comprising:
receiving, at a query coordinator, a first query identifying a set of data to be processed and a manner of processing the set of data;
identifying a first portion of the first query is to be executed by a first data processing system and a second portion of the first query is to be executed by a second data processing system;
generating a modified query based on identifying the first portion of the first query is to be executed by the first data processing system and the second portion of the first query is to be executed by the second data processing system, wherein generating the modified query comprises replacing the first portion of the first query with a query identifier;
defining a query processing scheme for obtaining and processing at least a portion of the set of data based on the modified query;
providing the query processing scheme to the second data processing system;
receiving an output of the second data processing system based on the second data processing system processing the query processing scheme;
generating a second query to be processed by a component of the first data processing system based on the first portion of the first query and the output of the second data processing system; and
providing the second query to the component of the first data processing system.

Clause 2: The method of Clause 1, wherein generating the second query comprises: generating the second query based on the modified query.

Clause 3: The method of any one of Clause 1 or 2, wherein the set of data is accessible by the first data processing system and the second data processing system.

Clause 4: The method of any one of Clauses 1 through 3, wherein receiving the output comprises:
receiving the output via a data processing system interface associated with the first data processing system and the second data processing system, and
wherein providing the second query to the component comprises:
providing the second query to the component via the data processing system interface.

Clause 5: The method of any one of Clauses 1 through 4, further comprising:
translating the first query from a first query language interpretable by the first data processing system to a second query language interpretable by the second data processing system to obtain a translated first query,
wherein generating the modified query comprises:
modifying the translated first query.

Clause 6: The method of any one of Clauses 1 through 5, further comprising:
obtaining a catalog, wherein the catalog maps one or more first portions of a query according to a first query language interpretable by the first data processing system to one or more second portions of a query according to a second query language interpretable by the second data processing system;
identifying one or more updates to the catalog based on input obtained from a computing device to obtain an updated catalog; and
translating the first query from the first query language to the second query language based on the updated catalog to obtain a translated first query,
wherein obtaining the modified query comprises:
modifying the translated first query.

Clause 7: The method of any one of Clauses 1 through 6, wherein the output comprises one or more optimizations to the first query.

Clause 8: The method of any one of Clauses 1 through 7, wherein the output comprises one or more optimizations to the first query, wherein identifying the second query comprises:
modifying the first query based on the one or more optimizations to the first query to identify the second query; or
generating the second query based on the one or more optimizations to the first query.

Clause 9: The method of any one of Clauses 1 through 8, further comprising: generating a command tree based on the modified query, wherein the query processing scheme comprises the command tree.

Clause 10: The method of any one of Clauses 1 through 9, wherein at least one of the first data processing system or the second data processing system performs a join of first query results based on execution of the first portion of the first query and second query results based on execution of the second portion of the first query.

Clause 11: The method of any one of Clauses 1 through 10, wherein the first data processing system executes queries on unstructured data, and wherein the second data processing system executes queries on structured data.

Clause 12: The method of any one of Clauses 1 through 11, wherein the query processing scheme comprises instructions for the second data processing system to route the second portion of the first query to one or more components of the second data processing system.

Clause 13: The method of any one of Clauses 1 through 12, wherein the query processing scheme comprises instructions for the second data processing system to process the second portion of the first query, generate the output based on processing the first portion of the first query, and route the output to the first data processing system.

Clause 14: The method of any one of Clauses 1 through 13, wherein the modified query comprises:
the second portion of the first query and the query identifier.

Clause 15: The method of any one of Clauses 1 through 14, wherein obtaining the modified query comprises:
applying metadata bindings to the first query to obtain the modified query.

Clause 16: The method of any one of Clauses 1 through 15, wherein the first data processing system is separate and remote from the second data processing system.

Clause 17: The method of any one of Clauses 1 through 16, further comprising:
determining at least one of a query processing time, a query translation time, a resource utilization, a processing capability, or data associated with the first query, wherein identifying the first portion of the first query and the second portion of the first query is based on the at least one of the query processing time, the query translation time, the resource utilization, the processing capability, or the data associated with the first query.

Clause 18: The method of any one of Clauses 1 through 17, further comprising:
identifying the component to provide the second query.

Clause 19: A query coordinator comprising:
a data store; and
one or more processors configured to:
receive a first query identifying a set of data to be processed and a manner of processing the set of data;
identify a first portion of the first query is to be executed by a first data processing system and a second portion of the first query is to be executed by a second data processing system;
generate a modified query based on identifying the first portion of the first query is to be executed by the first data processing system and the second portion of the first query is to be executed by the second data processing system, wherein to generate the modified query, the one or more processors are configured to replace the first portion of the first query with a query identifier;
define a query processing scheme for obtaining and processing at least a portion of the set of data based on the modified query; and
provide the query processing scheme to the second data processing system,
wherein a data processing system interface is configured to receive an output of the second data processing system based on the second data processing system processing the query processing scheme, generate a second query to be processed by a component of the first data processing system based on the first portion of the first query and the output of the second data processing system, and provide the second query to the component of the first data processing system.

Clause 20: Non-transitory computer-readable media including computer-executable instructions that, when executed by a query coordinator, cause the query coordinator to:
receive a first query identifying a set of data to be processed and a manner of processing the set of data;
identify a first portion of the first query is to be executed by a first data processing system and a second portion of the first query is to be executed by a second data processing system;
generate a modified query based on identifying the first portion of the first query is to be executed by the first data processing system and the second portion of the first query is to be executed by the second data processing system, wherein to generate the modified query, execution of the computer-executable instructions by the query coordinator, further causes the query coordinator to replace the first portion of the first query with a query identifier;
define a query processing scheme for obtaining and processing at least a portion of the set of data based on the modified query; and
provide the query processing scheme to the second data processing system,
wherein a data processing system interface is configured to receive an output of the second data processing system based on the second data processing system processing the query processing scheme, generate a second query to be processed by a component of the first data processing system based on the first portion of the first query and the output of the second data processing system, and provide the second query to the component of the first data processing system.

Clause 21: A method, comprising:
receiving, at a query coordinator, a first query identifying a set of data to be processed and a manner of processing the set of data;
parsing at least one of the first query or metadata associated with the first query to identify one or more components of a first data processing system, of a plurality of data processing systems, to obtain and process at least a first portion of the set of data according to the first query, wherein the set of data is accessible by each of the plurality of data processing systems;

defining a query processing scheme indicating that the one or more components are identified to obtain and process the at least a first portion of the set of data according to the first query;

providing the query processing scheme to a second data processing system of the plurality of data processing systems;

receiving an output of the second data processing system based on providing the query processing scheme to the second data processing system;

generating a second query to be obtained and processed by the one or more components based on the query processing scheme; and providing the second query to the one or more components.

Clause 22: The method of Clause 21, further comprising:
identifying the set of data based on the first query; and
identifying the plurality of data processing systems based on the set of data being accessible by each of the plurality of data processing systems.

Clause 23: The method of any of Clause 21 or 22, further comprising:
translating the first query to obtain a translated first query, wherein defining the query processing scheme comprises:
defining the query processing scheme based on the translated first query.

Clause 24: The method of any one of Clauses 21 through 23, wherein the query processing scheme further indicates that the second data processing system is identified to obtain and process at least a second portion of the set of data according to the first query.

Clause 25: The method of any one of Clauses 21 through 24, further comprising:
obtaining first query results from the one or more components,
wherein the query processing scheme further indicates that the second data processing system is identified to obtain and process at least a second portion of the set of data according to the first query, wherein the second data processing system obtains and processes the at least a second portion of the set of data according to the first query to obtain second query results, wherein at least one of the first data processing system or the second data processing system performs a join of the first query results and the second query results.

Clause 26: The method of any one of Clauses 21 through 25, wherein the output comprises one or more optimizations to the first query, wherein generating the second query comprises:
modifying the first query based on the one or more optimizations to the first query to identify the second query; or
generating the second query based on the one or more optimizations to the first query.

Clause 27: The method of any one of Clauses 21 through 26, wherein the one or more components comprise at least one of an indexer or a search head.

Clause 28: The method of any one of Clauses 21 through 27, wherein the one or more components comprise at least one of an indexer or a search head, wherein identifying the one or more components is based on component prioritization data, and wherein the component prioritization data indicates that a priority of at least one of the indexer or a component of the second data processing system is greater as compared to a priority of the search head.

Clause 29: The method of any one of Clauses 21 through 28, further comprising:
identifying the one or more components based on at least one of a command, a function, or an expression of the first query.

Clause 30: The method of any one of Clauses 21 through 29, further comprising:
identifying the one or more components based on a cost based optimization problem.

Clause 31: The method of any one of Clauses 21 through 30, further comprising:
obtaining a catalog, wherein the catalog maps one or more first portions of a query according to a first query language interpretable by the first data processing system to one or more second portions of a query according to a second query language interpretable by the second data processing system; and
identifying the one or more components based on the catalog.

Clause 32: The method of any one of Clauses 21 through 31, further comprising:
determining the first query corresponds to an index; and
identifying the one or more components based on determining the first query corresponds to the index.

Clause 33: The method of any one of Clauses 21 through 32, further comprising:
identifying the one or more components based on at least one of:
a query processing time associated with the one or more components and the first query;
a query translation time associated with the first query;
a resource utilization associated with the first query; or
an amount of data associated with the first query.

Clause 34: The method of any one of Clauses 21 through 33, further comprising:
determining one or more query parameters, wherein the one or more query parameters comprise at least one of:
a query processing time associated with the one or more components and the first query;
a query translation time associated with the first query;
a resource utilization associated with the first query; or
an amount of data associated with the first query; and
identifying the one or more components based on the one or more query parameters.

Clause 35: The method of any one of Clauses 21 through 34, further comprising:
identifying the one or more components based on determining the first query comprises a filter that reduces the set of data by an amount that matches or exceeds a threshold.

Clause 36: The method of any one of Clauses 21 through 35, further comprising:
identifying the one or more components based on identifying that the first query is associated with at least one of batch data or streaming data.

Clause 37: The method of any one of Clauses 21 through 36, further comprising:
identifying the one or more components based on identifying that the first query is associated with one or more distributable commands.

Clause 38: The method of any one of Clauses 21 through 37, wherein each of the plurality of data processing systems can access the set of data as provided by a same data source or as stored in a same data store.

Clause 39: A query coordinator comprising:
a data store; and
one or more processors configured to:
  receive a first query identifying a set of data to be processed and a manner of processing the set of data;
  parse at least one of the first query or metadata associated with the first query to identify one or more components of a first data processing system, of a plurality of data processing systems, to obtain and process at least a first portion of the set of data according to the first query, wherein the set of data is accessible by each of the plurality of data processing systems;
  define a query processing scheme indicating that the one or more components are identified to obtain and process the at least a first portion of the set of data according to the first query; and
  provide the query processing scheme to a second data processing system of the plurality of data processing systems,
  wherein a data processing system interface is configured to receive an output of the second data processing system based on providing the query processing scheme to the second data processing system, generate a second query to be obtained and processed by the one or more components based on the query processing scheme, and provide the second query to the one or more components.

Clause 40: Non-transitory computer-readable media including computer-executable instructions that, when executed by a query coordinator, cause the query coordinator to:
  receive a first query identifying a set of data to be processed and a manner of processing the set of data;
  parse at least one of the first query or metadata associated with the first query to identify one or more components of a first data processing system, of a plurality of data processing systems, to obtain and process at least a first portion of the set of data according to the first query, wherein the set of data is accessible by each of the plurality of data processing systems;
  define a query processing scheme indicating that the one or more components are identified to obtain and process the at least a first portion of the set of data according to the first query; and
  provide the query processing scheme to a second data processing system of the plurality of data processing systems,
  wherein a data processing system interface is configured to receive an output of the second data processing system based on providing the query processing scheme to the second data processing system, generate a second query to be obtained and processed by the one or more components based on the query processing scheme, and provide the second query to the one or more components.

Clause 41: A method, comprising:
  receiving, at a query coordinator, a query identifying a set of data to be processed and a manner of processing the set of data;
  determining one or more data semantics of a first data processing system, wherein the one or more data semantics of the first data processing system are based on execution of one or more queries by the first data processing system;
  defining a query processing scheme for obtaining and processing at least a portion of the set of data based on at least a portion of the query, wherein defining the query processing scheme comprises generating instructions for a second data processing system to execute the at least a portion of the query according to the one or more data semantics of the first data processing system;
  providing the query processing scheme to the second data processing system; and
  receiving query results from the second data processing system.

Clause 42: The method of Clause 41, further comprising:
  providing an extension to the second data processing system, wherein the extension translates the query, the set of data, or the query results according to the one or more data semantics of the first data processing system.

Clause 43: The method of any one of Clause 41 or 42, further comprising:
  providing an extension to the second data processing system, wherein the extension translates the query, the set of data, or the query results according to the one or more data semantics of the first data processing system;
  identifying one or more updated data semantics of the first data processing system; and
  providing the one or more updated data semantics to the extension.

Clause 44: The method of any one of Clauses 41 through 43, wherein providing the query processing scheme comprises providing the query processing scheme to an extension of the second data processing system, wherein the extension translates the query, the set of data, or the query results according to the one or more data semantics of the first data processing system.

Clause 45: The method of any one of Clauses 41 through 44, wherein the one or more data semantics of the first data processing system indicate a manner of filtering the set of data.

Clause 46: The method of any one of Clauses 41 through 45, wherein the one or more data semantics of the first data processing system indicate one or more field values for execution of the at least a portion of the query.

Clause 47: The method of any one of Clauses 41 through 46, wherein the one or more data semantics of the first data processing system indicate one or more outputs based on one or more query results.

Clause 48: The method of any one of Clauses 41 through 47, wherein the query results comprise first query results, wherein the second data processing system filters second query results based on the one or more data semantics of the first data processing system to obtain the first query results.

Clause 49: The method of any one of Clauses 41 through 48, wherein the one or more data semantics of the first data processing system are different from one or more data semantics of the second data processing system.

Clause 50: The method of any one of Clauses 41 through 49, wherein the one or more data semantics of the first data processing system are different from one or more data semantics of the second data processing system, wherein the second data processing system indicates a query failure for a particular query based on the one or more data semantics of the second data processing system, and wherein the second data processing system indicates a null set of query results for the particular query based on the one or more data semantics of the first data processing system.

Clause 51: The method of any one of Clauses 41 through 50, wherein execution of the at least a portion of the query according to the one or more data semantics of the first data processing system corresponds to execution of the at least a portion of the query by the first data processing system.

Clause 52: The method of any one of Clauses 41 through 51, wherein the query processing scheme comprises additional instructions for the second data processing system to merge a first portion of the query results based on execution of a first portion of the query with a second portion of the query results based on execution of a second portion of the query to obtain the query results.

Clause 53: The method of any one of Clauses 41 through 52, wherein the second data processing system is separate from the first data processing system.

Clause 54: The method of any one of Clauses 41 through 53, further comprising:
filtering the query to obtain a filtered query, wherein the at least a portion of the query comprises a first portion of the filtered query.

Clause 55: The method of any one of Clauses 41 through 54, further comprising:
determining a processing capability of the second data processing system; and
filtering the query based on the processing capability to obtain a filtered query, wherein the at least a portion of the query comprises a first portion of the filtered query.

Clause 56: The method of any one of Clauses 41 through 55, further comprising:
determining at least one of a query processing time, a query translation time, a resource utilization, or data associated with the query; and
filtering the query based on the at least one of the query processing time, the query translation time, the resource utilization, or the data associated with the query to obtain a filtered query, wherein the at least a portion of the query comprises a first portion of the filtered query.

Clause 57: The method of any one of Clauses 41 through 56, further comprising:
identifying one or more components, of a plurality of components of the second data processing system, to provide the at least a portion of the query.

Clause 58: The method of any one of Clauses 41 through 57, further comprising:
identifying one or more first components, of a plurality of components, to execute a first portion of the query; and
identifying one or more second components, of the plurality of components, to execute a second portion of the query.

Clause 59: A query coordinator comprising:
a data store; and
one or more processors configured to:
receive a query identifying a set of data to be processed and a manner of processing the set of data;
determine one or more data semantics of a first data processing system, wherein the one or more data semantics of the first data processing system are based on execution of one or more queries by the first data processing system;
define a query processing scheme for obtaining and processing at least a portion of the set of data based on at least a portion of the query, wherein defining the query processing scheme comprises generating instructions for a second data processing system to execute the at least a portion of the query according to the one or more data semantics of the first data processing system; and
provide the query processing scheme to the second data processing system, wherein a data processing system interface is configured to receive query results from the second data processing system.

Clause 60: Non-transitory computer-readable media including computer-executable instructions that, when executed by a query coordinator, cause the query coordinator to:
receive a query identifying a set of data to be processed and a manner of processing the set of data;
determine one or more data semantics of a first data processing system, wherein the one or more data semantics of the first data processing system are based on execution of one or more queries by the first data processing system;
define a query processing scheme for obtaining and processing at least a portion of the set of data based on at least a portion of the query, wherein defining the query processing scheme comprises generating instructions for a second data processing system to execute the at least a portion of the query according to the one or more data semantics of the first data processing system; and
provide the query processing scheme to the second data processing system, wherein a data processing system interface is configured to receive query results from the second data processing system.

6.0. TERMINOLOGY

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described herein can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described herein. Rather, the specific features and acts described herein are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described herein with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described herein to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
   receiving, at a query coordinator, a first query identifying a set of data to be processed and a manner of processing the set of data;
   identifying a first portion of the first query is to be executed by a first data processing system and a second portion of the first query is to be executed by a second data processing system;
   generating a modified query based on identifying the first portion of the first query is to be executed by the first data processing system and the second portion of the first query is to be executed by the second data processing system, wherein generating the modified query comprises replacing the first portion of the first query with a query identifier;
   defining a query processing scheme for obtaining and processing at least a portion of the set of data based on the modified query;
   providing the query processing scheme to the second data processing system;
   receiving an output of the second data processing system based on the second data processing system processing the query processing scheme;
   generating a second query to be processed by a component of the first data processing system based on the first portion of the first query and the output of the second data processing system; and
   providing the second query to the component of the first data processing system.

2. The method of claim 1, wherein generating the second query comprises:
   generating the second query based on the modified query.

3. The method of claim 1, wherein the set of data is accessible by the first data processing system and the second data processing system.

4. The method of claim 1, wherein receiving the output comprises:
   receiving the output via a data processing system interface associated with the first data processing system and the second data processing system, and
   wherein providing the second query to the component comprises:
   providing the second query to the component via the data processing system interface.

5. The method of claim 1, further comprising:
   translating the first query from a first query language interpretable by the first data processing system to a second query language interpretable by the second data processing system to obtain a translated first query,
   wherein generating the modified query comprises:
   modifying the translated first query.

6. The method of claim 1, further comprising:
   obtaining a catalog, wherein the catalog maps one or more first portions of a query according to a first query language interpretable by the first data processing system to one or more second portions of a query according to a second query language interpretable by the second data processing system;
   identifying one or more updates to the catalog based on input obtained from a computing device to obtain an updated catalog; and
   translating the first query from the first query language to the second query language based on the updated catalog to obtain a translated first query,
   wherein obtaining the modified query comprises:
   modifying the translated first query.

7. The method of claim 1, wherein the output comprises one or more optimizations to the first query.

8. The method of claim 1, wherein the output comprises one or more optimizations to the first query, wherein identifying the second query comprises:
   modifying the first query based on the one or more optimizations to the first query to identify the second query; or
   generating the second query based on the one or more optimizations to the first query.

9. The method of claim 1, further comprising:
   generating a command tree based on the modified query, wherein the query processing scheme comprises the command tree.

10. The method of claim 1, wherein at least one of the first data processing system or the second data processing system performs a join of first query results based on execution of the first portion of the first query and second query results based on execution of the second portion of the first query.

11. The method of claim 1, wherein the first data processing system executes queries on unstructured data, and wherein the second data processing system executes queries on structured data.

12. The method of claim 1, wherein the query processing scheme comprises instructions for the second data processing system to route the second portion of the first query to one or more components of the second data processing system.

13. The method of claim 1, wherein the query processing scheme comprises instructions for the second data processing system to process the second portion of the first query, generate the output based on processing the first portion of the first query, and route the output to the first data processing system.

14. The method of claim 1, wherein the modified query comprises:
   the second portion of the first query and the query identifier.

15. The method of claim 1, wherein obtaining the modified query comprises:
   applying metadata bindings to the first query to obtain the modified query.

16. The method of claim 1, wherein the first data processing system is separate and remote from the second data processing system.

17. The method of claim 1, further comprising:
   determining at least one of a query processing time, a query translation time, a resource utilization, a processing capability, or data associated with the first query, wherein identifying the first portion of the first query and the second portion of the first query is based on the at least one of the query processing time, the query translation time, the resource utilization, the processing capability, or the data associated with the first query.

18. The method of claim 1, further comprising:
identifying the component to provide the second query.

19. A query coordinator comprising:
a data store; and
one or more hardware processors configured to:
    receive a first query identifying a set of data to be processed and a manner of processing the set of data;
    identify a first portion of the first query is to be executed by a first data processing system and a second portion of the first query is to be executed by a second data processing system;
    generate a modified query based on identifying the first portion of the first query is to be executed by the first data processing system and the second portion of the first query is to be executed by the second data processing system, wherein to generate the modified query, the one or more hardware processors are configured to replace the first portion of the first query with a query identifier;
    define a query processing scheme for obtaining and processing at least a portion of the set of data based on the modified query; and
    provide the query processing scheme to the second data processing system,
    wherein a data processing system interface is configured to receive an output of the second data processing system based on the second data processing system processing the query processing scheme, generate a second query to be processed by a component of the first data processing system based on the first portion of the first query and the output of the second data processing system, and provide the second query to the component of the first data processing system.

20. Non-transitory computer-readable media including computer-executable instructions that, when executed by a query coordinator, cause the query coordinator to:
    receive a first query identifying a set of data to be processed and a manner of processing the set of data;
    identify a first portion of the first query is to be executed by a first data processing system and a second portion of the first query is to be executed by a second data processing system;
    generate a modified query based on identifying the first portion of the first query is to be executed by the first data processing system and the second portion of the first query is to be executed by the second data processing system, wherein to generate the modified query, execution of the computer-executable instructions by the query coordinator, further causes the query coordinator to replace the first portion of the first query with a query identifier;
    define a query processing scheme for obtaining and processing at least a portion of the set of data based on the modified query; and
    provide the query processing scheme to the second data processing system,
    wherein a data processing system interface is configured to receive an output of the second data processing system based on the second data processing system processing the query processing scheme, generate a second query to be processed by a component of the first data processing system based on the first portion of the first query and the output of the second data processing system, and provide the second query to the component of the first data processing system.

* * * * *